United States Patent [19]

Woodell

[11] 4,425,616

[45] Jan. 10, 1984

[54] HIGH-SPEED TIME SHARE PROCESSOR

[75] Inventor: Jack L. Woodell, La Canada, Calif.

[73] Assignee: Frederick Electronic Corporation, Frederick, Md.

[21] Appl. No.: 91,765

[22] Filed: Nov. 6, 1979

[51] Int. Cl.³ .............................................. G06F 13/00
[52] U.S. Cl. ................................................... 364/200
[58] Field of Search ... 304/200 MS File, 900 MS File

[56] References Cited

U.S. PATENT DOCUMENTS

| 3,636,243 | 1/1972 | Rachner | 178/3 |
|---|---|---|---|
| 3,974,343 | 8/1976 | Cheney et al. | 179/18 ES |
| 4,010,448 | 3/1977 | Bennett | 364/200 |
| 4,016,548 | 4/1977 | Law et al. | 364/200 |
| 4,050,058 | 10/1975 | Garlic | 364/200 |
| 4,074,072 | 2/1978 | Christensen | 179/15 AT |
| 4,169,284 | 9/1979 | Hogan et al. | 364/200 |

*Primary Examiner*—Gareth D. Shaw
*Assistant Examiner*—David Y. Eng
*Attorney, Agent, or Firm*—Arnold, White & Durkee

[57] ABSTRACT

A microcoded processor for use in a distributed processing telex exchange to time share process each termination connected to the processor is disclosed. The processor executes selected signaling routines for each termination. The processor contains a sequence file that outputs the address of the next termination to be time share processed. This information controls the transfer of data between the processor and the termination currently being time share processed. Also included in the processor is a constant and a variable data file which contains blocks of data associated with each termination and which contains data needed to execute the selected signaling routine for each termination. A program re-entry file is provided to control the time share execution of each signaling routine since only a predetermined number of microcode instructions are executed in each time share interval. At the end of each time share interval, the program counter contents are stored in the re-entry file location associated with the termination just processed. To enable high-speed processing while cutting down on software overhead, two high-speed cache memories, one for the data from the constant file and one for the data from the variable file, is used. The data for the next termination to be time share processed is loaded into the caches one time share interval ahead of when it is used so that program execution can continue uninterrupted at the end of each time share interval.

7 Claims, 38 Drawing Figures

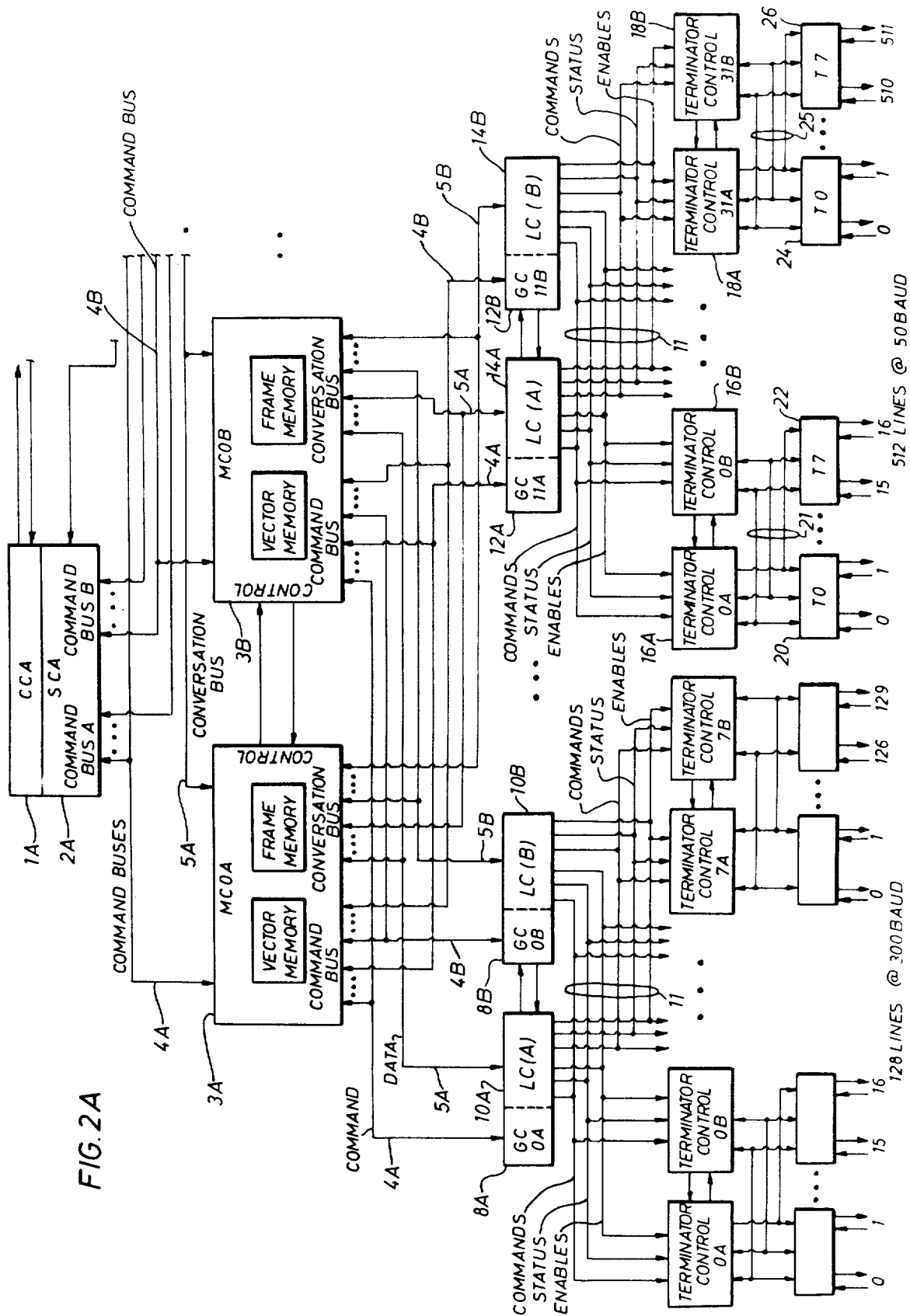

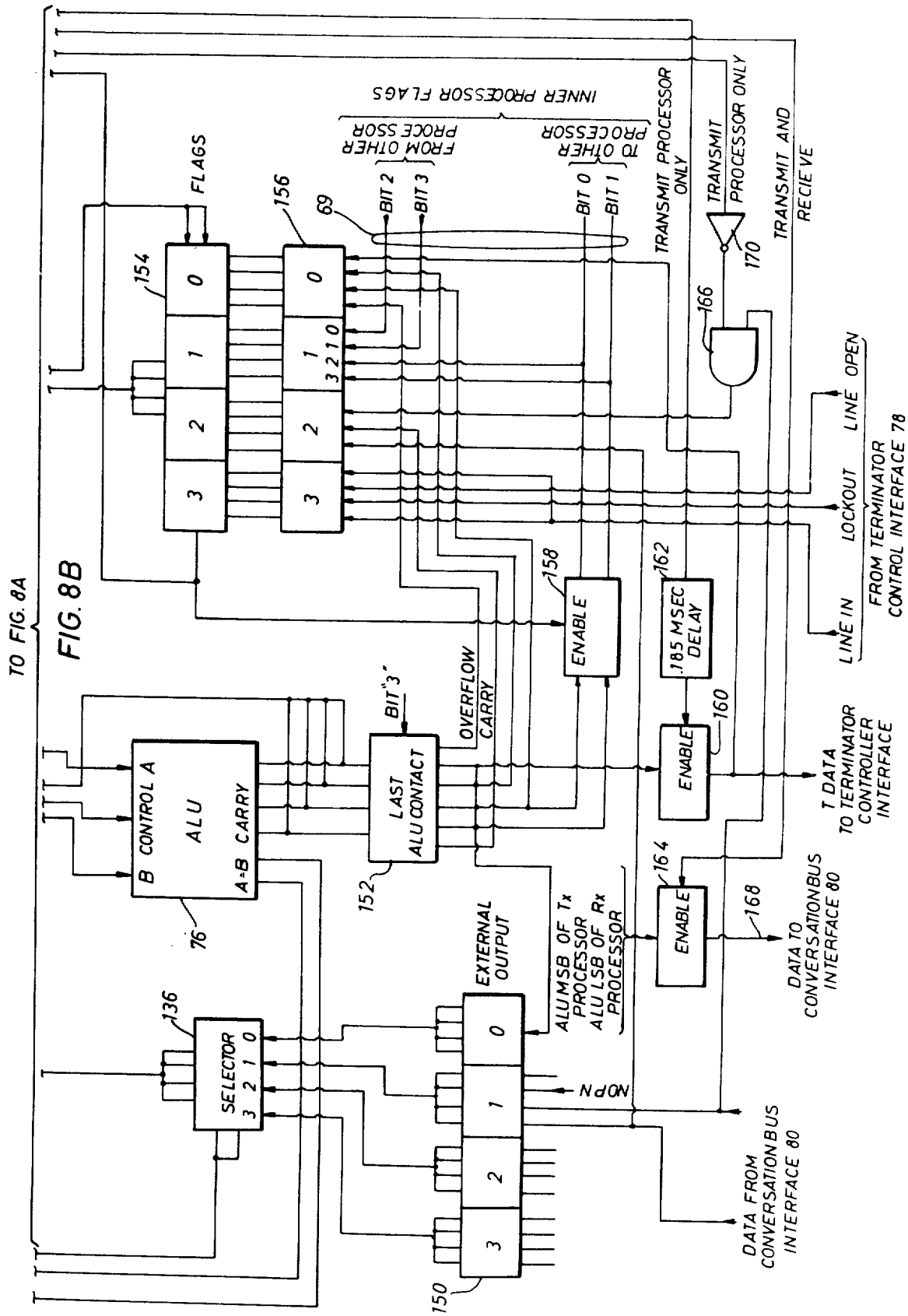

FIG. 10

LINE CONTROLLER PROCESSOR INSTRUCTION FORMAT

| BIT | BRANCH INSTRUCTIONS | ALL INSTRUCTIONS EXCEPT BRANCH |
|---|---|---|
| 31 | BRANCH = 1 | NO BRANCH = 0 |
| 30 | BRANCH ON CARRY = 1 | SPECIAL FUNCTION = 1 |
| 29 | INVERT BRANCH DECISION = 1 | MOVE = 1 |
| 28 | STORE ALU OUTPUT IN A REGISTER IF BRANCH = 1 | SHIFT = 1 |
| 27 | | STORE ALU OUTPUT IN A REGISTER = 1 |
| 26 | | USE AFLAG GROUP FOR A INPUT = 1 |
| 25 | | USE EXTERNAL B INPUT = 0 (REGARDLESS OF BIT 24) |
| 24 | | USE BITS 20 THRU 23 (IF BIT 25 = 1) |
| 23 | B VALUE | B FILE ADDRESS OR EXTERNAL ADDRESS (BITS 20 AND 21) OR FLAG GROUP ADDRESS (BITS 16 AND 17) |
| 22 | | |
| 21 | | |
| 20 | | |
| 19 | A FILE ADDRESS | |
| 18 | | |
| 17 | | |
| 16 | | |
| 15 | Cn | ALU CODE |
| 14 | M | |
| 13 | S3 | |
| 12 | S2 | |
| 11 | S1 | |
| 10 | S0 | |
| 9 | | SPECIAL FUNCTION WORD SELECT |
| 8 | | |
| 7 | ADDRESS | |
| 6 | | INITIALIZATION CODE |
| 5 | | |
| 4 | | |
| 3 | | |
| 2 | | EXTERNAL STROBE = 1 |
| 1 | | EXTERNAL STROBE DESTINATION |
| 0 | | |

| MNEMONIC | BRANCH CODE 31 30 29 28 | A & B DEFINITION 27 26 25 24 | B 23 22 21 20 | A 19 18 17 16 | ALUCODE Cn M S3 S2 S1 S0 15 14 13 12 11 10 | F | BRANCH CONDITION |
|---|---|---|---|---|---|---|---|
| BIT | 1 0 0 0 | 0 0 1 0 | PUT "1"S IN SELECTED POSITION | REG. ADDR. | 0 1 1 1 0 1 | A OR B̄ | ALL SELECTED BITS = 1 |
| BOT | 1 0 0 0 | 0 0 1 0 | PUT "1"S IN SELECTED POSITION | — — — — | 0 1 0 1 0 0 | ĀB̄ | ALL SELECTED BITS = 0 |
| BITN | 1 0 1 0 | 0 0 1 0 | PUT "1"S IN SELECTED POSITION | — — — — | 0 1 1 1 0 1 | A OR B̄ | NOT ALL SELECTED BITS = 1 |
| BOTN | 1 0 1 0 | 0 0 1 0 | PUT "1"S IN SELECTED POSITION | REG. ADDR. | 0 1 0 1 0 0 | ĀB̄ | NOT ALL SELECTED BITS = 0 |
| BFLG | 1 0 0 0 | 0 1 1 0 | — FLAG -- FIELD --SELECT -- | | 0 1 1 1 0 1 | A OR B̄ | ALL SELECTED FLAGS = 1 |
| BNFLG | 1 0 0 0 | 0 1 1 0 | | | 0 1 0 1 0 0 | ĀB̄ | ALL SELECTED FLAGS = 0 |
| BFLGN | 1 0 1 0 | 0 1 1 0 | | | 0 1 1 1 0 1 | A OR B̄ | NOT ALL SELECTED FLAGS = 1 |
| BNFLGN | 1 0 1 0 | 0 1 1 0 | | | 0 1 0 1 0 0 | ĀB̄ | NOT ALL SELECTED FLAGS = 0 |
| SBM | 1 0 0 0 | 1 0 1 1 | REG. ADDR. | REG. ADDR. | 0 0 1 1 1 0 | A−B | SUBTRACT & BRANCH ON −1 |
| SBN | 1 0 1 0 | 1 0 1 1 | | | 0 0 1 1 1 0 | A−B | SUBTRACT & BRANCH ON NOT −1 |
| ABC | 1 1 0 0 | 1 0 1 1 | REG. ADDR. | REG. ADDR. | 1 0 1 0 0 1 | A+B | ADD & BRANCH ON CARRY |
| ABNC | 1 1 1 0 | 1 0 1 1 | | | 1 0 1 0 0 1 | A+B | ADD & BRANCH ON NO CARRY |
| BEA | 1 0 0 0 | 0 0 1 1 | REG. ADDR. | REG. ADDR. | 1 0 0 1 1 0 | A−B−1 | BRANCH ON EQUAL |
| BNEA | 1 0 1 0 | 0 0 1 1 | | | 1 0 0 1 1 0 | A−B−1 | BRANCH ON NOT EQUAL |
| BGA | 1 1 0 0 | 0 0 1 1 | | | 0 0 0 1 1 0 | A−B | BRANCH ON A < B |
| BLEA | 1 1 1 0 | 0 0 1 1 | | | 0 0 0 1 1 0 | A−B | BRANCH ON A ≥ B |
| BLA | 1 1 0 0 | 0 0 1 1 | | | 1 0 0 1 1 0 | A−B−1 | BRANCH ON A > B |
| BGEA | 1 1 1 0 | 0 0 1 1 | REG. ADDR. | REG. ADDR. | 1 0 0 1 1 0 | A−B−1 SEE FIG.13 | BRANCH ON A ≤ B |

— MEANS AN UNUSED BIT

BRANCH INSTRUCTIONS

FIG.11

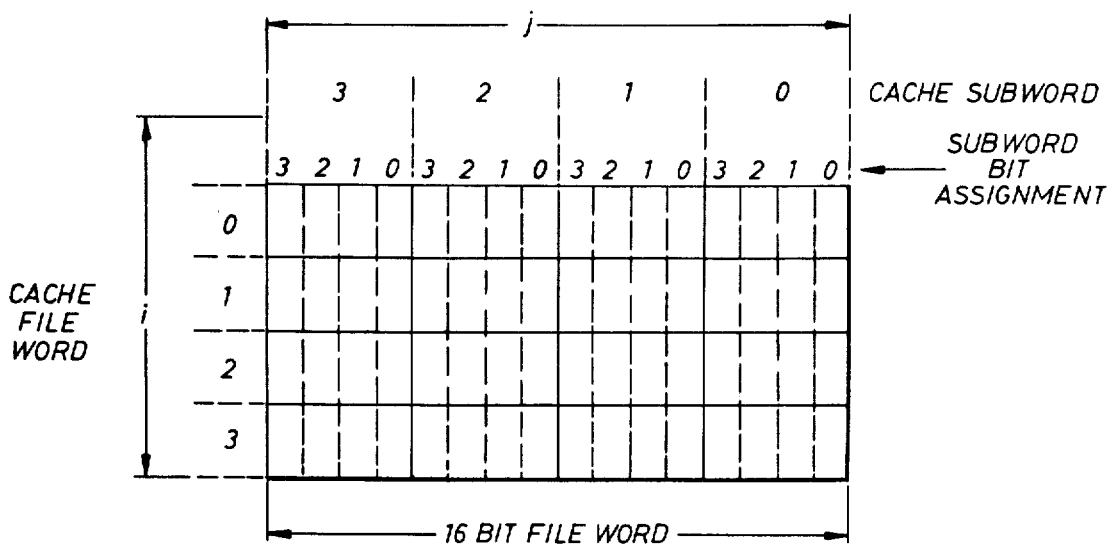

LEGEND:  I = USED INTERNALLY BY THE LC FIRMWARE
          – = NOT RELEVANT
          X = BINARY VALUE
     NAME$_n$ = NAME ASSIGNED TO BIT 2 OF 4BIT SUBWORD
              NIBBLE – ADDRESSED BY NAME
     BLANK = NOT USED BY THIS FUNCTION

4 BIT SUBWORD ASSIGNMENT IN
CONSTANT OR VARIABLE FILES ($F_{ij}$)

F = "V" FOR VARIABLE FILE
        C FOR CONSTANT FILE
    j = SUBWORD NO (NIBBLE) (0,1,2 OR 3)
    i = FILE WORD (0,1,2 OR 3)
EXAMPLE, V$\emptyset$1 = SUBWORD 1 OF VARIABLE
                     FILE WORD $\emptyset$

FIG. 12

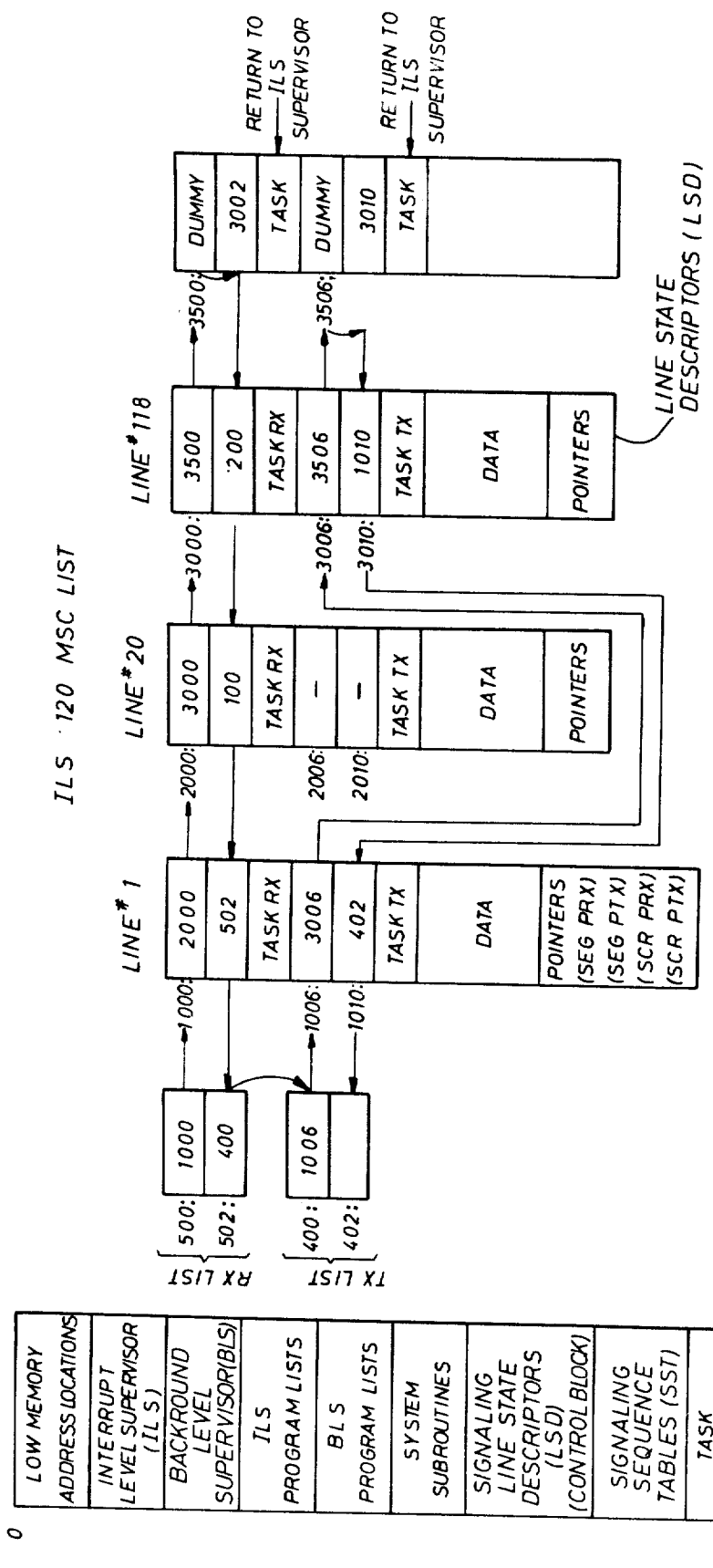

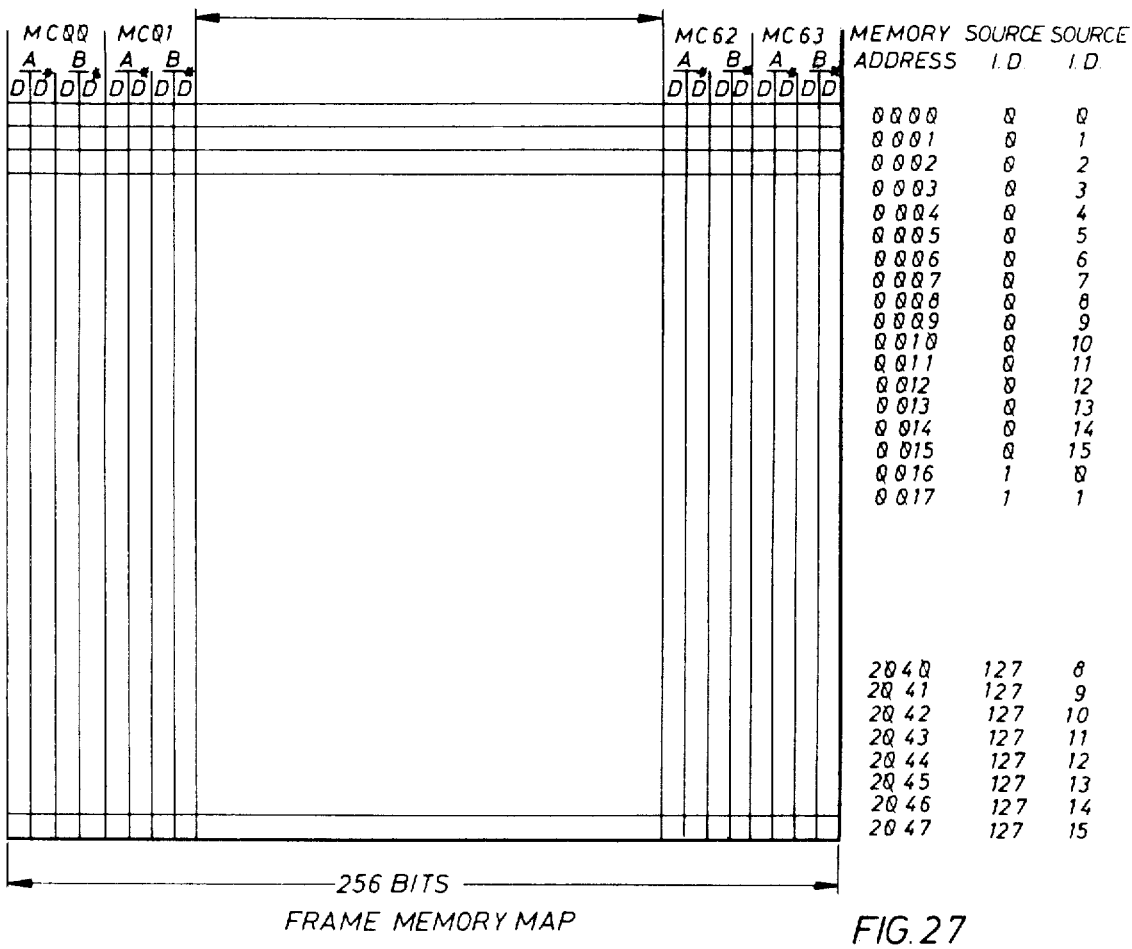
FIG. 27 FRAME MEMORY MAP
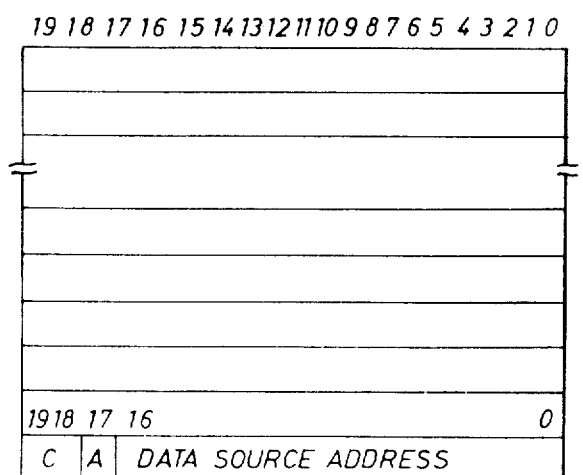
FIG. 31 VECTOR MEMORY MAP

FIG. 36
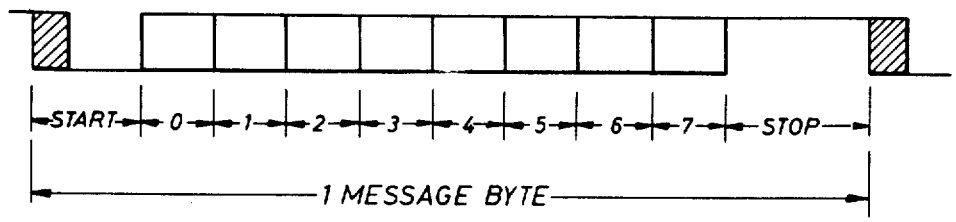
FIG. 37
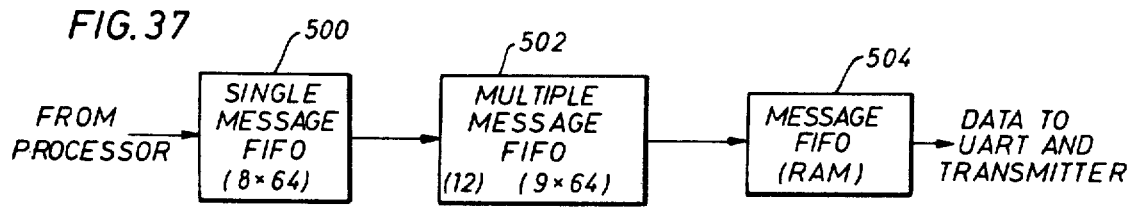
FIG. 38
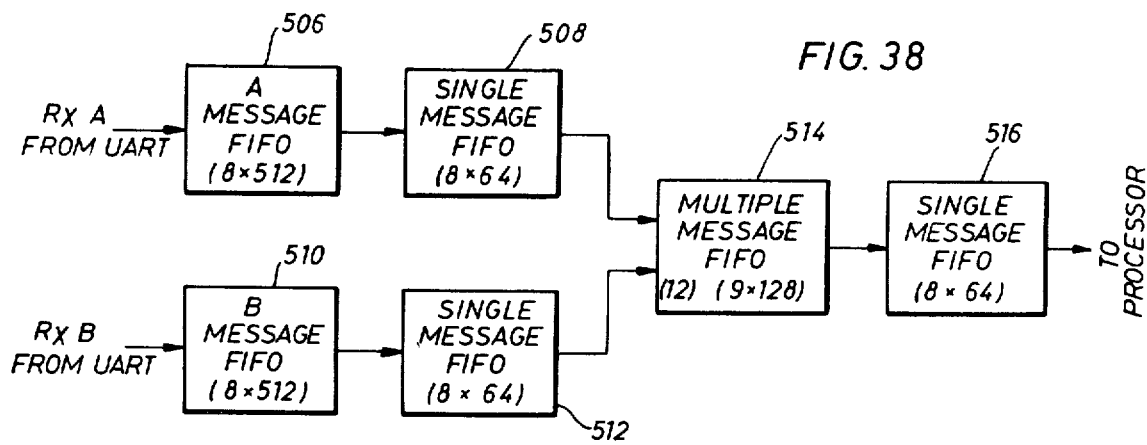
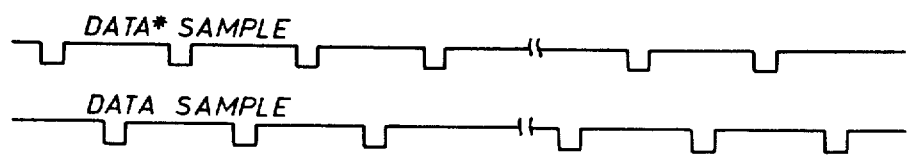
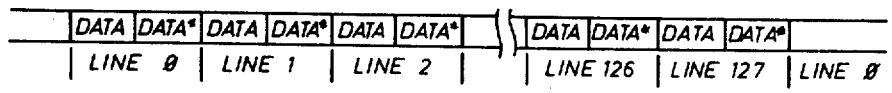
FIG. 33

HIGH-SPEED TIME SHARE PROCESSOR

CROSS REFERENCE TO RELATED APPLICATIONS

This application relates to three U.S. patents which are assigned to the same Assignee as the present application: U.S. Pat. No. 4,292,465 entitled "Distributed Processing Telex Exchange;" U.S. Pat. No. 4,288,658 entitled "Apparatus For Generating Telex Signaling Sequences in a Distributed Processing Telex Exchange;" and U.S. Pat. No. 4,291,196 entitled "Circuit for Handling Conversation Data in a Distributed Processing Telex Exchange." Each of the applications of these related patents were filed on the same day as the present application, Nov. 6, 1979.

TABLE OF CONTENTS

BACKGROUND OF THE INVENTION
SUMMARY OF THE INVENTION
BRIEF DESCRIPTION OF THE DRAWINGS
DETAILED DESCRIPTION OF THE PREFERRED EMBODIMENT
  The Distributing Processing System
  A Redundant System
  The Conversation Data Bus
    Vector/Frame Memory
    The Line Controller-to-Line Controller Data Link
    Vector Memory
    Conversation Data Bus Error Detection
      Transmitting Line Controller-to-Master Controller
      Master Controller-to-Master Controller
      Master Controller-to-Receiving Line Controller
  The Command Bus
    Transmitter Operation
    Receiver Operation
  The Group Controller-Line Controller Combination
    The Line Controller Processor
    The Line Controller Instruction Set
    The Line Controller Firmware
      Transmit Processor Signaling Routines
      Receive Processor Signaling Routines
      Signaling Routine Source Code-Examples
        Generation of a Signaling Sequence by the Group Controller-Line Controller Combination
    The Terminator Control Interface
    The Conversation Bus Interface
  The Terminator Control Units
  The Terminator Units
Claims

BACKGROUND OF THE INVENTION

This invention relates generally to electronically-controlled telecommunication switching systems. More particularly, this invention relates to a distributed processing telex exchange in which the system processing requirements have been distributed to different levels of processor control, and in which each processor in each level of control has a redundant parallel processor as a backup unit to thereby increase system reliability.

The advent of the digital computer has enabled larger and more sophisticated telecommunication systems to be designed, such as the Frederick Electronics Corporation ELTEX II/III telex exchange (switch). These computer controlled exchanges provided faster and more reliable control of the calls between telex terminations. Prior-art systems of this type are capable of handling the calls from a large number of terminations through a combination of hardware and a lot of software. However, because of the large software overhead in the software of these prior-art systems, they are limited in the number of calls they can handle and in their ability to handle higher data transmission rates (band rates). In addition, varying types of signaling sequences are required by the terminations serviced by the exchange. These sequences are produced in these prior-art systems by fixed software routines for each termination. Since each termination requires its own customized software routines for its signaling requirements, it is very difficult to make changes in the type of signaling that a given termination may require because of the changes that must be made in both the computer software and the dedicated system hardware for that termination.

For these prior-art systems, each termination serviced by the exchange was scanned according to a predetermined sequence to determine the state of the line, such as a bid-for-service, clearing, etc. Additionally, the characters transmitted to the exchange were converted to parallel data and transmitted within the exchange as a complete character. Coupling of characters by software was reasonable in telex switches of 8000 line capacity or less, even with processors having relatively high instruction execution speeds. However, it soon became apparent that higher baud rates and larger exchange sizes would be difficult to accomodate using existing designs unless a new approach to the concept of handling both the processing requirements of the exchange and the signaling requirements for the many varieties of types of signaling that now exist, as well as providing flexibility for new types.

In order to interface with subscribers to handle calls originating in terminations connected to the telex exchange or to forward calls to the terminations, the exchange must generate and respond to signals in the termination lines. Those skilled in the art refer to these signals as the protocol signaling sequences. These sequences are produced in the signal lines between the exchange and the termination as sort of a stimulus-response technique. For example, a signal is sent from the termination to the exchange. This signal is received and causes the exchange to produce a signal back to the termination that, in turn, causes the termination to send another signal back to the exchange, and so forth. If all signal levels and pulse durations transmitted between the termination and the exchange occur within specific time intervals, then the exchange and the termination will be able to exchange conversation data.

It would be exceedingly difficult, if not impossible, for the prior-art telex exchanges to increase the number of terminations, and accordingly, the number of calls that it can handle, by one, continuing to have dedicated software routines for each termination to handle the signaling sequence required by that termination, and two, having a single central processor attempt to handle both the call servicing and the other processing requirements of the telex exchange. Accordingly, it would be advantageous to provide a telex exchange that incorporates the computing power of the digital processor by distributing the processing requirements of the exchange to different levels of processor control to optimize the processing requirements at the levels where it is needed. Further, to provide a distributed processing exchange in which each processor at each level of control is comprised of a redundant pair of processors both processing the same data simultaneously and both processors passing the same data to every other processor in each redundant pair in each level of control to which it is connected to thereby improve the exchange's reliability. It would also be advantageous to provide a single set of hardware and software within the distributed processing telex exchange that would be capable of handling the signaling protocol for all of the various signaling types of terminations, as well as, to permit the exchange to service more terminations at data rates higher than in existing prior-art exchanges.

SUMMARY OF THE INVENTION

In accordance with the invention, a high-speed microcoded processor for use in a multi-channeled data system is provided in which each channel is time share processed. The processor is comprised of a sequence file for controlling the sequence in which each data channel is time share processed; a program memory for storing the microcode instructions for a plurality of data handling routines for processing of the input and output signals of the channels; a channel data file that contains a block of memory locations associated with each channel for storing parameters needed by the data handling routines to process each channel; and an instruction execution means for executing the microcode instructions stored in the program memory.

The channel data file further consists of a program re-entry file, a constant file and a variable file. The program re-entry file contains an addressable memory location associated with each channel. In each of these memory locations is stored the address of the program memory location containing the next data handling routine instruction to be executed for its associated data channel during the next time share interval for that channel. The constant file contains fixed parameters required by the data handling routines, which are not alterable by the processor while the variable file contains variable data required by the data.

The instruction execution means further consists of an arithmetic logic unit responsive to the microcode instructions for performing data manipulations on selected digital data within the processor. Additionally, a high-speed cache memory consisting of a constant cache and a variable cache memory is provided. The constant cache memory only stores data from the constant data file, while the variable cache both read from and writes to the variable data file. Each cache memory stores the data associated with the channel currently being time shared processed. Each cache memory further comprise a cache A and a cache B memory in which each cache A and B has an active and an inactive state. During an active state, the contents of the cache is available for use by the instruction exectution means. In the inactive state, the cache is available for loading from its respective data file the data for the next channel to be time share processed. In addition, the data in the inactive variable cache A or B is returned to the variable data file prior to loading with the data of the next channel to be processed. The state of each cache A or B of both the constant and variable cache memories change state at the end of each time share interval. Prior to returning the data from the inactive A or B variable cache memory to the variable file, one of a set of special microcode instruction may be performed on each word contained in the inactive A or B variable cache.

To control the transfer of the data from the data files to the cache memories and to control the timing of the instruction execution logic to execute a predetermined number of instructions in each time share interval, a file address and control means is provided. Also, a data selection means is provided. This means is controlled by the microcode instruction to apply selected digital data of the processor to the input of the arithmetic logic unit including the data contained in the high-speed cache memories.

BRIEF DESCRIPTION OF THE DRAWINGS

For a fuller understanding of the nature and objects of the invention, reference should be had to the following detailed description taken into connection with the accompanying drawings, in which:

FIGS. 2A and 2B, when placed together with the latter to the right of the former, show a more detailed block diagram of the distributed processing telex exchange as shown in FIG. 1.

FIGS. 8A and 8B, when placed together with the latter below the former, show a block diagram representation of the microcode instruction execution circuits for either of the line controller processors.

FIG. 10 is a format representation of the line controller processor microcode program instructions.

FIG. 11 is a list of some of the possible branch instructions for the line controller processor.

FIG. 12 is an illustration of the high-speed variable and constant cache memories word organization.

FIG. 22 is a block diagram representation of the functional organization of the group controller processor program memory.

FIG. 23 is a block diagram representation of a typical interrupt level supervisor time list.

FIG. 27 is an illustration of the frame memory map.

FIG. 31 is an illustration of the vector memory map.

FIG. 33 is a timing diagram of the data format for each conversation bus data line.

FIG. 36 is a timing diagram of the byte format for a data byte transmitted over the command bus.

FIG. 37 is a block diagram representation of the message buffering by a processor prior to transmission over the command bus.

FIG. 38 is a block diagram representation of the message buffering for the command bus messages received by a processor over the command bus prior to use by the processor.

Similar reference characters refer to similar parts throughout the several views of the drawings.

DETAILED DESCRIPTION OF THE PREFERRED EMBODIMENT

It will be helpful in understanding the following discussion to define certain logic terms. Each of the logic signals to which reference is made in the following discussion, unless otherwise defined, will have one of two possible logic states, a logic 1 or a logic 0. A logic signal will be designated as a true signal without an asteric following the mnenomic. As an example, CLOCK would be a true signal while CLOCK* would be its inverse. Each logic signal, be it the true signal or its inverse, will have an asserted and an unasserted state.

In the case of CLOCK, a true signal, the asserted state will be a logic 1 and the unasserted state a logic 0. For CLOCK*, the reverse is true, the asserted state is logic 0 and the unasserted state is logic 1. A signal goes "true" when it switches from the unasserted to the asserted state and vice versa when it goes "false." Lastly, a flip-flop is in a logic 0 state when the Q output is at a logic 0 and the Q* output is at a logic 1. In the logic 1 state the outputs of the flip-flop are in their reverse states.

Figure 1:
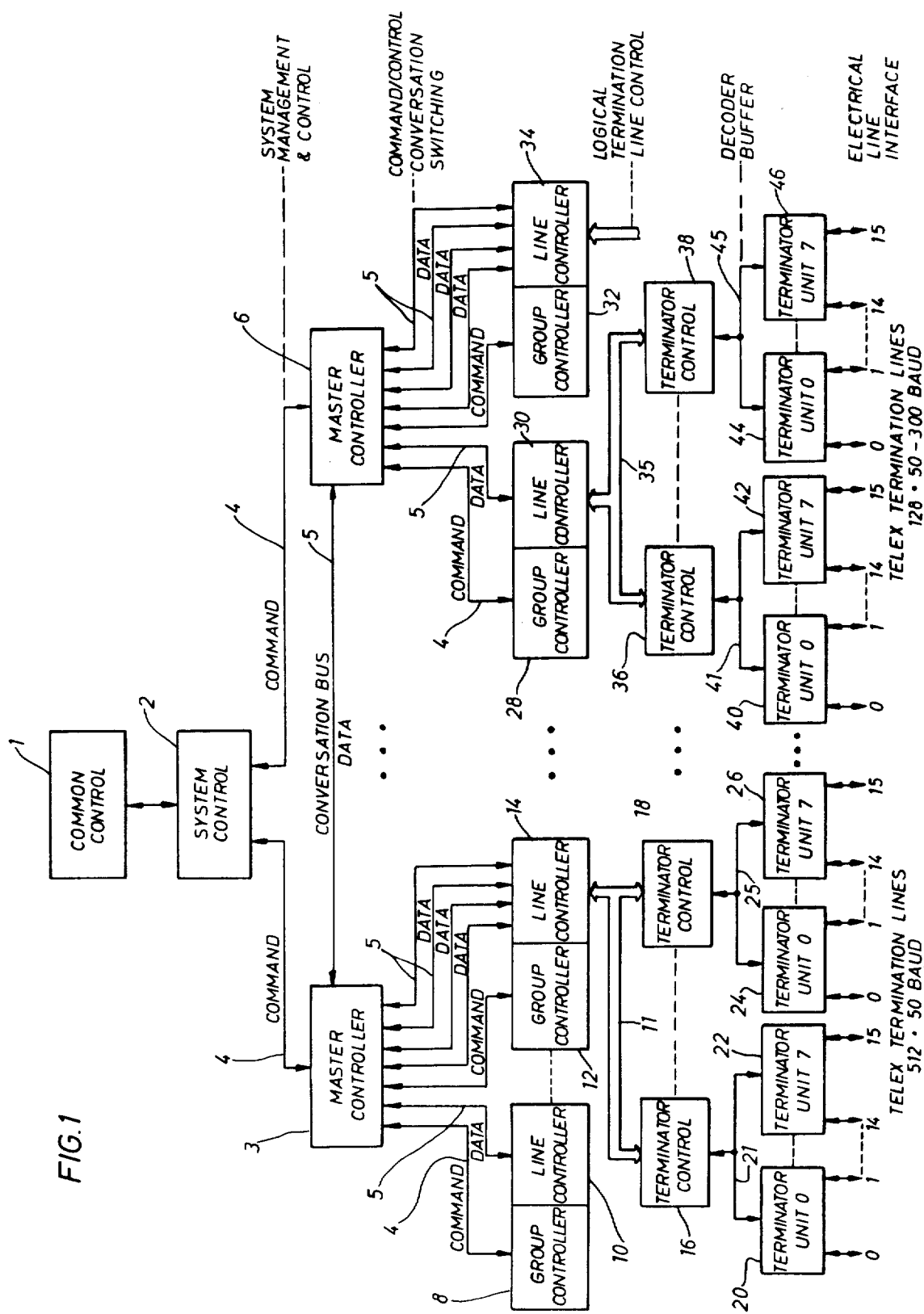
FIG. 1 is a block diagram of the distributed processing telex exchange of the present invention.

Referring to the figures and first to FIG. 1, a block diagram of the distributed processing telex switching system exchange is shown. The function of a telex exchange system is to provide the control necessary to transmit to and receive data from the various customer terminations which are coupled to the exchange. In performing this function, many operations and decisions must be performed in order to insure that the information forwarded to the exchange by a calling termination is reproduced at the desired destination termination. The present invention has divided the decision making operations and system control functions into classes of control that permit the relegation of these operations to different levels of computer system control. In other words, some operations can be performed more efficiently at a lower level of control while other functions necessarily must reside at higher levels. As shown in FIG. 1, the present invention is configured like a pyramid. At the top of the pyramid is the highest level of processor control called the common control (CC) 1 which interfaces with the lower levels of process control through the system control (SC) 2. Common control 1 and system control 2 comprise the system management and control level for the telex exchange. The common control is responsible for all of the system-wide functions, such as call set-up and clear down, routing and quota systems, performance monitoring, redundancy and configuration control, peripheral device handling, call recording and billing, etc.

Below the common control 1 is the system control 2 which interfaces the common control to the next lower level of processor control, the master controllers (MC's). Master controllers 3 and 6 are shown in FIG. 1. For a fully configured system of the present invention, there will be 64 master controllers. The system controller 2 contains the system clock 7 and the drivers necessary to distribute the clock timing to all blocks in the system (see FIG. 2). System controller 2 also handles the generation and decoding of the command and control messages to and from the common control processors. The command message protocol is established at the system control 2 level.

As is known to a person of ordinary skill in the art, in order for there to be an exchange of information between various parts of a system, data buses for transmitting this data are required. Most computers use multi-lined buses for transmitting address and data information to and from devices attached to the buses. However, for the present invention, data, whether in the form of an address, a command or simply conversation data, is transmitted between the various levels of processor control in a bit-coupled mode. That is, data is transmitted between the different levels of processor control serially over a relatively few lines, rather than in parallel on a multi-lined bus. In addition, the conversation data between the calling and the called terminations has been separated from the command and data information that is transmitted between the various levels of processor control as part of their performances of their respective functions within the system. As can be seen in FIG. 1, there exists two types of communication buses which are coupling between the various levels of processor control, i.e., command and data buses. The command buses are labelled bus 4 while the conversation data buses are labelled bus 5.

The command bus 4 is used to transmit messages between the common control 1 and the lower levels of processor control. However, as can be seen in FIG. 1, the conversation bus is not coupled to the common control 1, but rather, goes no higher than to the master controller level.

At the master controller 3 and 6 level, the command and conversation switching occurs. Command and control information transmitted over the command bus 4 from the lower levels of processor control pass through the master controller level as though the master controller was transparent to the command bus. The master controller must perform many operations on the command bus data before forwarding the data to its destination. However, the master controllers 3 and 6 do not perform any functions with regard to the messages on the command bus, regardless of whether they are received from the lower levels of processor control or are received from the common control 1.

The next level of processor control below that of the master controllers 3 and 6 is the group controller level. As shown in FIG. 1, the group controllers 8, 12, 28 and 32 comprise the level at which the logical termination line control functions are performed. Each group controller at this level of processor control is connected to the higher levels of processor control via the command bus 4. As shown in FIG. 1, the conversation bus 5 is not connected to the group controllers. For the preferred embodiment of the present invention, each group controller consists of a Digital Equipment Corporation LSI-11 microprocessor. Each group controller is programmed to function identically with the exception that each group controller may contain different data which characterizes the various termination signaling types that are under control of the group controller. For purposes of this description, any reference to a group controller is equally applicable to any other group controller as far as the general functions performed by a group controller is concerned. The group controller 8 performs such complex tasks as signaling sequence protocols, character sequence detection, bits-for-service, line seizures, and disconnects. Included within these tasks are the signaling requirements of the associated terminations, e.g., Type A or B, subscriber or trunk, plus or minus mark, etc. Since the group controller 8 is coupled to the higher levels of processor control by the command bus, the group controller is responsible for the command and control communications between the terminations and the higher levels of the system.

The group controller is a general purpose programmed digital computer which contains software routines to handle the command and control information between the common control and the terminations. Additionally, the group controller executes the tables of signaling information to produce the signaling sequences for the terminations that are under its control. The group controller 8 stores and controls the "signaling scripts" used by the line controller 10 to implement the signaling sequences for both a call set-up and for a disconnect. Since all of the signaling information is stored in the group controller processor memory, no hardware changes need to be made in order to change the line characteristics for any termination under a group controller's control.

In order to produce the desired signaling sequences required by the various types of terminations and to minimize the amount of software overhead, the signaling sequences have been reduced to their basic elements, i.e. levels, transitions, pulses and characters. Generations of these basic events, which may be present in all signaling sequences, have been relegated to a lower level of processor control so that the group controller will not have to execute extensive software routines for each termination. Rather, signaling sequences can be constructed from scripts of signaling tasks within the group controller that cause the lower level of processor control to generate levels, pulses, etc. in the terminations while freeing up the group controller for other processing. This enables the group controller to service the calls from a large number of terminations, and to incorporate a change in a termination signaling requirements without having to make "hardware" changes to effectuate the new signaling. Only a change in the software data which specifies what type of signaling is required by the termination is needed. The group controller program does the rest.

The next lower level of processor control within the telex switch of the present invention, is the line controller processor. FIG. 1 shows line controllers 10, 14, 30 and 34 existing at the same level as its associated group controller 8, 12, 28 and 32, respectively. Although illustrated in this manner, the line controller functions as a slave to the group controller while performing its various signaling routines. That is, the signaling routines which the line controller 10 performs for each termination is selected and set up by its associated line controller 8. As shown in FIG. 1, the line controller is coupled to the higher levels of processor control via the conversation bus 5 only, and not by way of the command bus 4. Accordingly, the line controllers function to control the flow of conversation data between the higher levels of processor control and the terminations.

The group controllers and line controllers are shown in FIG. 1 occupying the same level of processor control because the group controllers and their associated line controllers operate in tandom, with all line controller activity controlled and monitored by the group controller. In other words, the group controller acts as a supervisor for supervising the flow of data between its associated line controller and each of the customer terminations connected to that line controller.

The line controller 10 is the lowest level of processor control in the present invention. The line controller processor is a special purpose high-speed multi-line time shared processor that executes a selected signaling routine, from a set of routines, for each of the terminations under its control. Processing of each termination by the line controller is performed in a time share mode. That is, a signaling routine specified by the group controller to be executed for a given termination is executed by the line controller processor in a time share mode along with the signaling routines selected for the other terminations under this line controller's control. During each time share interval, a fixed number of line controller instructions are performed for each termination. For the preferred embodiment, the number of instructions executed in each time share interval is 18.

The line controller processor executes its microcoded instructions, which exist in "firmware" within the processor program memory, at a speed sufficient to enable the line controller to process up to 512 termination lines at a data rate of 50 baud. The firmware routines and the associated hardware of the line controller function as a piece of dedicated "hardware" that responds to signals from its associated group controller processor. In other words, the software overhead which would prohibit a general purpose digital computer from accomplishing the functions of the group controller-line controller combination of the present invention has been removed from the software domain and converted into hardware. As a result, the signaling sequences required to service the calls for a large number of terminations can be accommodated by the high speed capabilities of the line controller hardware operating in response to the program control of the group controller.

As previously mentioned, the signaling routines that are contained in the line controllers represent the various activities or signal levels that occur on the termination signal lines, reduced to their simpliest elements. That is, the signaling sequences have been reduced to transistions, pulses, and characters. It is up to the group controller software to produce the program sequences which will utilize these lowest common denominator routines to construct the desired signaling sequence within a given termination. To implement the signaling sequences within the termination lines, the line controller has two identical microprogrammed processors, one processor for transmitting signals to the termination (Tx) and one processor for receiving signals from the termination (Rx). Included within the line controllers is a conversation bus interface to interface the conversation data between the master controllers and the line controllers, and a termination control interface to interface the line controller to the terminations via the lower levels of control. Coupled to the line controllers and located at a lower level within the processor system are the terminator control units, such as terminator control units 20, 22, 24 and 26 which comprise the decoder/buffer level of the telex switch. This level of control does not contain any programmed processors. Rather, the terminator control units function to address the lowest level in the system, the terminations, and are completely transparent to the data transmitted from the line controller to the terminator units.

The terminator units, such as terminator unit 20, 22, 24 and 26 as shown in FIG. 1, are the lowest level of control of the distributive process telex switch and function as the electrical line interface. For the preferred embodiment of the present invention, each terminator unit contains circuitry for interfacing with two customer terminations. It is in the terminator units that the required signaling levels are produced and transmitted onto the Tx lines of the termination, and on which the receive signal levels are received on the Rx lines and transmitted to the higher levels of processor control. Thus, the terminator units function as the telex switch's interface to the world outside the exchange, whether to a trunk, to a subscriber, or as a service position. The terminator units translate the internal language of the exchange to the language of the telex/data signaling, and vice versa.

The distributed processing telex switch of the present invention has an ultimate capacity of servicing 131,072 terminations at 50 to 300 baud and a conversation band width of 39.3 million bits per second. Each level of processor control within the telex exchange is capable of handling a certain number of termination lines. At the common control 1 level, the functions performed are performed for all 131,072 terminations since there is only one common control processor. At the next lower level of processor control are the master controllers which are each capable of handling 2,048 termination lines at a speed up to 300 baud per line. Therefore, for a system capable of handling the maximum number of terminations, 64 master controllers would be required.

For each of the master controllers, the 2,048 termination lines may be subdivided into smaller groups (line groups) of no less than 128 lines and no more than 512 (4 line groups). This is because the group controllers, which occupy the next lower level of processor control, are designed to control as few as 128 lines and as many as 512. As shown in FIG. 1, the group controller 12 and line controller 14 combination is shown controlling 512 termination lines at a communication data rate of 50 baud each, while the group controller 28 and line controller 30 combination is shown controlling 128 termination lines at a rate from 50 to 300 baud. Therefore, the number of group controller-line controller combinations associated with each master controller may vary from as few as 1 to as many as 16. In a similar manner, the number of units in the next lower level below the line controllers, the terminator control units, may vary from as few as 1 to as many as 32 since each terminator control unit is designed to handle 16 termination lines. As previously discussed, below the terminator control units are the terminator units themselves in which two termination lines are serviced by an individual terminator unit. Each terminator control unit services 8 terminator units.

A Redundant System

A fundamental requirement for any telex exchange is for the exchange to be reliable. As is the case with any large scale electronics system, absolute reliability of each element in the system cannot be guaranteed. In order to minimize the possible loss of a call in progress, the distributed processing exchange of the present invention is constructed such that, beginning at the terminator control unit level and continuing all the way up through the common control 1 level, each functional block as shown in FIG. 1 additionally consists of a redundant unit (see FIG. 2) which operates in parallel with its companion (on-line unit), but existing in a standby state ready to take over for the on-line unit should the need arise.

Figure 2B:
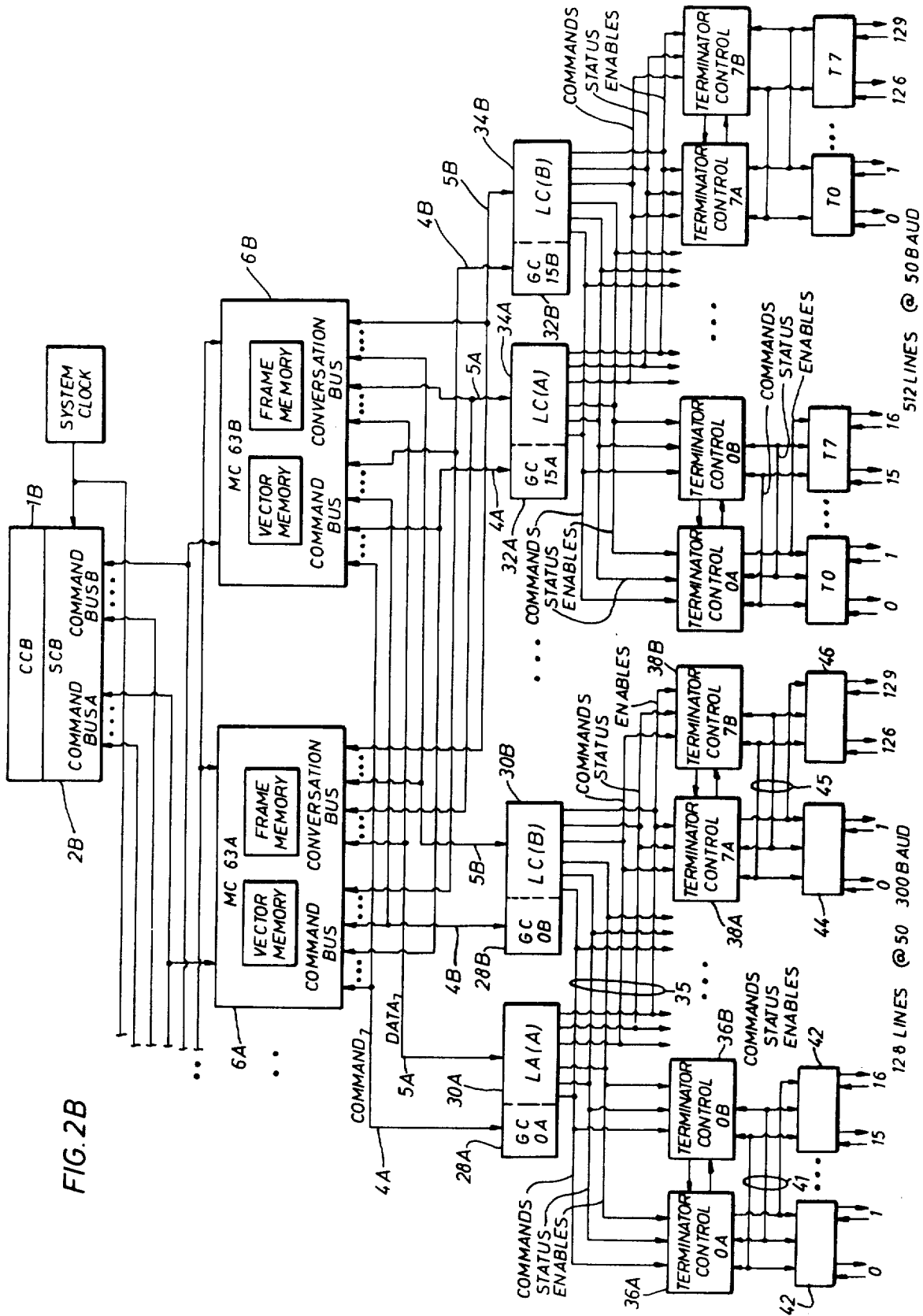

To better illustrate the redundancy of the present invention, refer now to FIGS. 2(a) and (b) for a more detailed block diagram of the distributive processing system as shown in FIG. 1. Each level of process control is shown in FIG. 2 as consisting of two identical units, units A and B. For example, master controller 3 is shown as 3A and 3B. In an effort to insure reliability, each processor control in each level has a redundant backup unit that is identical to its companion. Further, this redundant unit is operating simultaneously with its companion. However, only one of the two units activity performs the intended function for the unit. That is, while both units are operating identically (both sending and receiving command and data signals), only the data from the unit that is on-line is actually being used by the other levels of processor control. As shown in FIG. 2, each of the functional units are coupled together by control lines which enable the units to go from the standby to the on-line condition when the unit that is on-line begins to malfunction.

Figure 3:
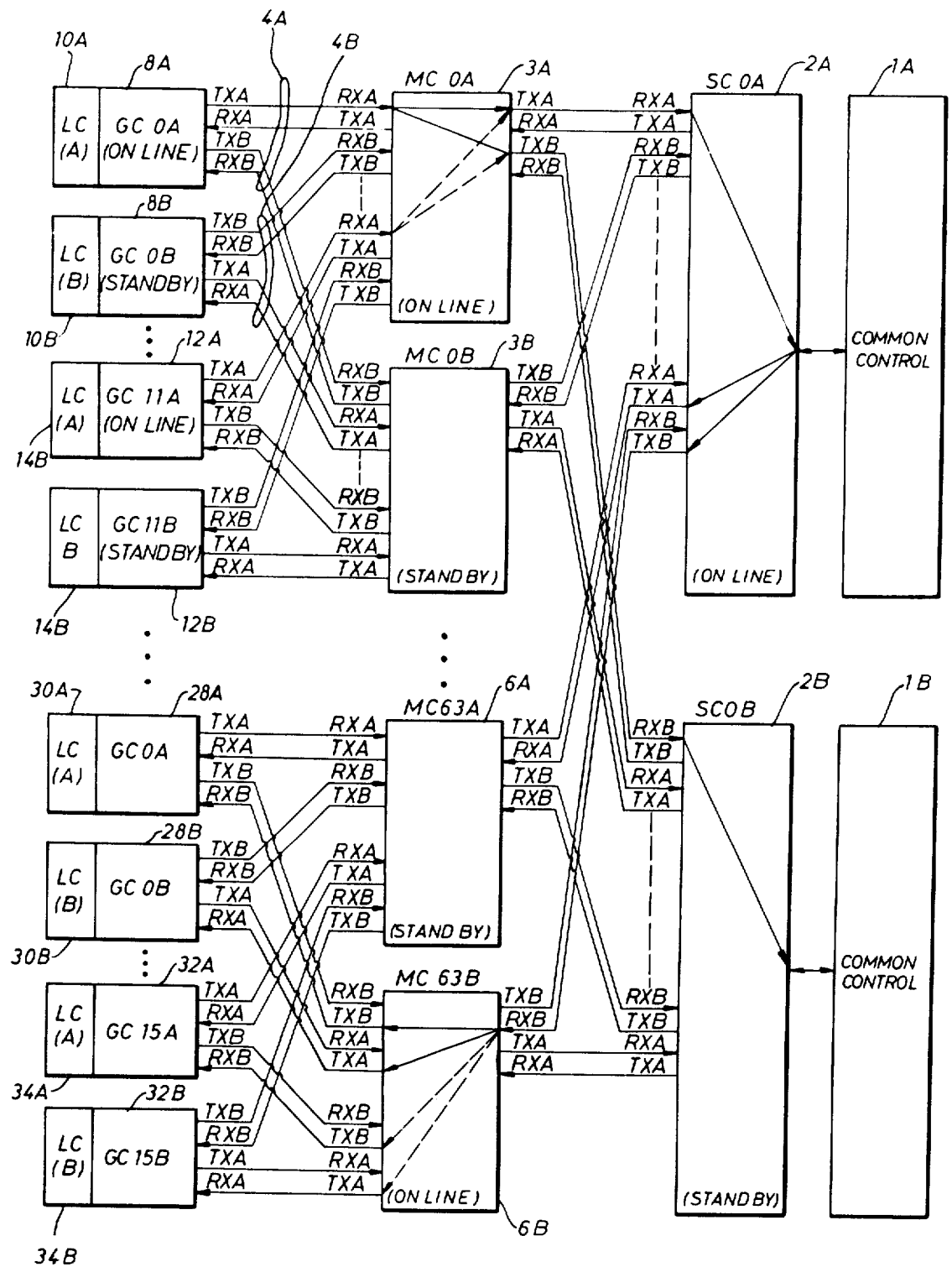
FIG. 3 is a block diagram of a portion of the distributed processing telex exchange showing the connections for the command bus between the various redundant units at each level of processing.

Each of the functional blocks of processor control illustrated in FIG. 2 are coupled to the other levels of processor control via the command 4 and data 5 buses such that each functional unit, whether the on-line or the backup unit, is coupled to both units of the next higher and/or lower level of processor control to which it is normally connected. In other words, each block is always sending to two other units and is always receiving from two other units. For example, in FIG. 2, master controller 3A is coupled to system controller 2A and 2B via command bus 4A, while master controller 3B is coupled to system controller 2A and 2B via command bus 4B. These redundant communication paths are better illustrated in FIG. 3 in which the command buses 4A and 4B for the group controller-line controllers of FIG. 2(a) are shown connected to the common control 1 via master controllers 3 and 6 and the system controller 2. The buses illustrated in FIG. 3 are only for the command bus 4. However, a similar arrangement exists for the communication data bus 5 with the exception that the conversation bus 5 originates with the line controllers rather than the group controllers. As seen in FIG. 3, the group controller 8A transmits command and message data to master controllers 3A and 3B via the TXA and TXB data lines. The data send over TXA and TXB are identical. At the same time, group controller 8A receives data from master controller 3A and 3B via the lines RXA and RXB, respectively. A similar arrangement exists for each of the group controllers and master controllers illustrated in FIG. 3.

Still referring to FIG. 3, between the master controller and the systems controller level, a similar arrangement exists. That is, master controller 3A receives and transmits commands and message data to both system controller 2A and system controller 2B. As shown in FIG. 3, group controller 8A and group controller 12A are on-line, while group controller 8B and group controller 12B are on standby. As a result, the data transmitted to master controller 3A from the group controllers that are on-line are passed through master controller 3A and re-transmitted to the common control 1A and 1B via the TXA and TXB data line out of master controller 3A. This is symbolically shown by the convergence of the solid and dashed arrow lines in the master controller 3A. It must be remembered here that data transmitted on any bus, whether on the command bus 4 or on the conversation bus 5, is transmitted serially. Thus, the data from the on-line group controllers which arrive in parallel at the master controller 3A must be buffered and serialized before it is forwarded on to the common control 1. In a similar manner, data transmitted from common control 1A and 1B down to the lower levels of processor control is shown inputted to on-line master controller 6B via the RXB input line. Master controller 6B receives the data and distributes the data to the output transmit lines for the appropriate group controllers.

FIG. 2 shows that the technique of providing a redundant backup unit to each of the functional blocks in each level of processor control in the system is provided down through the terminator control level. However, it should be noted that the terminator units, such as terminator units 20 and 22, do not have a redundant backup unit.

The Conversation Data Bus

Referring once again to FIG. 1, the present invention is capable of handling a maximum of 131,072 ($2^{17}$) lines or terminations. These terminations may be operated at data rates of up to 300 baud. For the present invention, the terminations are organized into groups of 2048 terminations ($2^{11}$) that are associated with each master controller redundant pair. For a fully expanded system, there are 64 ($2^6$) master controller pairs. These 2048 terminations handled by each master controller are further divided into groups of 128 ($2^7$) terminations, with each group comprising a line group. There are 16 ($2^4$) redundant pairs of line groups (LGA and LGB) associated with each master controller pair. That is, each line group inputs its data to both line controllers A and B that comprise a redundant pair, such as line controllers 10A and 10B (see FIG. 2), and thus appears to the master controllers as a line group A (LGA) and as a line group B (LGB). Each group controller-line controller combination, such as group controller 8A-line controller 10A, may service the calls for 128 lines at 300 baud or may service 512 lines at 50 baud. Since each line group consists of 128 terminations, a group controller-line controller combination can manage up to four 50 baud line groups. As shown in FIG. 1, group controller 12-line controller 14 is shown receiving 4 conversation data bus 5 input lines since line controller 14 is controlling 512 termination lines at 50 baud. Similarly, line controller 30 is shown receiving a single conversation data bus 5 input since line controller 30 is controlling only 128 terminations at a conversation data rate of between 50 and 300 baud.

Referring now to FIG. 2, the conversation data between a calling termination (source) and a called termination (destination) is transmitted through the telex exchange of the present invention via the conversation bus 5. The conversation bus 5 receives the source termination conversation data from the group controller-line controller combination controlling that termination and transmits that data to its associated master control. For purposes of this call, this master controller is the source master controller. The source master controller stores the received source termination conversation data in its frame memory, such as frame memory 302A and 302B of master controller 3. Additionally, the transmitted data is forwarded from the source master controller to each of the other master controllers for storage in their associated frame memories. As shown in FIG. 2, each master controller contains in addition to the frame memory 302A and 302B a vector memory, such as vector memory 300A and 300B of master controller 3. Under control of the vector memory, the data received by the destination master controller from the source master controller is transmitted by the destination master controller down to one of its group controller-line controller combinations controlling the destination termination. For this call, the master controller transmitting the data down to the destination termination is referred to as the destination master controller.

For the remainder of the discussion in this section, reference will be made to line groups and to line controllers interchangeably since a line controller will represent from 1 to 4 line groups. The following discussion describes the conversation data path from the source termination to the destination termination including its relationship to the vector and frame memories of each master controller. Data is transmitted between different processors within the present invention in a serial bit-coupled mode. That is, conversation data is transmitted as single bits of data, one following the next. Referring to FIG. 33, each Line Group transmits as a time multiplexed signal DATA and DATA* over a differential pair of wires to every master controller. DATA* is the complement of DATA and is used for detecting parity errors. That is, DATA* should be the inverse of DATA in the absence of any malfunctions. The data transmitted from the line groups to the master controllers are sampled at the master controllers at mid-bit. The signals DATA* SAMPLE and DATA SAMPLE are generated in the master controller timing circuits. Each line from each line group transmits DATA followed by DATA*. In order to handle a conversation data rate of 300 baud, the data transfer rate over the conversation bus between the line groups and the master controllers must be $2 \times 128 \times 300B = 76.8$ Kbits per second. This data transfer is referenced to the 345.6 KHz and 150 Hz clock signals generated by the system controller (see FIGS. 20 and 21). These signals are distributed to all group controller-line controller combinations and all master controllers in the system.

Vector/Frame Memory

The vector/frame memory combination, such as vector memory 300A and frame memory 302A of master controller 3A, functions to direct the flow of data from the source termination to the destination termination. This function is performed by having each frame memory in each master controller, including the redundant unit, receive and store the data transmitted by each termination connected to the exchange. A memory location is provided in each master controller for each of the 131,072 terminations serviced by the present invention.

Referring now to FIG. 27, the frame memory map is shown. Each frame memory consists of a $2048 \times 256$ bit memory organized as shown in FIG. 27. Each master controller controls 2048 terminations, one frame memory address corresponding to each termination under its control. Four bits are required to store the data (DATA) and its inverse (DATA*) for both the A and the B units of each master controller redundant pair. For 64 master controllers, 256 bits are required to store the data from each of the 131,072 terminations possible.

In order that the data stored in the frame memories, when read out, will be transmitted to the desired destination termination, the vector memory 300B is used to supply the necessary addresses to perform this function. Referring now to FIG. 31, the vector memory map is shown. Each vector memory consists of a $2048 \times 20$ bit memory where 17 bits of each addressable memory location in vector memory comprises the source termination address. This address will be used to address the frame memory and select the 4 bits from the source termination in the source master controller portion of the destination master controller frame memory to be transmitted down to the line group under control of the destination master controller that is controlling the destination termination. Also contained in each addressable memory location of vector memory is a single "active" bit which is transmitted to the destination line group along with the conversation data to indicate to the destination line controller that a conversation with this termination is in progress. The two remaining bits of the vector memory locations are used for error checking to indicate that the redundant vector memories are operating in synchronization. A more detailed description of a vector memory is given below with regard to FIG. 32.

The Line Controller-to-Line Controller Data Link

Figure 28A:
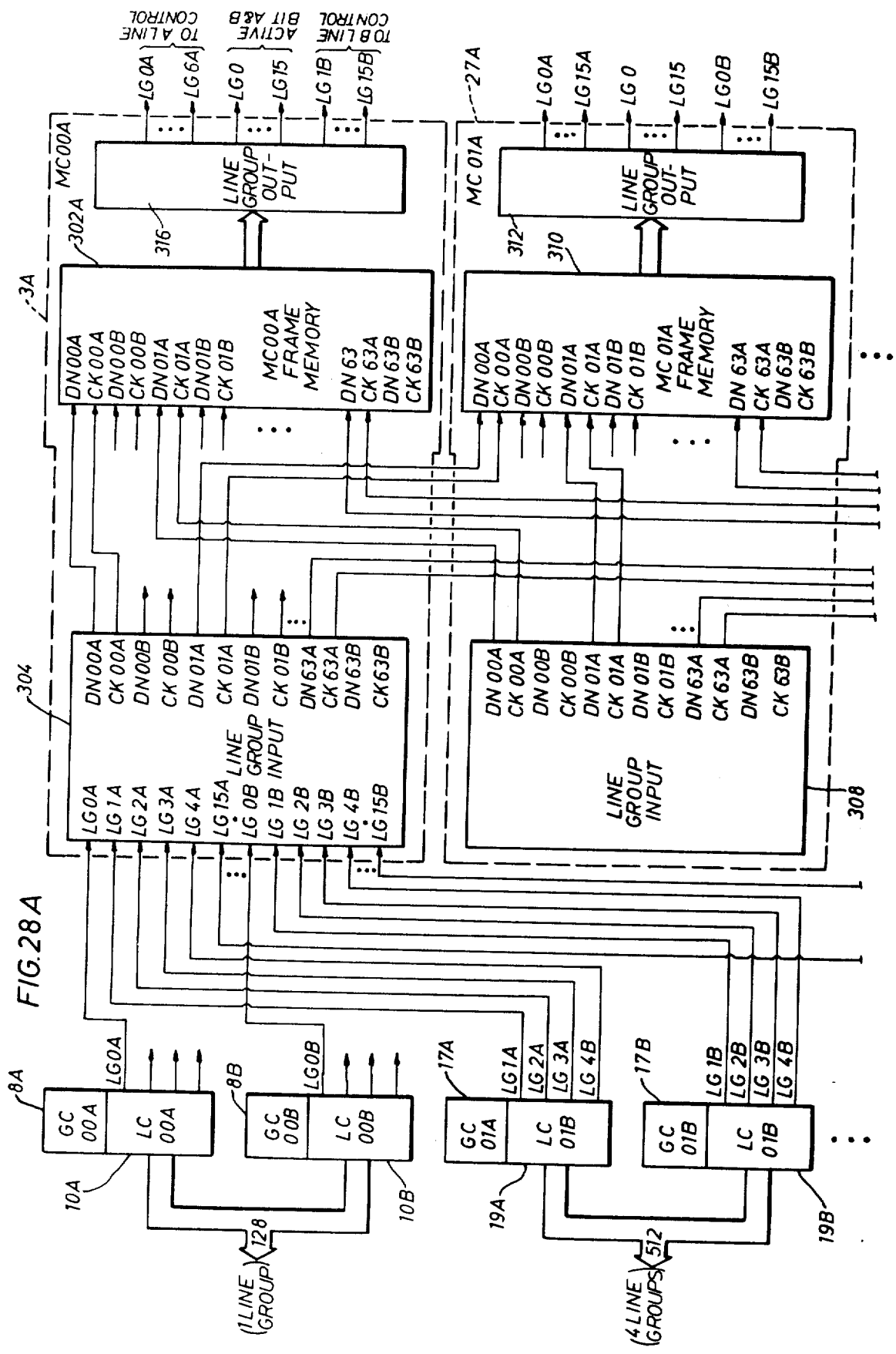
FIGS. 28A and 28B, when placed together with the latter below the former, show a block diagram illustration of the conversation bus connections between the line groups of the line controllers and the master controller, and between the various master controllers.
Figure 28B:
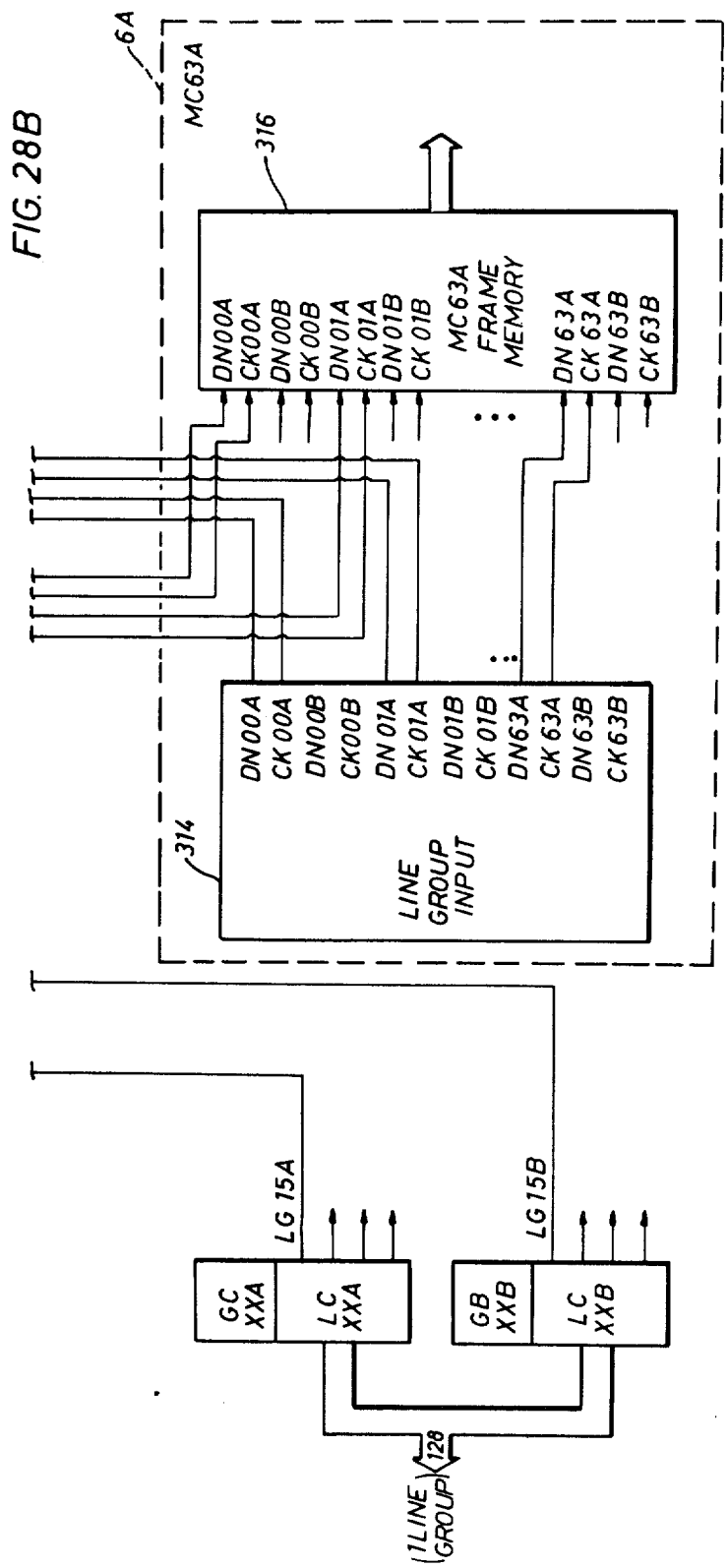

Turning now to FIG. 28, a block diagram of the conversation bus 5 connections between the line groups and the master controllers is shown. The group controller 8-line controller 10 combination (see FIGS. 1 and 2), including the redundant backup unit, is shown in FIG. 28 servicing a single line group of 128 lines while group controller 17-line controller 19 is shown controlling four line groups consisting of 512 lines. The conversation data from each line group under control of master controller 3A is inputted to line group input unit 304. Not shown in FIG. 28 are the redundant backup units to each of the master controllers illustrated (3A, 27A, 6A), it being understood that similar connections are provided to those units. Line group input unit 304 functions to serialize the data received from the sixteen line groups and to output that data onto the data (DNXXA and DNXXB) lines of conversation bus 5 for transmission to each frame memory contained in each master controller.

The data on signal lines CKXXA and CKXXB comprises a de-skewing clock signal that is transmitted along with the conversation data between master controllers. The data transferred between master controllers consists of the time multiplexed data from each of the sixteen line groups under a give master controller's control. Accordingly, the data transfer rate must be $16 \times 76.8$ Kbits per second or 1.23 Mbits per second. At such a high data rate, there can be a significant timing skew. For this reason, a clock signals in addition to the data signals are transmitted between master controllers. In addition, the data transfer rate is increased to allow a synchronization gap (2 clock pulses are inhibited) to be included in the clock transmission. This gap allows the receiving master controllers to synchronize the loading of their respective frame memories.

The data that is outputted by line group input unit 304 onto each of its output lines is identical. The busing between the line group input units 304 of each master controller to the frame memory units of each of the master controllers insures that each frame memory stores the data from every termination connected to the exchange. The signal lines as labelled on the output of the line group input units 304 signify the master controller to which the conversation data is to be transmitted. For instance, the conversation data line DN01A and CK01A 304 should be inputted to the master controller 27A (MC01A). In a similar fashion, the input signal lines labelled in the frame memory units of the master controllers signify the line group input unit of the master controller from which the data is originating. For example, the signal lines of frame memory 310 in master controller 27A (MC01A) labelled DN00A and CK00A originated with the line group input unit 304 of master controller 3A (MC00A). As a result, each frame memory in each master controller will have data and clock signals inputted from as many as 64 redundant pairs of master controllers.

The data outputted by each frame memory, under control of its associated vector memory, is inputted to the line group output units, such as line group output unit 306 of master controller 3A. A line group output unit functions to receive serial single-bit time multiplexed data from the frame memory and produce a parallel data word for the same termination number for the sixteen line groups. This parallel data word is transmitted down to the line groups. Also transmitted down to each redundant set of line groups is the active bit from the vector memory. Not shown in FIG. 28 are the line group input connections for master controller 27A or 6A since they would be similar to those shown connected to master controller 3A.

Figure 29:
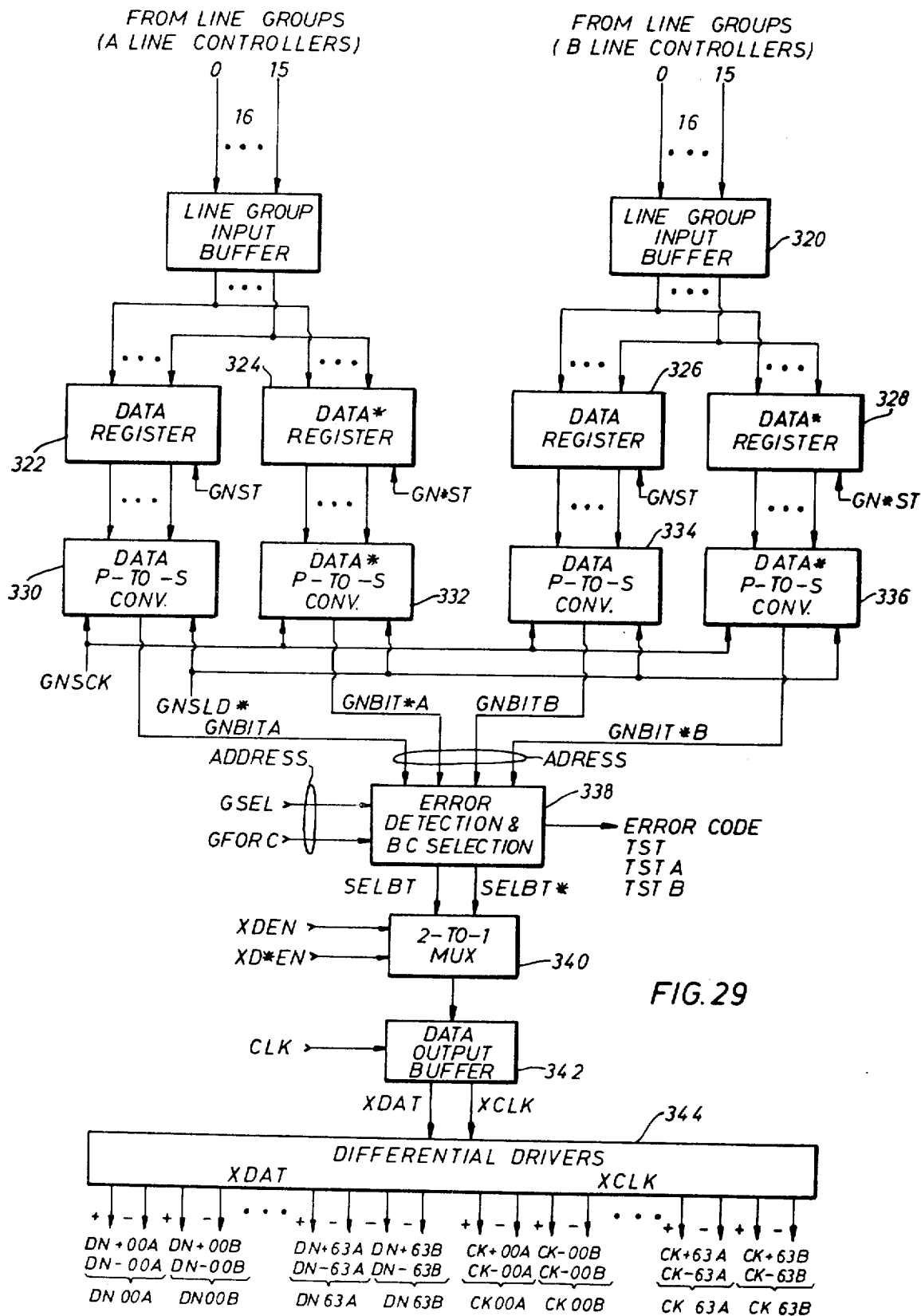
FIG. 29 is a block diagram illustration of the line group input units shown in FIG. 28.

Turning now to FIG. 29, a more detailed block diagram of the line group input units, such as line group unit 304 is shown. The sixteen data lines from both the A line groups and the B line groups are shown inputted to line group input buffers 318 and 320, respectively. As previously mentioned, each data line from each line group has a time multiplex transmission of DATA and DATA*. Data registers 322 and 324 are connected in parallel to the outputs of line group input buffers 318 and responsive to the signals GNST and GN*ST (DATA SAMPLE and DATA* SAMPLE, see FIG. 33), demultiplexes the DATA and DATA* into two 16-bit words. The outputs of data registers 322 and 324 are inputted to parallel-to-serial converters 330 and 332, respectively. Converters 330 and 332 function to convert the 16-bit parallel word received from the sixteen line groups into a serial bit stream labelled GNBITA and GNBIT*A. In a similar fashion, the signals GNBITB and GNBIT*B are produced from the 16 B line group input lines to input buffer 320. These four data lines, GNBITA, GNBIT*A, GNBITB, and GNBIT*B, are combined with the signals GSEL and GFORC to produce a 6-bit input address to error detection and GC selection unit 338. GC selection unit 338 is a PROM that outputs 5 bits, 3 bits comprising the error code signals TST, TSTA and TSTB, and 2 bits comprising selected data signals SELBT and SELBT*. The group controller selection PROM 338 is a majority vote error detection system in which the bit pattern produced by the 6-bit input address determines if there is an error in the data transmission and which data of the A or B line groups will be used.

The signals SELBT and SELBT* are inputted to a 2-to-1 multiplex unit 340 that serializes onto a single line these two signals in response to the enable signals XDEN and XD*EN. This time multiplex signal is then applied to the data output buffer 342 where it is combined with the signal clock CLK to generate the data (XDAT) and clock signal (XCLK) that is to be transmitted to each master controller in the system. The signals XDAT and XCLK are applied to differential drivers 344 to produce the 64 data and clock differential signal pairs for all of the A and B master controllers in the system. These 64 signal pairs comprise the conversation bus 5 between the master controllers.

Figure 30:
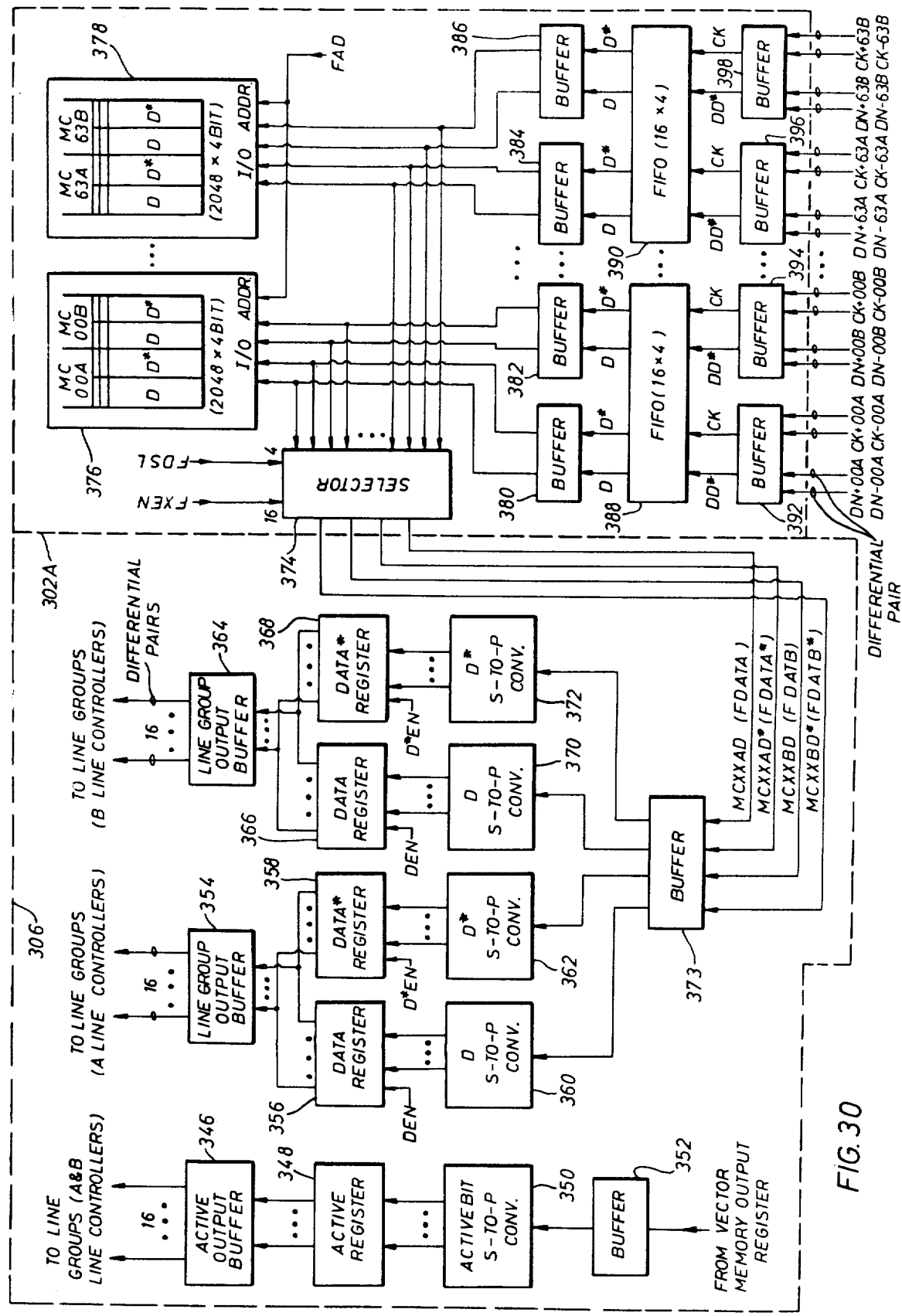
FIG. 30 is a block diagram illustration of the frame memory and line group output units shown in FIG. 29.

Turning now to FIG. 30, frame memory 302A and line group output unit 306 of master controller 3A (see FIG. 28) is shown. The frame memory 302A is shown consisting of 64 2048 × 4-bit memories, such as memory 376 and 378, sharing common address lines which comprise the addressable memory locations of the frame memory. Also shown are input buffer circuits which receive the data (DNXXA and DNXXB) and clock signals (CKXXA and CKXXB) from each of the 64 redundant pairs of master controllers, including itself, to produce the input data signals to the memory units which make up the frame memory. Buffer units 392, 394 through 396 and 398 convert and buffer the differential data and clock signals into FIFO memory units 388 and 390. FIFOs 388 and 390 function as a buffer memory area for the receive data before it is inputted to frame memory 302A. These buffer FIFOs allow for different arrival times of the data from the various master controllers to insure that the data from all of the master controllers that is to be written into frame memory unit 302A at a given address is present on the output of the FIFO's before it is written into frame memory.

Responsive to the frame memory address signal FAD, which consists of an 11-bit address outputted by the vector memory 300A (see FIG. 2), the frame memory outputs 64 4-bit data words from the memory units 376–378 into selector unit 374. Selector 374 responds to the signals FCSL and FXEN produced by the vector memory 300A, to select one of the 4-bit words and applies that data to buffer 373. This selected 4-bit word comprises the DATA (FDATA) and DATA* (FDATA*) for both the A and B master controllers.

The output of buffer 373 applies the FDATA, FDATA* for both the A and the B destination master controllers addressed by the vector memory 300A to the serial-to-parallel converter units 360, 362, 370 and 372, respectively. Each of these serial-to-parallel converter units accumulates the DATA, DATA* for the 16 line groups and respectively applies a 16-bit parallel word to data registers 356, 358, 366, and 368. The output of DATA register 356 is connected in parallel with DATA* register 358. Likewise, DATA register 366 is connected in parallel with DATA* register 368. Responsive to the enable signals DEN and D*EN, the parallel DATA and DATA* data from the paralleled data registers are respectively inputted to line group output buffer units 354 and 364. These two output buffers respectively apply the 16-bit parallel data to the 16 line groups for both the A and the B line controllers under control of this master controller 3A. The outputs of line group output buffers 354 and 364 comprise the conversation bus 5 data transmitted from the master controller down to the line controller.

Figure 20:
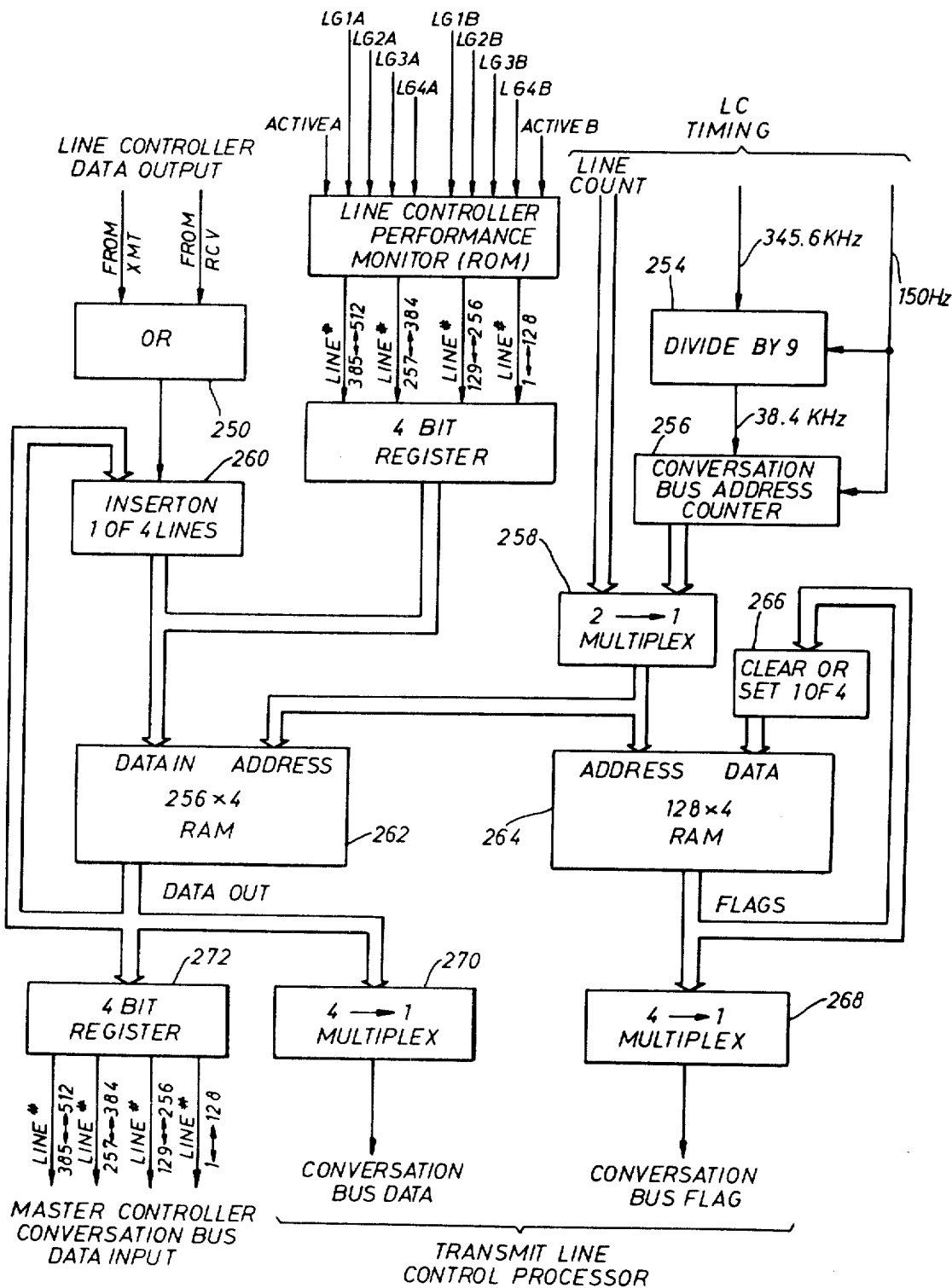
FIG. 20 is a block diagram representation of the conversation bus interface shown in FIG. 4.

In addition to the line groups DATA and DATA* data, the active bit from the vector memory is applied to buffer 352 whose output is applied to serial-to-parallel converter 350. This converter produces an active bit signal for each of the 16 line groups. The output of the serial-to-parallel converter 350 is applied to the active bit register 348 whose output is applied to the active output buffer 346. The output of active output buffer 346 comprises the active bit that is transmitted to both the A and B line controllers. The various line group conversation bus 5 data signal lines from the master controllers down to the line controllers are distributed to the various line controllers according to the number of line groups under each line controller. Referring to FIG. 20, the active bit and both the A and the B line group conversation bus 5 signal lines for a line controller that controls 4 line groups are shown inputted to the conversation bus interface 80 (see FIG. 4) of the line controller 10.

Vector Memory

Figure 32:
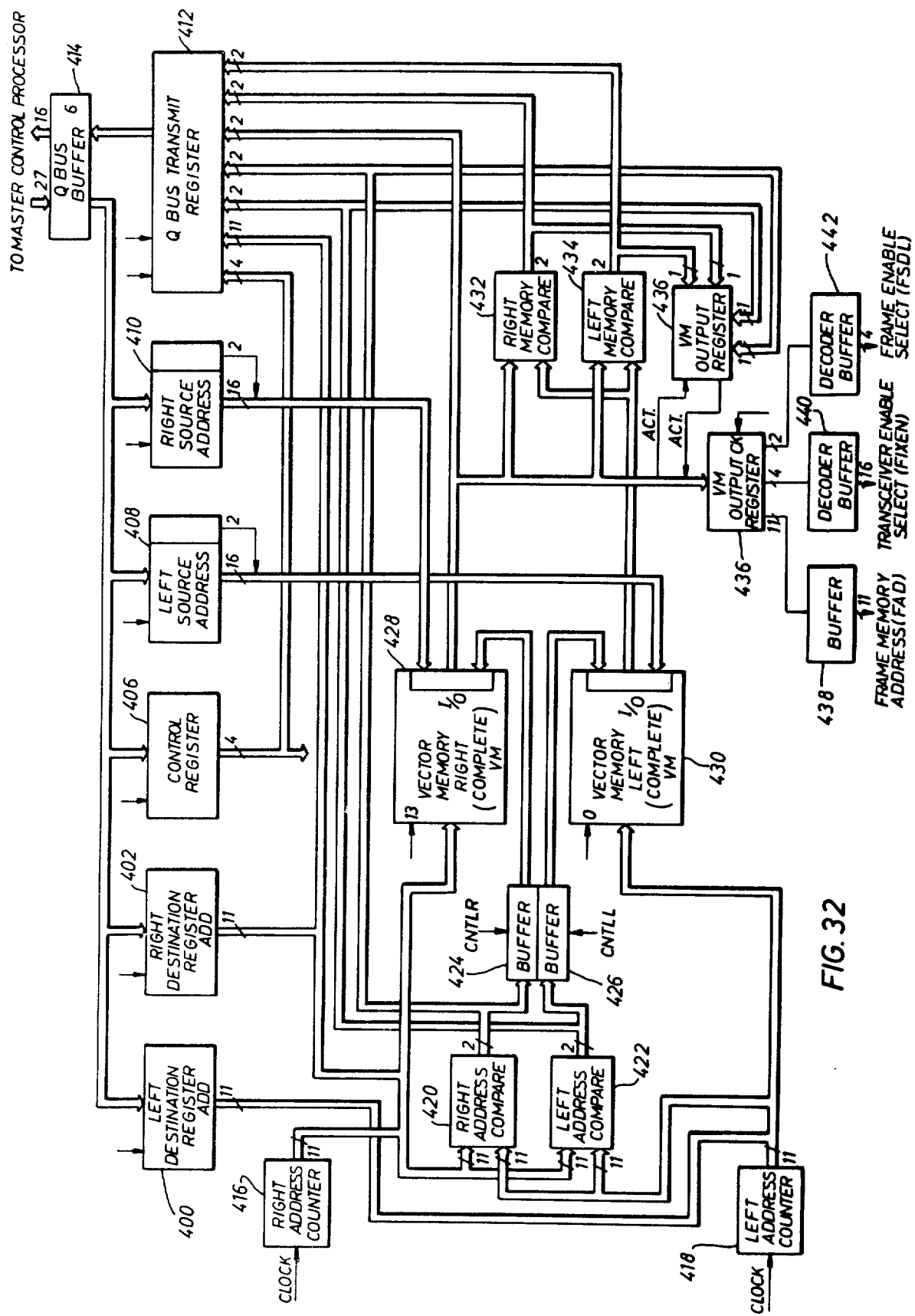
FIG. 32 is a block diagram illustration of the vector memory.

Turning now to FIG. 32, access to the vectory memory 300A from the controller processor 3A takes place via three independent read/write registers. These registers are labelled: the Source registers 408 and 410, the Destination registers 400 and 402 and the Control register 406. The Destination registers 408 and 410 are loaded with the vector memory address to be used when reading and/or writing to the vector memory from the master controller processor. This address corresponds to the destination terminations connected to a given master controller. The Source registers 400 and 402 are loaded with the data to or from the vector memory. This data corresponds to the source termination which is to be coupled to a given destination termination. This data is supplied to the vector memory from common control when a call begins. The Control register 406 contains the higher order master controller address bit, information that controls the vector memory operation, and the active bit.

For a given address of vector memory to be written into or read from, the Destination and Source registers must first be set, then a write into the Control register must follow. This write operation enables the vector memory to access the Destination and Source registers.

Vectory memory 300A stores data source addresses in redundant right and left memory locations corresponding to data destination addresses. Then the vector memory 300A is addressed sequentially in order of destination address. Each destination address generates a source address at the memory output. This source address is used to address frame memory 302A which contains conversation data from that source in that address.

The master controller 3A processor loads the destination address into the left 400 and right 402 Destination registers and the source address into the left 408 and right 410 Source registers. Then it loads the Control register 406 with instructions to load the contents of the Source registers into the vector memory 300A locations addressed by the Destination registers. Comparators 420 and 422 are used to check the contents of the right and left destination registers against one another, and the results of the comparison are loaded as bits 18 and 19 into the vector memory 300A along with the source data (see FIG. 31).

Vector memory 300A is read upon command from the Control register 406. Selected locations can be read by the master controller 3A processor through the use of the Destination and Source registers, or, during normal call coupling, it is read as counters 416 and 418 step sequentially through their destination addresses. The master controller 3A processor reads the vector memory 300A by loading the device destination address into the Destination registers and loading the Control register 406 with commands to read the right vector memory 428. The left vector memory 430 cannot be read, but its contents can be compared with the contents of the same location in the right memory 428. The results of this comparison can be read by the master controler 3A processor. All data read by the processor is read through the VM transmit register 412.

Data from the vector memory 300A to the frame memory 302A is read under control of the left 418 and right 416 address counters and the Control register 406. The address counters, enabled by the Control register 406, step sequentially through the destination addresses. Each read command to the vector memory 300A then produces a 20-bit word at the right 428 and left 430 vector memory outputs. The two words produced are compared for identity and comparison signals are generated, the same or not the same. These signals are connected to the vector memory transmit register 412 where they may be read by the master controller processor. The low-order eleven bits from the right vector memory 428 are used to address the frame memory 302A. These bits are buffered through buffer 438 as frame memory address lines, FAD. Bits 11 and 12 are used to generate the frame enable select signals FCSL. Bits 13 through 16 are used to generate the transceiver enable select signals FXEN. Together FSCL and FXEN are inputted to selector 324 of vector memory 302A (see FIG. 30) to select the source master controller data in frame memory (A and B, DATA and DATA*) to be used. Bit 17 is the active bit. This bit is gated by the address compare signals from address comparators 420 and 422 and, in the event of a comparison failure, the active bit will be blocked. Bits 18 and 19 are the address comparison bits, and are used for error checking of the vector memory.

Conversation Data Bus Error Detection

To achieve the goals of reliability in the handling of calls by the present invention, redundant backup units at all levels of processor control have been incorporated. To utilize this redundancy in furtherance of this goal, an effective means for detecting the presence of errors in the transmission of data through the system has been provided. In other words, hardware error detection circuits have been provided to detect the presence of errors in the conversation bus 5 data transmission so that both hardware and software decisions may be made as to which redundant pairs of controllers will be on-line or in standby, and whose data will be used by the receiving unit.

Each unit that receives data from the conversation bus 5 has a performance monitor or error detection circuit that responds to the signals received over the bus to detect the presence of errors, to output error codes for processor access when errors are detected, and to make a hardware selection of the best data that was received. For the present invention, data on the conversation bus 5 for each termination is transmitted in a bit-controlled mode as a serial stream of bits over a single line. Parity for each bit is transmitted immediately after each data bit where the parity bit is the complement of the data bit (DATA and DATA* where DATA* is the parity bit for DATA).

Conversation bus 5 error detection occurs at three different points: on data received from the line controllers at the master controller level, on frame memory data received by each master controller from the other master controllers, and for the data received by the line controllers from the frame memory of its associated master controllers.

Transmitting Line Controller-to-Master Controller

Referring now to FIG. 29, the data and parity from the 32 line controllers (16 A line controllers and 16 B line controllers) connected to a master controller are loaded into two pairs of 16-bit registers. These registers are shown in FIG. 29 as registers 322, 324, 326 and 328. One pair of registers, 322 and 324, contain the data and parity bits from the A line controllers and the other pair, 326 and 328, contain the data from the B line controllers. The contents of these registers are serialized and shifted out before the next set of data is loaded into the registers. Parity is checked on both sets of data as it is shifted out. This function is performed by the error detection and GC selection unit 338. The bit pattern from the serialized data from each register is used to form the address of a ROM. The ROM is programmed to take a majority vote based on the bit pattern to select either the A or B line controller data to be used by this master controller, and to output three error signals which indicate a data non-compare (TST) (the data from both the A and B line controllers are suppose to always be the same), a parity error exits in the A line controller data (TSTA), and a parity error exists in the B line controller data (TSTB).

Figure 34:
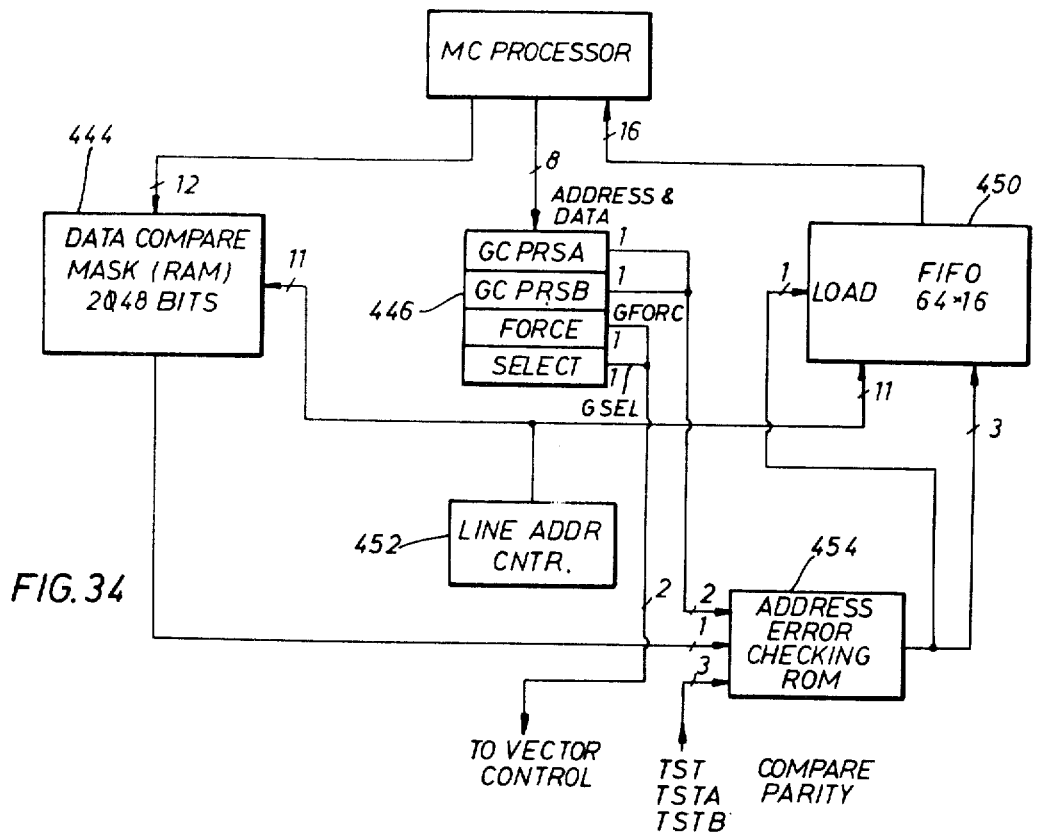
FIG. 34 is a block diagram representation of the error detection circuits for detecting errors on the line controller-to-master controller conversation bus.

Referring now to FIG. 34, each master controller can have up to 32 line controllers connected (16 A and 16 B line controllers). However, if all 32 are not connected, a reporting of parity errors from unconnected line controllers must be inhibited or the master controller would be deluged with spurious error reports. To inhibit this error report, RAM 446 is provided. RAM 446 is a 16×4 bit random access memory unit in which each word location contains four bits of control information, group controller A present (GC PRES A), group controller B present (GC PRES B), force control bit (GFORC) (see FIG. 29) and select control bit (GSEL) (see FIG. 29). The control bits GC PRES A and B indicate the presence or absence of its respective group controller, while GFORC is used to force a selection of controller A or B over the auto selection, and GSEL is used to favor a selection of either the A or B controller but allowing the auto selection circuits to switch over if errors are detected. Addressing of RAM 466 is synchronized to the shifting of the data out of the registers 330, 332, 334 and 336 as shown in FIG. 29.

The transmission of conversation data from the line controllers is synchronized by the system clocks so the outputs of redundant line controller pairs should always match. However, there are periods where data representing specific termination line outputs will not match. For example, during call set-up. Once a conversation is established, the data for that termination must be the same for both line controllers. To prevent spurious mismatch (data error TST) during these periods, a line data compare mask (RAM) 444 is provided. The RAM 444 is loaded by the master controller processor with a logic bit for each termination (2048) under the master controller during the periods of each cell in which the parity compare should be inhibited for a termination.

The output from registers 446 and 448, along with the output of data compare mask 444 and error detection ROM 338 (see FIG. 29) are inputted to error checking ROM 454 as an address. The bit pattern of the address is unique to a given condition and the contents of the ROM 454 addressed by this pattern will be the error code to be sent to the master controller processor. The output of error checking ROM 454 is three error signals which indicate if the A line controller failed its parity check, if the B line controller failed its parity check and if a data compare between the A and B line controllers failed its check. These error signals are loaded into a 64×16 FIFO 450, along with the output of line address counter 452 which indicates the termination whose data is being error tested.

Master Controller-to-Master Controller

Figure 35:
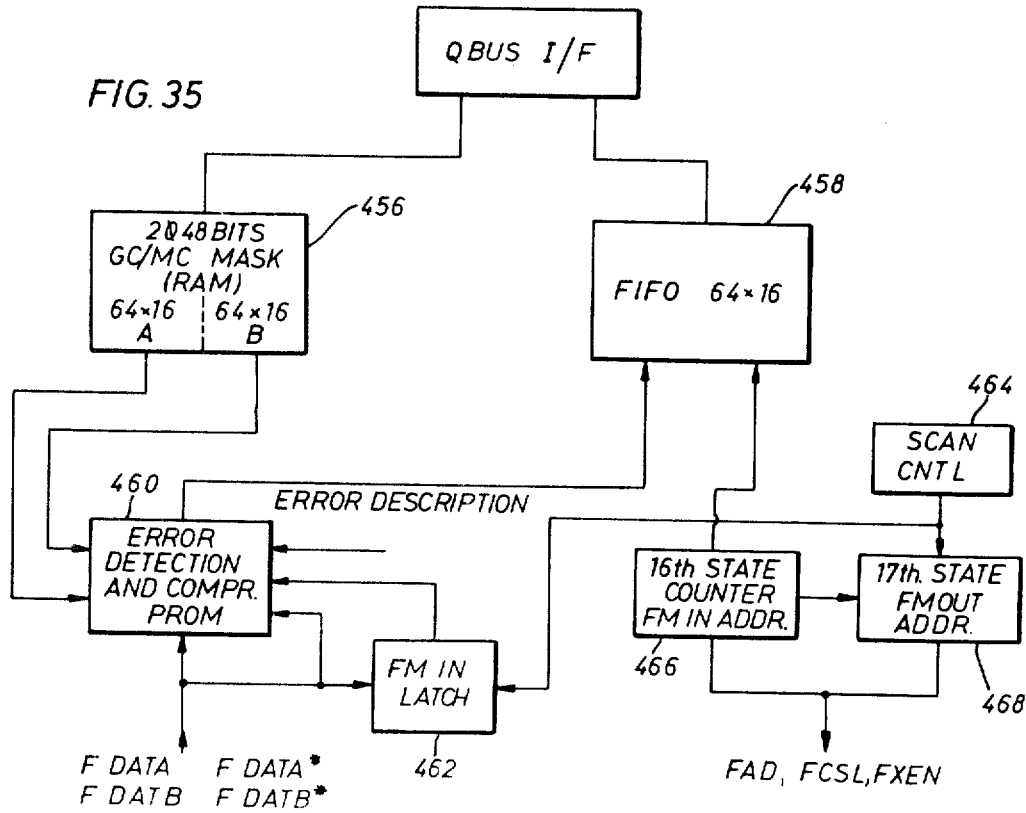
FIG. 35 is a block diagram representation of the error detection circuits for detecting errors on the master controller-to-master controller conversation bus.

Referring to FIG. 35, when conversation data is received by a master controller from the other master controllers, the data is synchronized and loaded into frame memory. FIFO's 338 and 390 (see FIG. 30) buffer 4-bit data word for every potential termination in the system.

The data on the frame memory I/O bus (FDATA, FDATA*, FDATB, FDATB* (see FIG. 30) is checked on a cyclic basis prior to writing into frame memory. Parity of the bit pair (DATA, DATA*) from each master controller must check and the data from redundant pairs must match if all equipment is present and functioning properly. However, all equipment may not be present. A standby master controller may not exist temporarily, master controllers may not have their full complement of line controllers, etc. To prevent the master controller processor from being swamped by spurious error reports caused by equipment known to be missing, error checking is selectively enabled. A mask register 456 containing a mask bit for every line controller under each master controller, both on-line and standby is provided. This register 456 is loaded by the master controller processor. It may also be read by the processor.

The operation of frame memory is also tested in background mode. Periodically, every location of frame memory is read and compared with what was written into it. This allows frame memory errors to be detected independent of reading by vector memory. This is very desirable, since the time between vector memory access of a given frame memory location is indeterminate.

The integrity of data that is being written into frame memory is checked in the following manner. The data and parity that are being written into frame memory from one pair of selected master controllers are also inputted to the error detection and compare PROM 460. The same master controller outputs will be tested for 16 write cycles. This allows one bit of data arriving from each of the 16 line groups under the selected master controller to be checked. The data applied to the error PROM 460 input during one of the cycles is also written into a holding register 462. During the time that would be the seventeenth frame memory cycle, nothing is written into frame memory. Instead, the frame memory word that was written into when the holding register 462 was loaded is read and compared with the contents of the register. The register specifying the master controller pair to be tested is then incremented and the process is repeated for the next pair. When all master controller pairs have been tested, the master controller specifying register is re-initialized and the register specifying which of the 16 frame memory locations being written into will be checked.

The error detection logic is selectively disabled by the mask register 456. If a master controller is missing, the masks of all 16 line groups would be under its control are set to the absent state. This will inhibit performing any parity checks on data that would be arriving from it and also inhibits data comparisons with its twin. When an error is detected, the transmitting master controller and line controller address and the type of error are strobed into FIFO buffer 458 which can be read by the master controller processor.

Parity and data compare checks on two data bits from each line groups are made very frame time (3.33 ms) or faster. One data bit from every telex line in the system will be checked every 64 frame times (213.3 ms) or faster. Every location in frame memory will be checked 1024 frame times or 3.413 seconds.

If line controller absent mask 456 is set, but the corresponding mask for its twin is not, the receiving master controller will transmit the data and parity associated with the non-absent device on both data lines going to the selected destination line controller. This forced matching is to prevent spurious data mismatches and parity errors from being detected by the destination line controller. This function cannot be performed in the destination line controller since the line controller has no way of knowing what the orginating line controller was.

Master Controller-to-Receiving Line Controller

Referring now to FIG. 20, each line controller receives two copies of each bit of data from each of the redundant pairs of master controllers above it. This is shown in FIG. 20 as the line group signals LG1A-LG4A and LG1B-LG4B plus the active bits ACTIVE A and ACTIVE B. As previously discussed, each data bit arrives on a separate line and is accompanied by a parity bit which is time division multiplexed on the same line on the data bit with which it is associated. All of the incoming conversation data bus 5 lines are inputted to the line performance monitor (ROM) 251. Parity is checked on each incoming line, unless error checking on that line has been masked off. If a parity error is detected, it is written into an error file buffer along with the destination line address. The contents of the error file buffer is accessed by the group controller processor for error analysis. Since each line controller can have from one to four line groups under its control, four error check inhibit masks are provided, one for each arriving conversation bit 5 line.

The outputs of the lines which have not been masked are entered into a majority voting network (ROM 251) as an address. The contents of ROM 251 will output an error code to an error file register if any unmasked data lines are different, and the data conversation selected by ROM 251 to be applied to 4 bit register 252.

The Command Bus

Referring once again to FIG. 3, all communications among processors in the distributed processing telex exchange of the present invention are conducted via the command bus 4. The processors at all levels of active control (common control, master control, group control) are interconnected through redundant pathways to both the higher and lower level processors. Any processor may transfer data to the processor of any device connected to it by the command bus 4 via program controlled transfers. Each processor at each level contains a transmitter which sends identical data to a redundant pair of processors on the next higher or lower level of control (TXA and TXB). Each processor also contains a pair of receivers which receive identical (ideally) data from the redundant pair of processors on the next higher or lower levels of control (RXA and RXB).

The hardware circuitry contained by each processor to perform the transmit and receive functions respond to program control through a set of addressable register, which include a command port (write only), a receive status port (read only) and a transmit status port (read only). For the preferred embodiment, each register is 16-bits long with each bit having the following functional assignments:

Command Register

| Command Bit | Command Mnemonic | Command | Description |
|---|---|---|---|
| 15 | TABORT | Transmit Abort | TABORT causes the hardware to discard the current transmit message. It also resets TOVF. |
| 14 | ZTX | Initialize Transmitter | ZTX resets the microprocessor that controls the transmitter. |
| 13 | ZRXB | Initialize Receiver B | ZRXB resets the microprocessor that controls the B receiver. |
| 12 | ZRXA | Initialize Receiver A | ZRXA resets the microprocessor that controls the A receiver. |
| 11 | ZRQUE | Initialize Receiver Queue | ZRQUE clears the receiver message buffer queue. |
| 10 | MRSET | Reset | Reset transmitter buffer memory. |
| 9 | TEOM | Transmit End of Message | TEOM causes the hardware to terminate the current message and prepare for a new one. |
| 8 | RCOMP | Read Complete | RCOMP causes the hardware to clear the current receive status and to present new status and data when available. All receiver error flags are cleared also. |
| 7 | LLCL | Loop Local | LLCL connects both receivers to the local transmitter. This allows a processor to test its own command bus hardware. |
| 6 | FAIL | Fail Light | Lights red "Board Bad" LED on front panel. |
| 5 | ON-LINE | On-Line Light | Lights green "Board On-Line" LED on front panel. |
| 4 | RUN | Run Light | Lights yellow "RUN" LED on front panel. |
| 3 | RDISA | Receiver A Disable | RDISA causes the A receiver to stop processing messages. |
| 2 | RDISB | Receiver B Disable | RDISB causes the B receiver to stop processing messages. |
| 1 | TDOA | Transmit Disable Override A | TDOA causes the transmitter hardware to ignore any Receiver Full signal from the corresponding destination A receiver. |
| 0 | TDOB | Transmit Disable Override B | TDOB causes the transmitter hardware to ignore any Receiver Full signal from the corresponding destination B receiver. |

Receive Status Register

| Status Bit | Status Mnemonic | Status | Description |
|---|---|---|---|
| 15 | RDATA | Receive Data | RDATA is set as soon as valid status and message data are available. RDATA is negated when RCOMP is set. |
| 14 | ON-LINE | On-Line | ON-LINE indicates the state of the performance monitor connected to the Remote Transmitter at the time of message initiation. |
| 13 | CHERR | Channel Error | CHERR is set if there is a CRC error, a receiver error, a receiver overflow, or an incomplete error. It is the logical OR of MINC, CRCERRM and RXERR. (See bits 8-11). |

Receive Status Register

| Status Bit | Status Mnemonic | Status | Description |
|---|---|---|---|
| 11 | MINC | Message Incomplete | MINC is set if a necessary part of a message, such as SOM or EOM occurs out of order. |
| 10 | CRCERR | CRC Error | CRCERR indicates the message failed the CRC check. |
| 9 | RXERR | Receive Error | RXERR is set upon detection of a receiver overrun, framing error or parity error. |
| 8 | ROVF | Receiver Overflow | ROVF indicates one or more preceding messages have been lost. It appears in the first message received after a lost message. |
| 7 | OVRD | Overread | OVRD is set if the processor attempts to read the receiver buffer when either no message is available or RCOMP has not been set. OCRD is reset when RCOMP is set. |
| 6 | EOM | End of Message | EOM is set when the final message byte has been read from the data port. |
| 5 | RXID | Receiver Identification | RXID indicates that the message and status are from the B receiver. Otherwise they are from the A receiver |
| 4 | LLCL | Loop Local | LLCL indicates the state of the LLCL command bit. |
| 3 | RDISA | Receiver A Disable | RDISA indicates the state of the RDISA command bit. |
| 2 | RDISB | Receiver B Disable | RDISB indicates the state of the RDISB command bit. |
| 1 | ROKA | Receive A OK | ROKA indicates that the A receiver is processing character data. This bit is reset by the hardware if input data is not present or if the receiver processor cannot function properly. |
| 0 | ROKB | Receive B OK | ROKB indicates that the B receiver is processing character data. This bit is reset by the hardware if input data is not present or if the receiver processor cannot function properly. |

Transmit Status Register

| Status Bit | Status Mnemonic | Status | Description |
|---|---|---|---|
| 15 | TWARN | Transmit Buffer Warning | TWARN is set when the transmit buffer has room for less than one message. |
| 14 | MOR | Receiver Output Buffer ready | Message waiting in receiver output register. |
| 13 | NEGSUP | Negative Supply | -12 converter on CBI board failed. |
| 12 | ORA | Output Ready A | Receiver A FIFO has a complete message in it. |
| 11 | ORB | Output Ready B | Receiver B FIFO has a complete message in it. |
| 10 | LATCH | Receive Latched Up | Message being moved to receive common memory from one of the receivers. |
| 9 | CRDR | FIFO Data Ready | Message waiting in transmitter output FIFO. |
| 8 | TOK | Transmitter OK | TOK is set when the transmitter is processing character data. It is reset by the hardware if the transmitter cannot function properly. |
| 7 | TOVF | Transmit Overflow | TOVF is set by the hardware if the transmitter processor attempts to write into a buffer that is full or not ready. TOVF is reset by the program when TABORT is set. |
| 6 | ROLA | Receiver A On-Line | ROLA indicates that the destination A receiver connected to the transmitter is on-line. The destination Performance Monitor controls the state of this bit. |
| 5 | ROLB | Receiver B On-Line | ROLB indicates that the destination B receiver connected to the transmitter is on-line. The destination Performance Monitor controls the state of this bit. |
| 4 | MDRB | Message Data Ready | Message waiting in transmitter input FIFO. |
| 3 | TDOA | Transmit Disable Override A | TDOA indicates the state of the TDOA command bit. |
| 2 | TDOB | Transmit Disable Override B | TDOB indicates the state of the TDOB command bit. |
| 1 | RBF | Receiver B Full | RBF is set when the buffer of the remote B receiver connected to the transmitter is full. The transmitter then halts transmission to that receiver unless TDOB is set. |
| 0 | RAF | Receiver A Full | RAF is set when the buffer of the remote A receiver connected to the transmitter then halts transmission to that receiver unless TDOA is set. |

The command data that is transmitted between the processors of the present invention is composed of message data (MSG data) and control/status data. This information is transferred to receiving devices over two serial asynchronous data links, one link for the MSG data and one for the control/status data. MSG data is encoded and transmitted as serial 8-bit start-stop characters. Each character carries one byte of data. FIG. 36 illustrates the format for an 8-bit data byte transmitted over the data links. The following TABLE 1 lists the bit assignments for each byte of command data.

TABLE 1

| Bit = | 0 | 1 | 2 | 3 | 4 | 5 | 6 | 7 |
|---|---|---|---|---|---|---|---|---|

TABLE 1-continued

| $2^0$ | $2^1$ | $2^2$ | $2^3$ | $2^4$ | $2^5$ | $2^6$ | $2^7$ | |
|---|---|---|---|---|---|---|---|---|
| | | | | | | | | = MSG data and CRC |
| 1 | 1 | 1 | 1 | 1 | 1 | 1 | 1 | = idle character |
| X1 | X2 | X3 | RAF | RBF | ROLA | ROLB | PARITY | = control/status |

| | |
|---|---|
| X1 | Binary coded data link control; SOM (start of message), |
| X2 | EOM (end of message), MD (message data), idle (idle |
| X3 | character), ABORT (message abort) |
| RAF | receiver A data buffer full |
| RBF | receiver B data buffer full |
| ROLA | receiver A on-line |
| ROLB | receiver B on-line |
| PARITY | Parity computed on bits 1–7 (even) |

Each message has a maximum length of ⊖ bytes of character data. A CRC (cyclic redundancy check character(computed by the transmitter follows every message. The following TABLE 2 lists the basic message formats:

TABLE 2

| | | | CONTRO/STATUS | |
|---|---|---|---|---|
| BYTE NO. | DATA | SOM, | EOM, | MD |
| Terminator related MGS: | | | | |
| 0 | Function Code | 1 | 0 | 0 |
| 1,2 | Terminator Number | 0 | 0 | 1 |
| 3–N | MSG Data | 0 | 0 | 1 |
| N+1 | CRC | 0 | 1 | 0 |
| Processor related MSG: | | | | |
| 0 | Function Code | 1 | 0 | 0 |
| 1 | Processor ID | 0 | 0 | 1 |
| 2–N | MSG Data | 0 | 0 | 1 |
| N+1 | CRC | 0 | 1 | 0 |
| Idle Character | | | | |
| All | Programmable (all 1's) | 0 | 0 | 0 |

When no messages are being sent, idle characters composed of all 1's are transmitted. Thus, if data flow halts, a hardware failure may be assumed. Information is transferred between processors on the message link only when the transmit buffer is not empty and the receive buffers are not full.

Referring now to TABLES 1 and 2, information is transferred continuously on the control/status link. A status byte is generated for each message byte sent. SOM is asserted concurrently with only the first byte of a message, and EOM is asserted concurrently with the CRC character that follows each message. MD is asserted whenever a data byte is being transferred while ABORT, which may be asserted in any status character, is used to terminate a faulty message. ROLA and ROLB (receiver A and receiver B On-Line) signals are provided by the transmitting processor and are used to indicate receiver status to the transmitters connected to them. RAF (receiver A Full) and RBF (receiver B Full) are asserted by a receiver when the receive buffers become nearly full. This signal is asserted long enough before actual overflow occurs in order to ensure that no data in transmission is lost. In most cases, the transmitter would halt soon enough to prevent buffer overflow and loss of message text. Destination receive buffer status is ignored if the corresponding TDOA or TDOB transmit disable override is asserted.

Transmitter Operation

Referring now to FIG. 37 which illustrates a block diagram of the buffering of message data between the processor and the transmitter, message transmission begins when the first byte of a message is written into the data port and continues as successive bytes are written. The message is terminated by setting EOM in the command port. If the input buffer to the transmitter becomes full, TOVF will be set if an attempt is made to transfer more data into the buffer. The buffer may be cleared by asserting TABORT in the command port. TABORT also clears TOVF.

Messages pass thrugh three stages of buffering between the processor and the transmitter output. As illustrated in FIG. 37, the stages are: single message FIFO 500, multiple message FIFO 502, and RAM message FIFO 504. Data bytes are loaded into FIFO 500 by the processor. SOM is asserted by the hardware when the first byte is loaded into an empty FIFO 500. A maximum of 63 bytes may enter FIFO 500 as a single message before EOM is asserted after the last message byte. The hardware, upon detecting an EOM, moves the message to FIFO 502. FIFO 502 holds up to 12 messages, including an EOM indicator for each message. FIFO 504 is an extension of FIFO 502 and is under control of the transmit processor. (Each receive port and each transmit port of every processor contains a microprocessor dedicated to performing its respective function. For the preferred embodiment of the present invention, Intel Corporation Model 8085 microprocessors are used.) Here, a leader byte containing the message length is appended to the beginning of the message and a CRC byte, computed by the transmit processor, is appended to the end of the message. This processor also generates a control/status byte to accompany each message byte.

Message bytes and control/status bytes are output continuously in a serial format from the transmitter. The transmitter output drive two identical sets of differential line drivers that are distributed to the next level of processors.

Receiver Operation

Referring now to FIG. 38, each command bus 4 receiver accepts inputs from the two transmitters associated with the redundant pair of sending devices. Receive messages pass through four stages of buffering between the receiver input and the controller processor. As illustrated in FIG. 38, the stages are: RAM message FIFOs 506 and 510, single message FIFOs 508 and 512, multiple message FIFO 514, and single message FIFO 516. Data arrives via the serial link from the transmitters. Two independent receivers (8085 uc) process message data from the redundant transmitters.

A UART (Universal Asynchronous Receiver/Transmitter) accepts the incoming data, converts it to a parallel format, and raises a Data Ready flag. The receiver processor recognizes the Data Ready flag and accepts the first control/status byte. After checking for data or status errors, a CRS is computed and the incoming message is stored in FIFO 506(A) or 510(B). Messages are transferred one at a time (FIFO 508(A) or 512(B)). From FIFO 508 and 512, messages are transferred alternately from the A and B receivers as long as no errors are detected. Upon occurrence of an error in either side, an alarm indication is generated and the message from the side in error is disregarded. Messages are transferred one-at-a-time to FIFO 516 and, as EOM status is verified, the messages are made available to the controller processor.

The Group Controller-Line Controller Combination

As previously mentioned with regard to FIG. 1, the group controller-line controller combination, operating through the terminator control units and the terminator units themselves, produces the signaling sequences required by the protocol signaling between a telex termination and the telex exchange of the present invention for both a call set-up and for a disconnect sequence.

Figure 4:
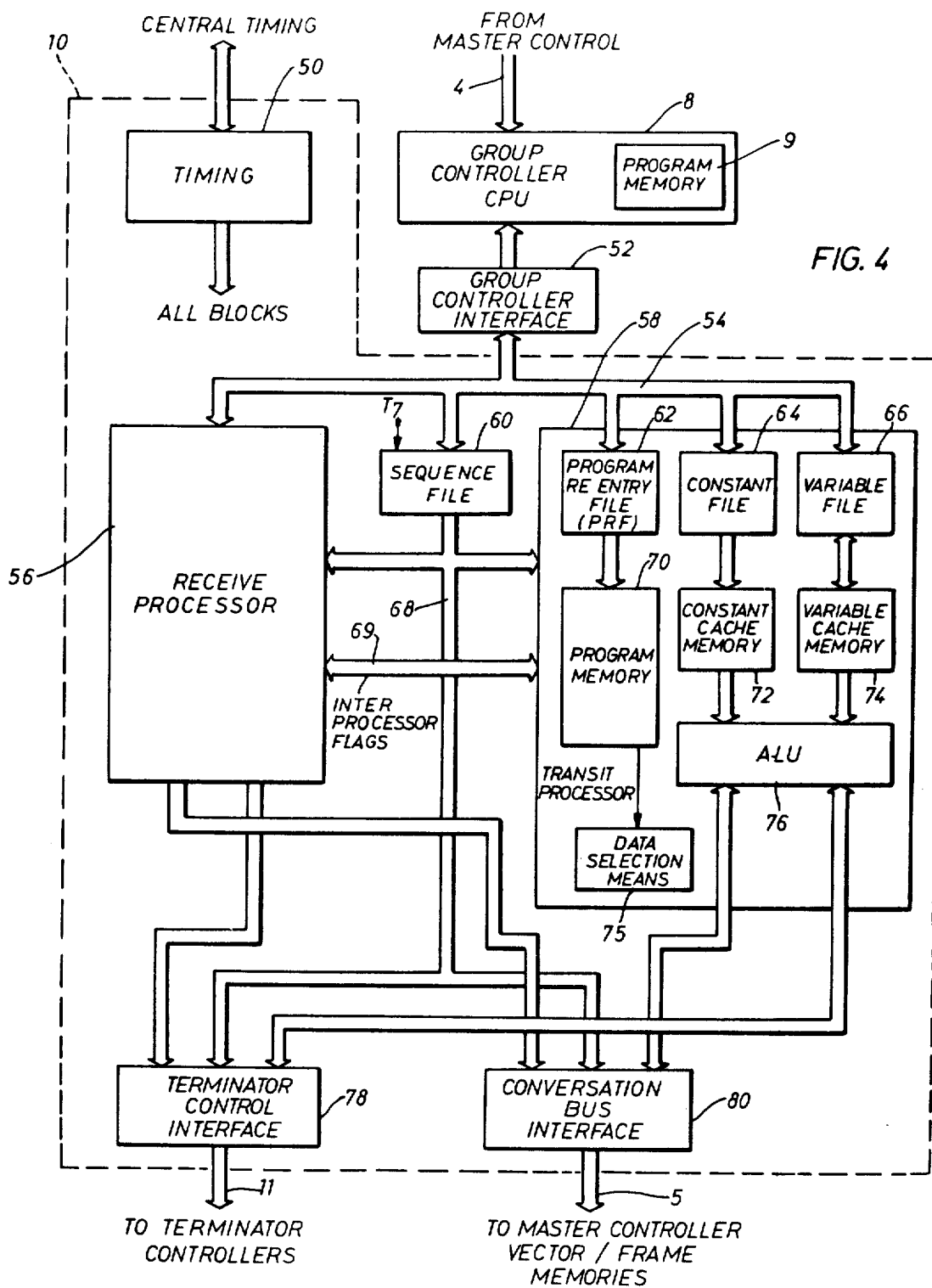
FIG. 4 is a block diagram representation of a typical group controller-line controller combination (redundant unit not shown) illustrated in FIGS. 1 and 2.

Turning now to FIG. 4, a block diagram representation of the group controller 8-line controller 10 combination is shown. Although FIG. 4 illustrates only a single block for both the group controller 8 and the line controller 10, it is to be understood that there is a standby unit that is functioning in parallel to those shown and discussed below. The data busing necessary to effectuate this connection has been discussed previously. Referring to FIG. 4, group controller 8 is illustrated as having a program memory 9 which contains the group controller software routines which are executed in conjunction with the firmware signaling routines of the line controller 10 to produce the desired signalling sequences in the termination lines that are under control of this group controller-line controller combination. A detailed discussion of the structure and oganization of program memory 9 is given below both with regard to FIG. 21 and in a discussion of an example of how a particular type of signaling sequence is produced by the present invention. As part of the group controller 8 is the group controller interface 52 through which the group controller 8 communicates with the line controller 10. It should be noted here that all data transfers, both to and from the line controller 10 are initiated by the group controller 8.

Still referring to FIG. 4, line controller 10 is shown including a timing unit 50 which responds to the central timing signals from the system clock 7 of common control 1 to provide the necessary clocking signals to the functional blocks of the line controller 10. Connected to the group controller interface 52 is a bi-directional data bus 54 which enables the group controller 8 to transmit and receive data from the line controller 10 functional blocks. The line controller 10 consists of two identical microprogrammed processors, one for the receive function and (receive processor 56) and one for the transmit function (transmit processor 58). Both the receive processor 56 and transmit processor 58 perform their respective functions on a particular termination line according to the contents of the sequence file 60 shown in FIG. 4. The sequence file 60 is connected to the group controller 8 via the data bus 54 and group controller interface 52. Processing of each termination line under control of this group controller-line controller combination is done on a time share basis during time share intervals by the line conroller 10. That is, each termination is given a predetermined interval of time within which the microprogrammed instructions for the line controller signaling routines selected for this termination are executed to generate the signaling required by each termination. At the completion of each time share interval, the program execution for the next termination to be time share processed begins execution where program execution left off the last time that this termination was time share processed. Additionally, the receive processor 56 and the transmit processor 58 simultaneously execute the instructions selected for this termination that are contained within their respective program memories.

As previously mentioned the next termination to be time share processed is specified by the contents of sequence file 60. The sequence file 60 consists of a table of 768 entries that has sequentially stored therein the number of the termination that is next to be time share processed. For a 50 baud line the sequence file 60 requires at least one entry for each termination while, and for a 300 baud line, six entries are required. The output of the sequence file 60 is used not only to determine which termination is next to be processed, but also, to provide the address to the terminator control units to enable the flow of data to and from the termnation that is currently being time share processed, and to send and receive data from the conversation bus 5. Data bus 68, as seen in FIG. 4, provides the address of the termination next to be time share processed to the input of the terminator control interface 78, the conversation bus interface 80, as well as receive processor 56 and transmit processor 58.

The Line Controller Processor

Still referring to FIG. 4, both the receive processor 56 and the transmit processor 58 are identical except for their input/output conections necessitated by their respective functions. The following is a discussion of the architecture for the microprogrammed processor which is used in both the receive processor 56 and the transmit processor 58. While a discussion of transmit processor 58 is given below, except for the input/output connections, this discussion is equally applicable to the receive processor 56.

The data bus 54, which is shown connected to the group controller interface 52, is applied to three processor files, the program re-entry file (PRF) 62, the constant file 64 (CRF) and the variable file 66 (VRF). The PRF file 62 contains an addressable memory location for each of the terminations under the control of line controller 10. Stored in each of these locations is the program memory 70 address of the next microcoded instructions next to be executed for the associated termination. That is, the address outputted by the sequence file 60 causes the contents of the PRF file 62 to transfer to the program counter for theprocessor the starting address at which program executin will commence for this termination. At the completion of the time share interval for this termination, the current contents of the program counter will be transferred back into addressable locations for this termination in the PRF file so that program execution will commence at that address when this termination is once again time share processed.

Still referring to FIG. 4, the constant file 64 and the variable file 66 each contain a block ofmemory locations associated with each termination under control of this line controller 10. In these memory locations are stored the data required by the selected signaling routines to prioocess the terminations. Thus, when a given termination is being time share processed, the contents of the memory block locations in both the constant 64 and the variable 66 files are made available to the processor instruction execution means (see FIG. 8), as well as the terminator control interface 78, to enable the processor to perform the desired function of the selected signaling routine. The contents of the memory block locations in both the constant file 64 and the variable file 66 for the termination that is next to be time share processed is made available to the processor instruction execution means by transferring the blocks of data from these two memories to the constant catch memory 72 and the variable catch memory 74, respectively. The output from these memories are inputted to the arithmetic logic unit (ALU) 76 during the execution of the instructions read from the program memory 70.

The group controller 8 interfaces with the line controller 10 through the group controller interface 52. All data transfers between the group controller 8 and the line controller 10 are initiated by the group controller only. The group controller 8 may both read from and write into the sequence file 60, the program re-entry file 62, the constant file 64 and the variable file 66. However, either line controller 10 processors, the receive processor 56 or the transmit processor 58, can only read from its PRF 62, constant file 64 and variable file 66, and can only write into the variable file 66. Neither microprogrammed processor 56 or 58 can access the sequence file 60 either for a read or a write. In order to write into its variable file 66, each microprogrammed processor must first modify the contents of the variable catch memory 74 during each time share interval. At the completion of each time share interval, the contents of the variable catch memory 74 is written back into the variable file 66. In this way, the contents of variable file 66 is modified by the microprogrammed processor. Thus, the group controller processor 8 can obtain data from the line controller 10, such as received characters from the terminations, by reading the contents of the variable file 66. The line controller 10 can select the signaling routines to be performed for any given termination by loading the program re-entry file memory location for that termination with the starting program memory 70 address for the routine that has been selected for this termination. At the next time share interval for that termination, program execution will begin at that specified address.

Figure 8A:
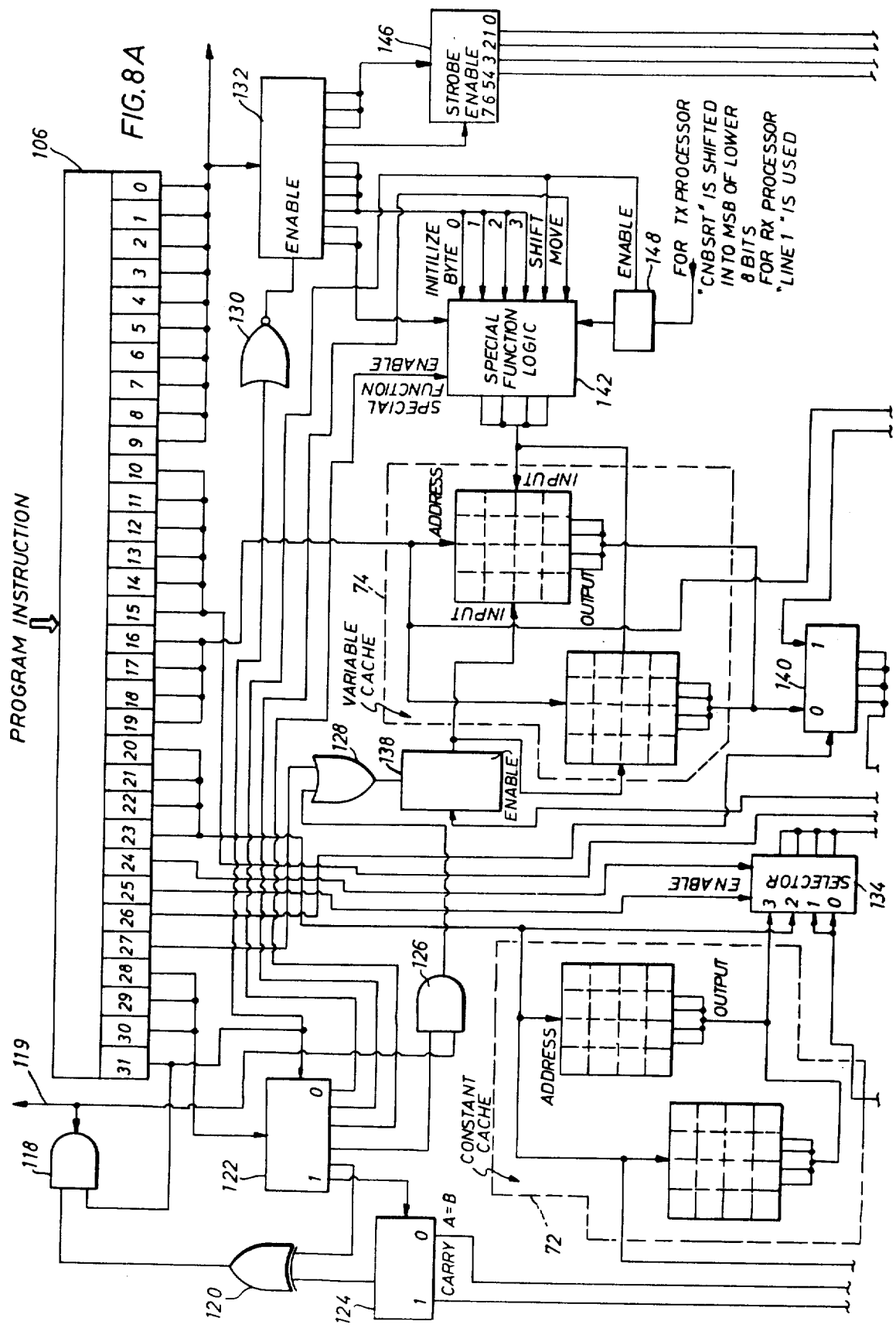

As shown in FIG. 4, terminator control interface 78 interfaces to both the output of the receive 56 and the transmit 58 processors. A single sequence file 60 is used to control both the receive processors 56 and the transmit processor 58 while the program re-entry file 62, costant file 64 and variable file 66 are present in both of the processors. Transmitted on the bus 69 between these two processors are the interprocessor flags. These interprocessor flags are the only data that is passed between the receive 56 and the transmit 58 processors during the execution of their respective signaling sequences for each termination. A more detailed description and the purposes of these flags will be give in the discussion of the instruction execution logic 75 as shown in FIG. 8.

Figure 5:
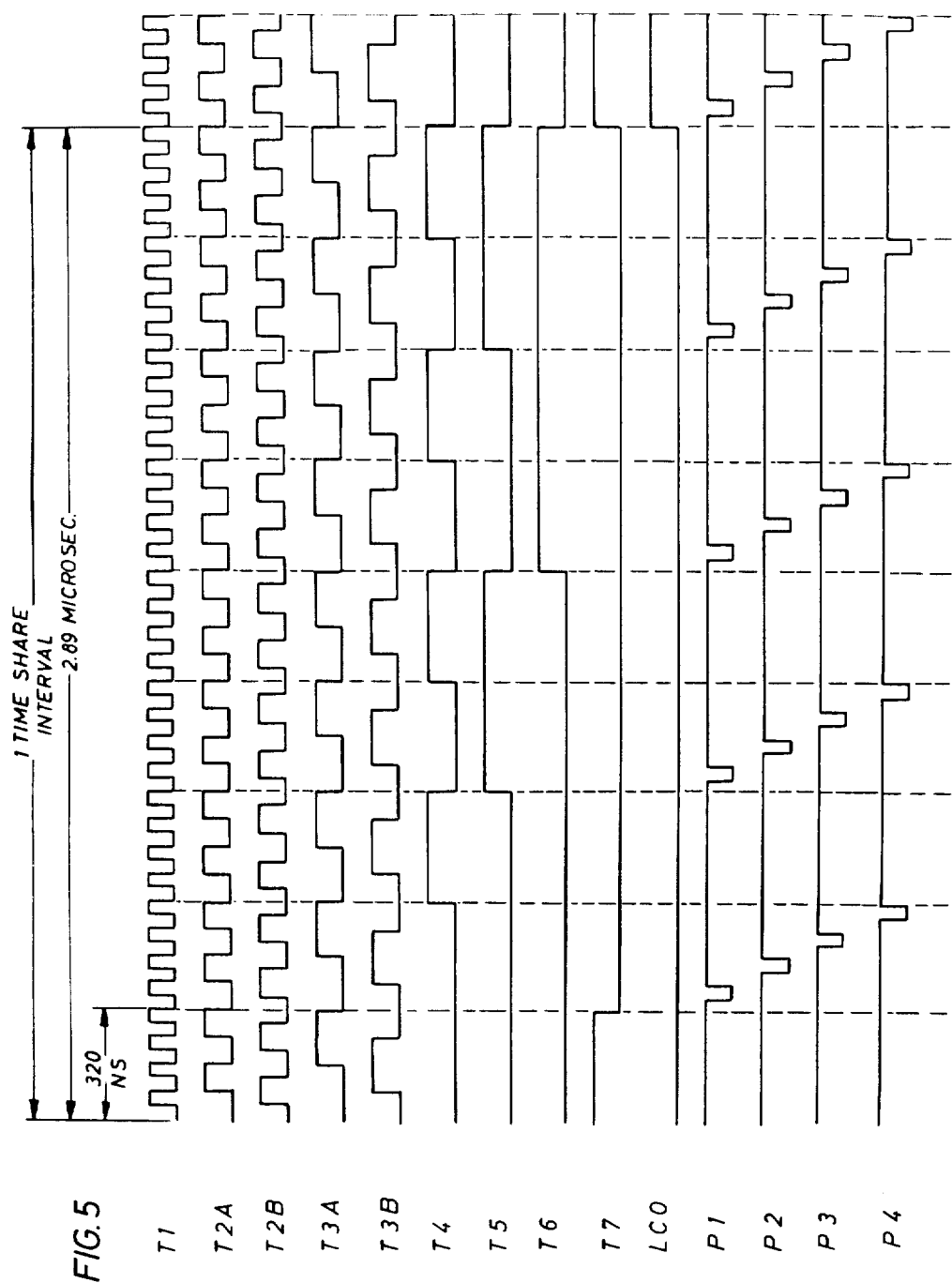
FIG. 5 is a timing diagram of the basic timing signals for the line controller processor.

Turning now to FIG. 5, a timing diagram of the line controller 10 for the timing pulses which occur in one time share interval of 2.89 microseconds is shown. Clock pulses labelled T1 through T7 are derived from a "local" oscillator frequency of 25.3 MHz using two 4-bit binary counters. Clock signals T2B and T3B are generated by phase shifting clock signals T2A and T3A, respectively. The pulse T7 occurs at the start of each time share interval, and during the time that T7 is true, group controller 8 has access to the line controller 10's files to transfer data to or from the line controller 10. At all other times, the files contained in the line controller 10 are under control of the internal line controller 10 hardware. In this manner, every 2.89 microseconds, the group controller 8 is permitted access to the line controller 10 to effectuate a data transfer. At the execution speed of the group controller 8 for the preferred embodiment, this is more than an adequate rate for the group controller to perform its functions.

As shown in FIG. 4, the sequence file 60 has the clock signal T7 inputted. The sequence memory 60 is accessed by a counter which advances with the clock T7. As peviously mentioned, the contents of the sequences memory 60 determines which set of line parameters are to be accessed during the next 2.89 microsecond time share interval. The signal LC0 shown in FIG. 5 is used as the least significant bit of the line number that is used to produce the terminator control unit addressing into odd and even groups. A more detailed discussion of this feature will be give in this disclosure in the discussion of the terminator control units, such as terminator control unit 16 (see FIGS. 1 and 2). The clock signals P1–P4 are provided mainly for the high rate operation of the cache memories 72 and 74 (see FIG. 4).

Figure 6:
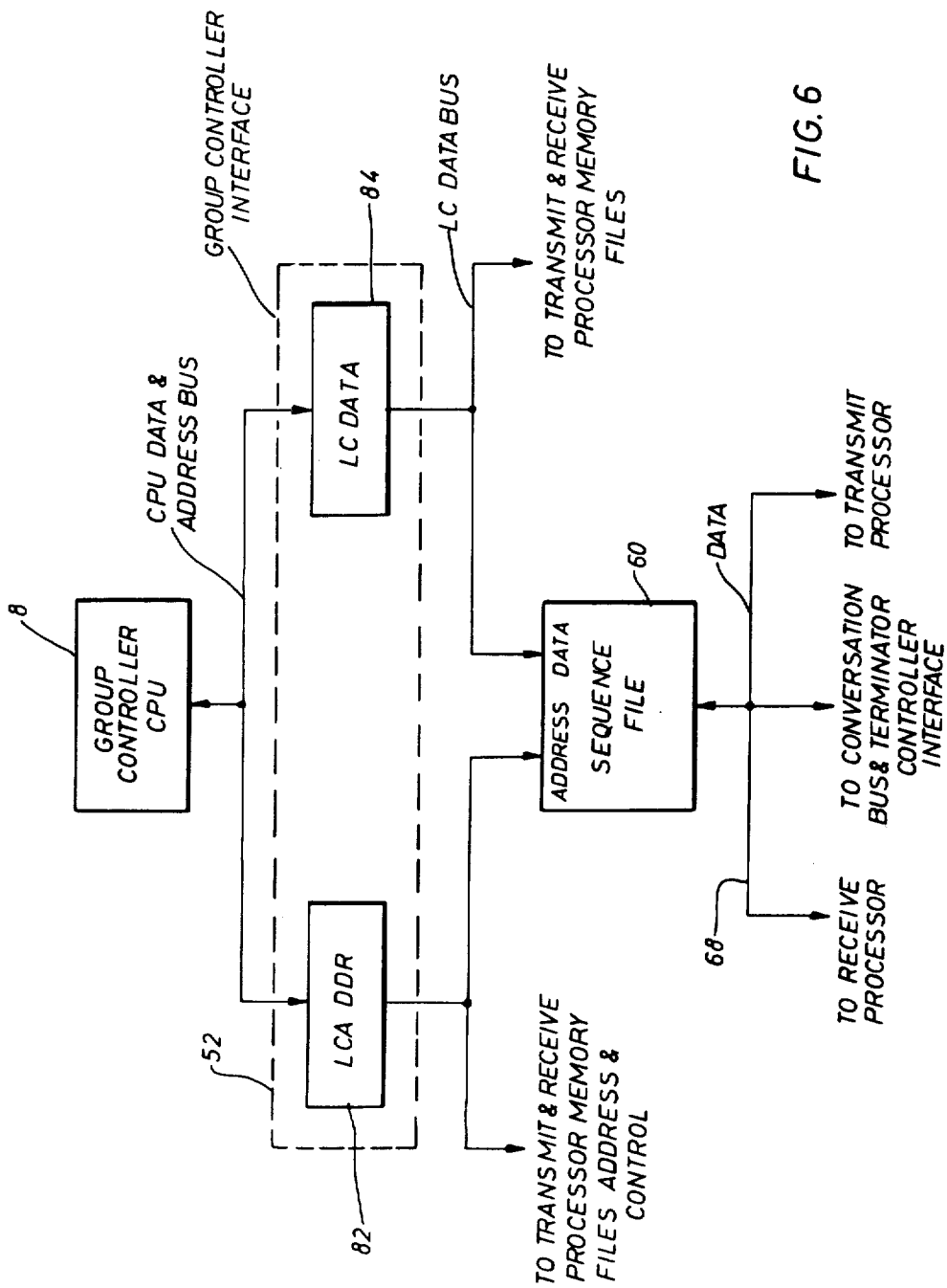
FIG. 6 is a block diagram of a portion of the group controller-line controller combination illustrated in FIG. 4 which shows the interface and data busing between the group controller processor and the line controller sequence file.

Turning now to FIG. 6, a more detailed block diagram of the group controller interface 52, as shown in FIG. 4, is given. To enable the group controller 8 access to the various files within the line controller 10, two word loations within the group controller address space are provided. These locations have been assigned the following labels: LCADDR and LCDATA. (See listing of group controller task routine TXSEL for a program instruction referencing these registers). The location LCADDR 82 contains the word address in the line controller files to be accessed, and the location LCDATA 84 contains the 16-bit quantity read from or written into the word address specified by LCADDR. As previously mentioned, all data transfers between the group controller 8 and line controller 10 are always initiated by the group controller 8. This minimizes the interface control logic and obviates the need for address generation by the line controller 10. These data transfers are initiated asynchronously with the line controller operations and some buffering is required. Actual transfers to and from the register files can only occur during the time that the files are not being used to update the cache memories. This happens during the time interval T7.

Figure 7:
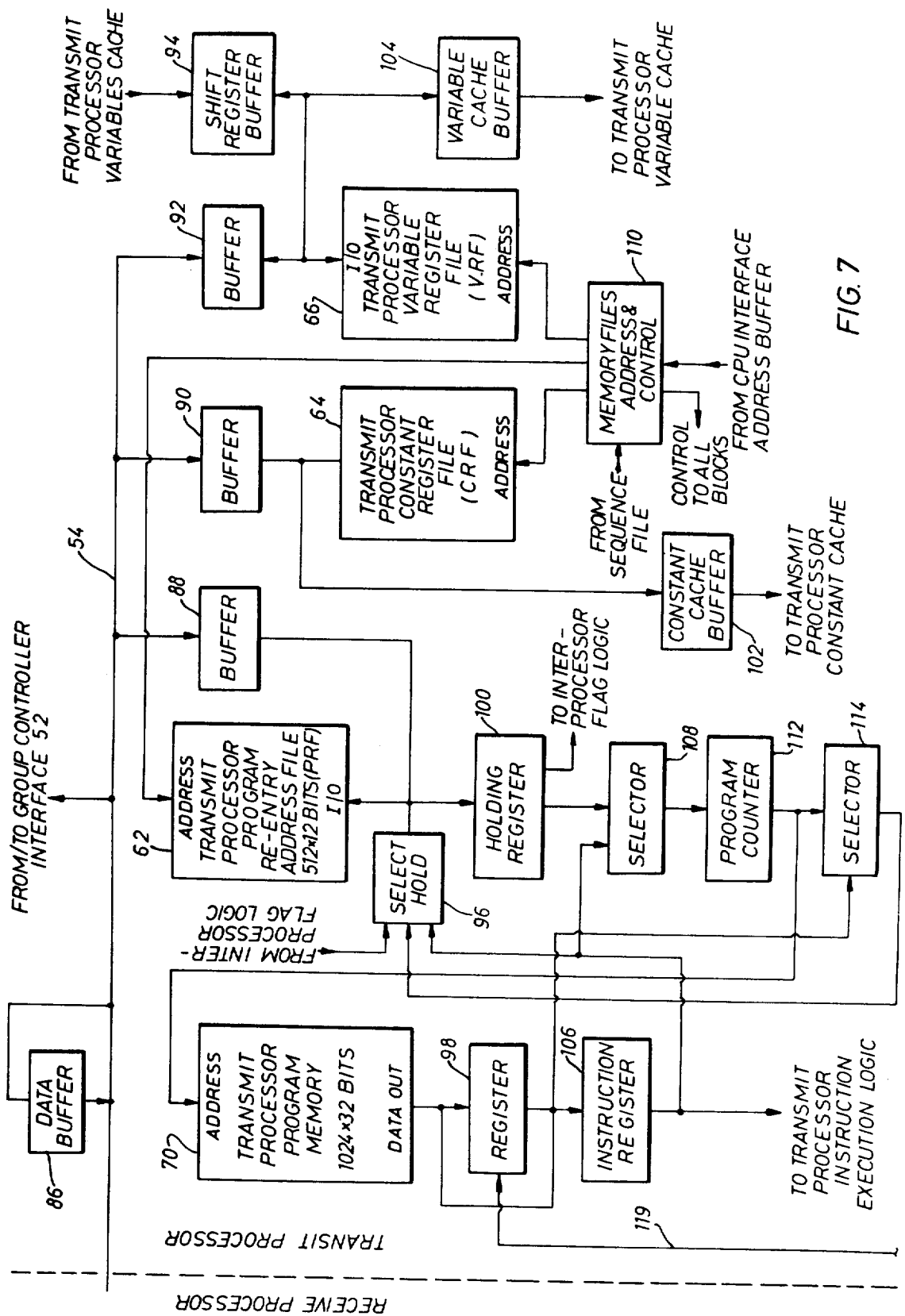
FIG. 7 is a block diagram representation of the transmit processor data files and program memory.

Turning now to FIG. 7, a more detailed block diagram of transmit processor 58 is shown. As previously mentioned, both the transmit 58 and the receive 56 processors are identical except for special purpose I/O circuitry that enables each of the respective processors to perform their functions. Accordingly, the following discussion of the transmit processor shows in FIG. 7 would be equally applicable to the receive processor 56.

The data bus 54 over which the group controller 8 transmits and receives data from the line controller 10 is shown connected through a set of buffer registers 88, 90 and 92 to input to and read from the three processor files: the program re-entry file (PRF), the constant register file (CRF) and the variable register file (VRF). Controlling each of these three files is the memory files address and control unit 110. Unit 110 responds to the address from the sequence file 60 (FIG. 4) and from the group controller interface 52 address register LCADDR to generate the appropriate addresses to the three memory files. That is, under control of address unit 110, the contents of CRF 64 and VRF 66 are transferred to the constant cache memory 72 and variable cache memory 74, respectively (see FIG. 8). Also, translation parameters are sent to the terminator control interface from the CRF 69 to enable the data forwarded from the terminations to be converted to logic signals of the processors (see FIG. 13). The output of CRF 64 passes through the constant catch buffer 102 while the output of the VRF 66 is buffered through the variable catch buffer 104. Both buffers 102 and 104 are used to buffer the data to their respective cache memories. In addition, the shift register/buffer 94 connected to the output of the VRF 66 file is used to transfer the data from the variable cache memory 74 back into the VRF file 66 at the completion of each time share interval. A more detailed discussion of this function is given with regard to FIG. 9.

Still referring to FIG. 7, the transmit processor program memory 70 contains the mcrocoded instructions for the various signaling routines for the transmit functions. The contents of the program counter 112 normally provides the address to the program memory 70 for the next microcoded instruction to be executed. However, some program instructions, such as a jump instruction, may be the source of the next instruction to be executed. In such a case, the output of either the program memory 70 itself or register 98, which is connected to the program memory 70 output, will be used to provide the address for the next program memory instruction to be executed. Selection of the source of the program memory 70 input address will come from selector 114 and will be controlled by the microcoded instruction previously executed.

At the beginning of each time share interval, the contents of the PRF file 62 specified by the memory files address and control unit 110 in response to the sequence file 60 is transferred to the program counter 112. This loads the program counter 112 with the address of the next instruction to be executed for the currrent termination. However, prior to updating program counter 112, the select and hold register 96 transfers back into PRF 62 the current content of program counter 112 for the termination that was just time share processed so that the next time that termination is processed, program execution will pick up at the same point it left off. Holding register 100 and selector 108 are connected between the output of the PRF file 62 and the program counter 112, and function to provide a variation in the transfer of program control according to the contents of the instruction register 106. In other words, if the instruction is a branch instruction, the address contained in register 106 will be loaded into the program counter 112 via selector 108 to control the transfer of program control to the branched instruction. The contents of instruction register 106, whose input is obtained from the output of the program memory 70 or the output of the branch instruction register 98, if selected by the instruction execution logic 105, is applied to the transmit processor program execution means 105 via the instruction register 106.

Turning now to FIG. 8, a block diagram of the transmit/receive processor instruction execution means 105 is shown in which the program instruction register 106 inputs a 32-bit microcoded instruction word to the input of the instruction execution means 105. Each of the bits in this microcoded instruction word is used in some way to control the flow of data through the execution logic to produce the desired instruction results. Before discussing in detail the operation of the instruction execution logic shown in FIG. 8, reference should be had to FIGS. 10 and 11 which respectively show the line controller processor instruction format and a species of program instructions referred to as the branch instructions.

Referring first to FIG. 10, the function of each bit in the microcode instruction word is stated opposite the bit number. Briefly, bit 31 of the instruction word indicates whether the instruction is to be a branch instruction or not. If bit 31 is at a logic 1, one of the branch instructions illustrated in FIG. 11 may be performed. The various functions performed by the bits indicated in FIG. 11 will be appreciated by those skilled in the art when taken in conjunction with the circuit diagram as illustrated in FIG. 8. For example, the branch instruction BFLG, shown in FIG. 11, will cause a branch to occur if all selected flags are equal to a logic 1.

Referring to FIG. 8, the A input to arithmetic logic unit 76 is controlled by which of the two inputs to selector gate 140 is selected by bit 26 of the microcode instruction. For the branch instruction BFLG, bit 26 is at a logic 1 thus enabling the "1" input to selector 140 to apply that data source to the A input of ALU 76. In this case, the one input to selector 140 is the output of the flag selector gates 154. Flag selector gates 154 have four inputs of four bits each which are mutliplexed onto the four output data lines by the states of bits 16 and 17 of the microcode instruction. As shown in FIG. 11, bits 18 and 19 are unused bits and only bits 16 and 17 specify the flag field select. Thus, any one of the four 4-bit flag sets of data can be inputted to the A input of ALU 76 by appropriately specifying the binary state of bits 16 and 17 of the microcode instruction. Also, the state of bits 24 and 25 determine which of the four 4-bit words inputted to selector gate 134 is applied to the B input of ALU 76. For the instruction BFLG, the binary states of bits 20 through 23 are all in a logic 1 so that the logic function performed by the ALU 76 under control of the instruction word bits 10–15 will be A or B. That is, a branch will occur if all selected flags applied to the A input of ALU 76 are at a logic 1.

All branch decisions are based on one of two ALU 76 (see FIG. 8) outputs. These are the carry output (Cn+4) and the 1's output (A=B). If bit 30 of the microcode instruction word is at a logic 1, the carry output is used. If bit 30 is at a logic 0, A=B is used. If bit 29 is at a logic 0, the branch takes place if the selected output is at a logic 1, while if bit 20 is at a logic 1, the branch takes place at the selected output is at a logic 0. Any ALU 76 function with any combination of inputs can be specified for the branch decision. The branch instructions illustrated in FIG. 11 do not comprise a complete list of all possible branch instructions. The possibilities of branch instructions not listed in FIG. 11 can be determined by examination of the function tables of ALU 76, which for the preferred embodiment of the present invention is a Texas Instrument Model No. 74S181 ALU that may be found in logic data books such as the TTL Data Book, Second Edition, Texas Instruments, 1976.

Referring to FIG. 10, if bit 31 of the microcode instruction is at a logic 0, no branch instruction is to be performed. Rather, bits 28, 29 and 30 are then used to specify one of three special function instructions that will be performed on the variable catch data at the completion of the time share interval for this termination. These special function instructions will be discussed more fully below.

Referring once again to FIG. 8, the constant cache 72 and variable cache 74 are shown as consisting of two separate and distinct memories whose inputs and outputs are connected in parallel. Each of the memories illustrated for the cache memories 72 and 74 are divided into four 16-bit memory words that are themselves divided into four subwords of 4-bits each. Each pair of memories which comprise the constant cache 72 and the variable cache 74 function identically except that only one of the two memories which make up each of the caches is used to output data to the ALU 76 during each time share interval. In other words, one of the pairs of memories comprising each cache is in an active state and able to output data to the ALU 76, while the companion memory is in an inactive state and is unavailable to output data to the ALU 76. As will be discussed more fully with respect to FIG. 9, the operation of each of the high-speed cache memories which comprise both the constant cache 72 and the variable cache 74 will be given. Two parallel cache memories are used for the function of the constant cache 72 and the variable cache 74 in order to avoid slowing down the microprogram processor with the loading and unloading of the data contained in the CRF 64 and VRF 66 files at the start of each time share interval. This slow down is avoided by having the inactive backup cache memory available for loading of the data to be used in processing the next termination to be time share processed during each time share interval so that the processor can rapidly transfer program execution for the next termination at the start of the next time share interval. Thus, at the completion of each time share interval, the inactive cache memories will have been loaded with the new data from the respective CRF 64 and VRF 86 files to enable program execution to continue uninterrupted. At the completion of each time share interval, each memory within the constant cache 72 and variable cache 74 change their states, the active going inactive and the inactive becoming active. Since the address and the input/output data lines for both the active and inactive memories of each cache memory 72 and 74 are in parallel, the rest of the instruction execution logic shown in FIG. 8 will not be concerned with which of the two memory units in each cache the data is coming from.

As previously mentioned, only the variable catch memory 74 can both be read from and written into by the instruction execution logic 105. The output from the ALU 76 is inputted to gates 138 and that data is written into variable cache 74 bit 27 of the microcoded instruction is a logic 1 or if the instruction is a branch instruction and bit 28 is a logic 1. This data will be recorded in the memory location within variable catch 74 specified by microcode instruction bits 16–19.

Still referring to FIG. 8, in order to further reduce the amount of software overhead to perform the line controller function, certain special function instruction which operate on the data contained in the variable catch 74 have been designed into the line controller 10 hardware. If bit 30 of the microcode instruction word is a logic 1, the special function enable signal outputted by the selector gate 122 is applied to the special function memory 142. One of the functions performed by the special function memory 142 is to initialize any one or all of the subwords of any one of the four 16-bit memory words that make up the variable cache 74. The 16-bit word on which the special function instruction will be performed is specified by the special function word select bits 8 and 9 of the microcode instruction. Bits 8 and 9 are applied to the register 132 and will appear on the input to special function memory 142 as a two-bit address if a branch instruction is not selected (bit 31=logic 0). The subwords of the addressed 16-bit word to be initialized is specified by bits 4–7 of the microcode instruction word. It should be pointed out here that all of the special function instructions are not carried out on the data contained in the active variable cache memory. Rather, these instructions are performed on the data contained in the inactive variable cache 74 data prior to that data's return to the VRF 66. It is the function of the special function memory 142 to store each special function instruction that occurs during each time share interval so that they may be performed during the next time share interval. Each 16-bit word in the variable cache memory 74 may have a single special function instruction stored for it in each interval. If more than one special function instruction is specified in any time share interval for the same 16-bit word, only the last instruction is remembered in memory 142.

If special function instructions are specified for more than one 16-bit word, the instructions are executed in the order of the address involved, not in the order of their appearance in the 18 instruction time share interval. In all, three special function instructions are provided for: the initialized instruction just mentioned, a shift instruction and a move instruction. The shift instruction causes the 8 least significant bits of a 16-bit word to be shifted 1 bit to the right using the external input either from the termination or from the conversation bus 5 as the value of the bits shifted into the leftmost bit of the 8-bit word shifted. In this manner, the variable cache 74 can construct parallel characters from the serial data received from the terminator control units or the conversation bus 5. If an initialize is also specified, the zeroing takes place before and during the shift. Therefore, zeroed words remain zeroed and words to the right of zeroed words get a zero in the most significant bits. As seen in FIG. 8, the external input eventually is applied to the B input of the ALU 76 via the buffer register 150, selector gate 136 and selector gate 134. As is the case for all data flow within the instruction execution logic 105, the bit pattern in the microcode instruction will determine which of the external inputs is applied to the B input of the ALU 76. Lastly, the special function instruction "move" transfers the 8 least significant bits from a 16-bit cache memory word to the 8 least significant bits of the previous 16-bit memory word (lower address word). This enables the completed 8 level characters to be transferred to a buffer register, freeing up the register needed to construct the character from the serial data coming from the termination or the conversation bus 5. It is this completed character that is eventually transferred to the group controller 8 according to the execution of the script routines in the group controller. If an initialize is also specified, it will operate normally, causing zeros to appear where specified, independent of the move instruction. If a shift instruction is also specified, it operates normally on the word moving onto the specified location. If a move is specified for the 16-bit word with the lowest address, the 8 least significant bits of the highest addressed group for the previous time share interval will be moved in.

As shown in FIG. 8, the interprocessor flags are transmitted between the receive processor 56 and the transmit processor 58 over the set of data lines 69 (see FIG. 4). These data lines 69 are shown in FIG. 8 inputted to the flag buffer register 156. Bits 2 and 3 of the output of ALU 76 from both of the line controller processors are transmitted to the other processor to comprise bits 0 and 1 of the 4-bit data word inputted to one of the selectable registers of buffer register 156. The state of the interprocessor flags may be accessed by the appropriate address from bits 16 and 17 of the microcoded instruction word that will enable the interprocessor flags to appear on the "A" inputs to ALU 76.

Two functions are performed by the interprocessor flangs in each of the respective receive and transmit processors. For the receive processor, when it receives a call from a termination, the receive processor generates a flag to the transmit processor to indicate that occurrence. Periodically, the transmit processor will be executing an instruction that examines the value of this flag since the signaling routine selected for this termination would be one in which a call was not in progress. When the transmit processor finds that the flag is true, the transmit processor will immediately transfer its program control to the signaling routine to generate an "auto call confirm" back to the calling termination. Auto call confirm is transmitted without supervision from the group controller 8. However, group controller 8 will detect that a call has been received by the receive processor and as it begins to execute the script for the call set-up signaling sequence for this termination, it will check to see if the transmit processor has sent the "auto call confirm". If it hasn't, then the group controller 8 will command it to do so. By having an auto call confirm, the termination can already the progressing to the next state of signaling while the group controller 8 is preparing the script for this termination.

The second function performed within the receive processor by the interprocessor flags is that when the receive processor determines that the line has been cleared, it will send a flag to the transmit processor indicating that occurrence. Again, the transmit processor will periodically be executing an instruction that will examine the value of this flag since a call is in progress and the next involvement of the group controller 8 will be to clear the call down. When it determines that it is true, the transmit processor will send a "clear confirm" and stop the transmission to that termination.

With regard to the transmit processor, when the transmit processor receives a clear flag from the receive transmit processor, it sends back to the receive processor a flag indicating that it has received the clear flag and will send a "clear confirm" to the termination. In this manner, the receive processor will know that the transmit processor has received the flag. Secondly, when the termination is a 2-wire termination, the transmit processor will send an interprocessor flag to the receive processor when it is transmitting. This flag will inhibit the receive processor so it won't process the data being transmitted to the termination as received data from the termination.

Still referring to FIG. 8, if the illustrated processor is the transmit processor, the data to be transmitted to the termination (TDATA) from the MSB of the output of the ALU 76 is outputted after a 185 nanosecond delay through delay 162 and gate 160. TDATA is inputted to the terminator control interface 78 for eventual transmission to the termination. In a similar manner, data derived from the status bit of bus 11 (see FIG. 15) from the terminator units is inputted to one of the registers of flag register 156 so the processor can examine the current state of the line of the termination being time share processed. The most significant bit MSB of ALU 76 of the transmit processor and the LSB of ALU 76 of the receive processor are forwarded to the conversation bus interface 80 via the gate 164. Data from the conversation bus interface 80 to both the transmit and receive processors is inputted to the external input register 150.

Figure 9:
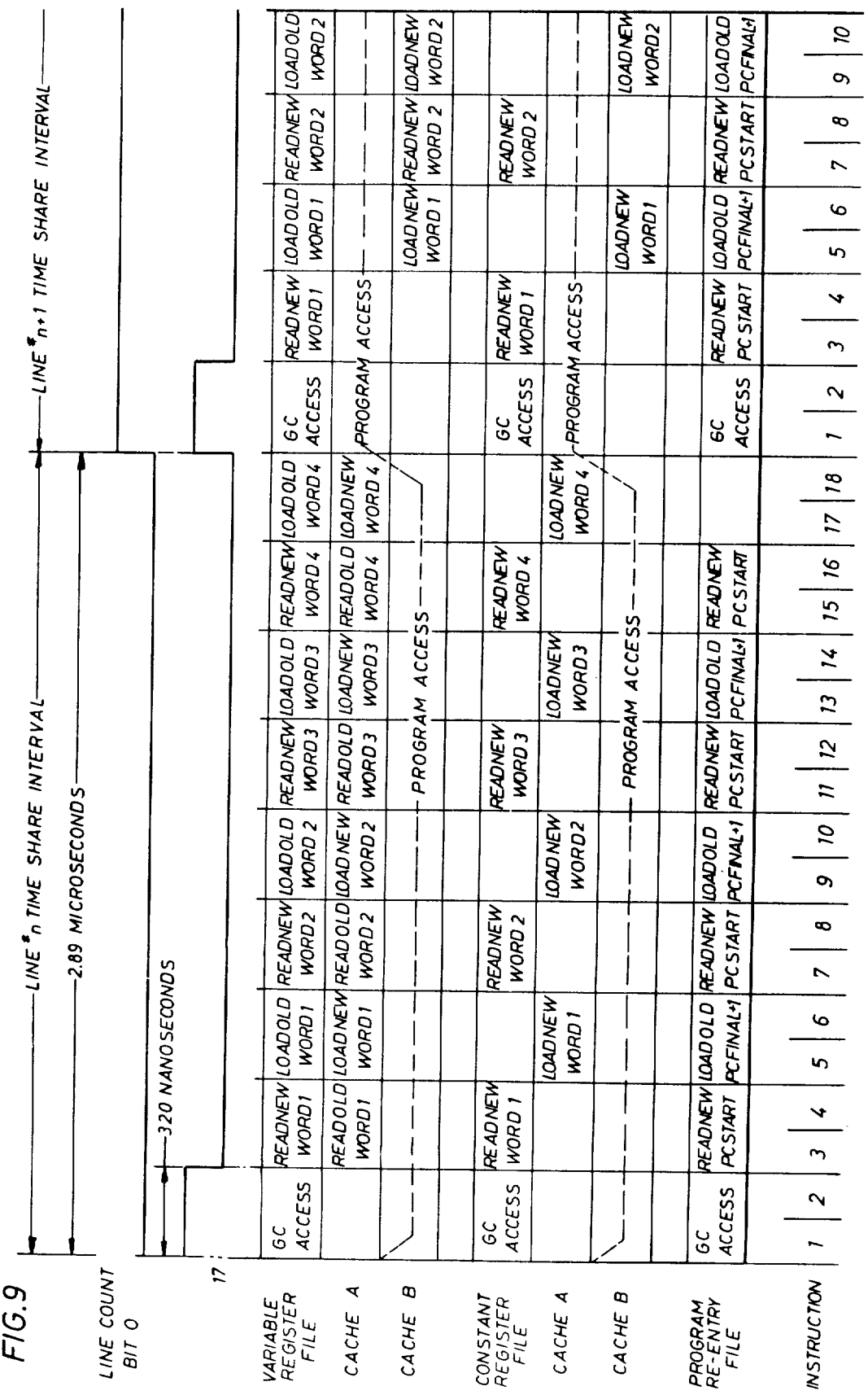
FIG. 9 is a timing diagram for the line controller transmit or receive processor constant and variable files illustrating the transfer of data to and from the files.

Turning now to FIG. 9, a timing diagram for a typical time share interval which shows the flow of data for both the constant catch 72 and the variable catch 74 (FIG. 8) is illustrated. For the preferred embodiment of the present invention, during each time share interval, 18 microcode instructions from program memory 70 are executed for each termination. As previously mentioned, access by the group controller 8 to the contents of the various files within the line controller 10 is provided during the T7 access window. For the preferred embodiment, T7 is 320 nanoseconds long, and each time share interval is 2.89 microseconds long with each microcoded instruction taking 160 nanoseconds to be executed. Also shown in FIG. 9 is the flow of data from the program counter 112 (see FIG. 7) and the PRF 62 file. Beginning with the third instruction in each time share interval, the contents of the PRF 62 is transferred to the holding register 100 (see FIG. 7). The time to read the contents of the PRF 62 spans instruction times 3 and 4. During the instruction time for instructions 5 and 6, the content of the select and hold register 96 is loaded back into the PRF 62 location for the termination previously time share processed. The contents of the select and hold register 96, at this time, is the value of the program counter 112 plus 1 or the address contained in a branch instruction plus 1 if the last instruction in the previous time share interval was a branch instruction. Beginning with instruction number 7 and repeating every 4th instruction time, the above procedure repeats, up to instruction 17. As a result, at the completion of instruction number 18, the select and hold 96 will contain the contents of the program counter 112+1 or the branch instruction address plus 1 (see above) which is the program memory 70 address of the next instruction to be executed for this termination in its next time share interval.

Still referring to FIG. 9, as previously mentioned, each of the memories that comprise both the constant cache memory 72 and the variable cache memory 74 have both an active and an inactive state. In the active state, the contents of the cache memory is available to the instruction execution logic 105. In the inactive state, the contents of the memory is available for loading of the data for the next termination to be time share processed in the next time share interval. In the case of the inactive variable cache memory 74, the data that is contained therein must be transferred back to the VRF 66 being updated with the data for the next termination to be time share processed. This is illustrated in FIG. 9 in which cache A of the variable cache memory 74 is in an inactive state while cache B is active and available for program access. As seen at the second occurrence of the signal T7, program access transfers from cache B to cache A. In other words, cache A becomes active and cache B becomes inactive.

During the first two instruction times for the line controller 10 processors, T7, the group controller 8 is permitted access to the line controller files. For the VRF 66 file, during instruction times 3 and 4 of each time share interval, two things occur. First, the memory files address and control unit 110 (see FIG. 7) causes a new variable cache 74 word 1 to be read from the VRF 66. Secondly, the contents of inactive cache A word 1 is read out. During instruction times 5 and 6, the old word 1 just read from cache A is loaded back into the VRF 66 in its appropriate location. Also, the new word 1 that was just read from VRF 66 during instruction times 3 and 4 is loaded into word location 1 in cache A. In other words, the contents of the inactive cache memory A for the variable catch is transferred into the VRF 66 for line number n−1 that was previously time share processed back into its appropriate location in the VRF 66, while the first word for line n+1 is read from VFR 66 and loaded into cache A to be available in the next time share interval when cache A becomes active. This process continues until all four of the words contained in the inactive cache A memory of the variable catch are loaded with termination n+1's data.

The same functions occur with respect to the CRF 64 and the constant cache memory 72 except that the contents of the inactive constant cache A or B of constant cache memory 72 are never returned to the CRF 64. As shown in FIG. 9 for time share processing of termination number n, the constant cache 72 cache A memory is in the inactive state. During instruction times 3 and 4, the contents of the CRF 64 word 1 location for a termination n+1 is read out of CRF 64. During instruction times 5 and 6, this word is loaded into word 1 of inactive cache A. This process continues until all four data words for the termination n+1 from the CRF 64 are transferred to the inactive cache A. When the start of processing for termination n+1 begins, the states of the cache A and cache B of each of the variable and the constant catch memories change states.

As discussed with regard to the instruction execution means 105 of FIG. 8, there are certain special function instructions which are performed by the special function memory 142 on the data contained in the inactive variable cache memory. These special function instructions are not performed during the time share interval for the termination, but rather are performed on the variable data when the contents of the inactive variable cache of the variable cache memory 74 is being transferred back to the VRF 66 file. For the preferred embodiment, only one special function instruction can be executed on each word of the variable cache 74 in any one time share interval. In the event that two special function instructions occur during a single time share interval, only the last instruction to occur during that interval will be performed.

The Line Controller Instruction Set

There are 2 formats for the 32-bit instruction word. One format is for Branch instructions, the other format is for all other instructions. Common to both types is the use of 4-bit fields defined as fields A and B. The A field can represent a variable file address or a 2-bit flag group address. The B field is either a constant file address, an immediate value, or an external data address. Also visible to the codes is an address file for branch instructions giving the branch address, or in non-branch instructions, a special function address and an external strobe destination.

To define the various fields for the instructions, the following abbreviations will be used:

ADDR—In branch instructions this is the branch address
A—Represents A field
B—Represents B field
WD—Special function word group (00-11)
BITS—A 4-bit field with each bit representing a field in the special function word group
XD—External strobe destination Modifies for fields A and B are:
I—Immediate value for B
R—Constant file address for B, variable file address for A
F—Flag group address for A, external address for B Example:

| Instruction | | Format | A, B Destination |
|---|---|---|---|
| SICBS | B,A,WD BITS, WD | R I | Move B to A. Strobe destination XD. Clear WD, Bits. |

In the above example, A is a variable file address, B is an immediate value. The value B replaces the contents of address A and, depending on the value of XD, certain bits in B are output to an external destination. Also in the 16-bit word group given through WD, four bit fields corresponding to bit positions in BITS are zeroed out. If WD=01 and BITS=0010 then in the second 16-bit word group, bits 4–7 are set to zero. All other fields (bits 0–3, 8–15) remain intact.

| BRANCH INSTRUCTIONS | | | | |
|---|---|---|---|---|
| Instruction | | Format | A B | Description |
| ABC | ADDR,B,A | R | R | Branch if A+B=A Results in a carry |
| ABNC | ADDR,B,A | R | R | Branch if A+B=A Results in no carry |
| BANEN | ADDR,B,A | R | I | Branch if A−B not equal −1 |
| BEA | ADDR,B,A | R | R | Branch if A=B |
| BFLG | ADDR,A | F | | Branch if A or not B= −1* |
| BFLGN | ADR,A | F | | Branch if A or not B not = −1* |
| BGA | ADDR,B,A | R | R | Branch if A > A |
| BGEA | ADDR,B,A | R | R | Branch if B > =A |
| BIT | ADDR,B,A | R | I | Branch if A or not B= −1 |
| BLA | ADDR,B,A | R | R | Branch if A > B |
| BLEA | ADDR,B,A | R | R | Branch if A > =B |
| BNEA | ADDR,B,A | R | R | Branch if A not = B |
| BNFLG | ADDR,A | F | | Branch if A and B = 0* |
| BNFLGN | ADDR,A | F | | Branch if A and B not = 0* |
| BONB | ADDR,B | | R | Branch if B= −1 |
| BONNB | ADDR,B | | R | Branch if B not = −1 |
| BOT | ADDR,B,A | R | I | Branch if A and B = 0 |
| BOTN | ADDR,B,A | R | I | Branch if A and B not = 0 |
| BR | ADDR | | | Unconditional branch |

BRANCH INSTRUCTIONS

| Instruction | | Format | A | B | Description |
|---|---|---|---|---|---|
| BXEA | ADDR,B,A | R | | F | Branch if A = B to ADDR |
| BXEAF | ADDR,B,A | F | | F | Branch if A = B |
| BXNEA | ADDR,B,A | R | | F | Branch if A not = B |
| BXNEAF | ADR,B,A | F | | F | Branch if A not = B |
| DECBM | ADDR,B,A | R | | | Branch if A−1=1. Result of A−1 is in A |
| DECBNM | ADDR,A | R | | | Branch if A−1=A. Results in not −1 |
| INCBNC | ADDR,A | R | | | Branch if A+1=A. Results in no carry |
| NOP | | | | | No operation |
| SBM | ADDR,B,A | R | | R | Branch if A−B=1. Result of operation is in A |
| SBNM | ADDR,B,A | R | | R | Branch if A−B not = −1. Result is in A |
| WAIT | ADDR | | | | Branch to ADDR. If ADDR = '.' thru branch to self. |

*In these instructions the B field is assigned through A 2-bit overflow from the A field. Thus a Code X '28' for the A field would in actuality indicate A B field of 2 and an A field of 8.

NON-BRANCH INSTRUCTIONS

| Instruction | | Format | A | B | Description |
|---|---|---|---|---|---|
| ADD | B,A | | R | R | A+B=A |
| AND | B,A | | R | I | A and B=A |
| ANDINIT | BITS | B,A,WD, R | | I | A and B=A. Clear WD, bits. |
| ANDMOV | B,A,WD | | R | I | A and B=A. Move 8 LSB of WD−1 to 8 LSB of WD. |
| ANDOUT | B,A,XD | | R | I | A and B=A. Output result to XD. |
| AOUTIN | B,A,WD, BITS,XD | | R | I | A and B=A. Clear WD, bits. Output A to XD. |
| CBTOCB | | | | | Output CONV. Bus bit to Bus. |
| CLR | XD | | | | Clear XD. |
| CLRCBIN | | WD,BITS | | | Clear WD, bits and Conv. Bus Flag. |
| CLRF | A | F | | | Clear Flag A |
| DEC | A | R | | | Decrement A |
| DECINIT | | A,WD,BITS R | | | Decrement A. Clear WD, Bits. |
| FTACBI | B,A,WD, BITS,XD | | R | F | Move B to A. Output Strobe. Clear WD, bits |
| FTACCB | B,A,XD | | R | F | Move B to A. Output Strobe |
| IDA | A | | R | | Move A to ALU for next instruction. |
| IDB | B | | | R | Move B to ALU for next instruction. |
| IDBXDT | B,XD | | | F | Output B to XD. |
| INC | A | | R | | A+1=A. |
| INCINIT | | A,WD,BITS R | | | A+1 A. Clear file address WD, bits. |
| INCMOV | A,WD | | R | | A+1=A. Move 8 LSB of WD−1 to 8 LSB of WD. |
| INIT | WD,BITS | | | | Clear file address WD,BITS |
| MOV | WD | | | | Move 8 LSB of WD−1 to 8 LSB of WD |
| MOVBA | B,A | | R | R | Move B to A To WD. Clear WD, BITS. |
| MOVOUT | A,WD,XD | | R | | Output A to XD. Move 8 LSB of WD −1 to WD |
| MVINOUT | XD | A,WD,BITS R | | | Move 8 LSB of WD −1 to 8 LSB of WD. Clear WD,BITS. Output A to XD |
| MVSHOT | A,WD,XD | | R | | Move 8 LSB of WD −1 to WD, then shift 8 LSB WD right 1 bit |

-continued

NON-BRANCH INSTRUCTIONS

| Instruction | | Format | A | B | Description |
|---|---|---|---|---|---|
| | | | | | and input serial data to bit 7 of WD. Output A to XD. |
| OR | B,A | R | | I | A or B=A. |
| ORINIT | B,A,WD,BITS | R | | I | A or B=A. Clear WD,BITS. |
| ORMOV | B,A,WD | R | | I | A or B=A. Move 8 LSB to WD −1 to 8 LSB of WD. |
| OROUT | B,A,XD | R | | I | A or B=A. Output Result to XD |
| OUTINIT | BITS,XD | A,WD,R | | | Output A to XD. Clear WD, BITS |
| RDFLG | A | F | | | Output Flag A to ALU |
| SEND | B,XD | | | I | Output 8 to XD |
| SENDINI | BITS,XD | B,WD | | I | Output B to XD. Clear WD,BITS |
| SET | B,A | R | | I | Move B to A |
| SETCLCE | | B,A,XD | | | |
| | | R | | I | Move B to A. Output strobe XD |
| SETF | B,A | F | | I | Flag A or B (2MSB)=Flag A |
| SETFINI | | B,A,WD | | | |
| | | F | | I | Flag A or B (2MSB)=Flag A. Clear WD,BITS |
| STINIT | B,A,WD,BITS | R | | I | Move B to A. Clear file address WD,BITS |
| SHANO | B,A,WD,XD | R | | I | A and B=A. Output A to XD. Shift 8 LSB of WD right 1 bit and input from line |
| OR | | | | | Conv. bus to bit 7 of WD |
| SNDEC | A,WD | R | | | A −1=A. Shift 8 LSB of WD right and input to bit 7 |
| SHFOUT | A,WD,XD | F | | | Output A to XD. Shift 8 LSB of WD right and input to bit 7 Right shift 8 LSB of 16 |
| SHFT BIT | WD | | | | Word group WD and serial input into bit 7 |
| SHFTOUT | | A,WD,XD | | | |
| | | R | | | Output A to XD. Shift 8 LSB of WD right and input to bit 7 |
| SHORO | B,A,WD,XD | R | | I | A or B=A. Output result to XD. Shift 8 LSB OS WD right and input to bit 7 |
| SICBS | B,A,WD,BITS,XD | R | | I | Move B to A. Strobe B to XD. Clear WD, BITS |
| STRBX | B,A | R | | F | Move B to A. |

The Line Controller Firmware

Listed in the following TABLE 3 are the line controller signaling routines for both the receive and the transmit processors of the preferred embodiment of the present invention. Each of the signaling routines listed in Table 3 are discussed with regard to the functions performed by each routine and for the cache memory word assignments for both the variable 74 and a constant 72 cache memories. Referring now to FIG. 12, the organization of the four 16-bit memory words that make up both cache A and cache B of either the constant cache 72 or the variable cache 74 is shown. As previously mentioned, each 16-bit word is divided into four subwords of 4-bits each to generate a total of sixteen 4-bit memory words. The following discussion of each of the signaling routines for the line controller firmware reference the cache memory locations, first according to the subword of a specific 16-bit word and then according down to the individual bits within each subword. Provided at the end of the discussion of the signaling routines for both the receive and the transmit processors is an example of the coding that is contained in the program memory 70 for signaling routines in both the receive and the transmit processors. In the following discussion, reference is made to LINE and to BUS. These two references refer to the termination lines and to the conversation bus, respectively.

TABLE 3

| Processor | Entry Label | Function Routine |
|-----------|-------------|------------------|
| Receive: | FREE | FREE |
|  | CLD | Call Detect |
|  | SPD | Signal/Pulse Detect |
|  | CHD | Character Detect |
|  | DPR | Dial Pulse Reception |
|  | RDR | Receive Distortion Reporting |
| Transmit: | FREE | FREE |
|  | TSP | Transmit Signal/Pulse |
|  | TSC | Transmit Supervisory Characters |
|  | TCC | Transmit Coupled Characters |
|  | TDP | Transmit Dial Pulses |

Transmit Processor Signaling Routines

Transmit FREE

Processing Description

The transmit FREE state is intended to be a transitional function state. The Transmit FREE routine makes no references to either the Constant 64 or Variable 66 File. The files can be set up for any transmit routine while the transmit is in the FREE routine.

Program control can automatically return to FREE at the completion of TSP or it can be forced to FREE by the group controller 8. In the case where the receive processor the cause transmit processor to transmit clear confirm, control always returns to FREE.

Functions Performed

The Transmit FREE routine performs the following functions:
1. Clears its own interprocessor message flags.
2. At every sample, FREE monitors the interprocessor flags controlled by the receive processor for a request to transmit clear confirm. After transmission of clear confirm, the transmit processor returns to FREE.

Cache Memory Assignments

There are no cache memory assignments for Transmit FREE.

Transmit Signal/Pulse-TSP

Processing Description

Immediately upon entry, TSP sets the LINE to a user specified polarity. Then depending on user options, TSP exits either to FREE or to TSC, or it begins to count down a 16-bit counter. In the latter case, when the counter reaches zero, TSP changes the LINE polarity and either exits or begins a count down of a second 16-bit counter. In the latter case, when the second counter reaches zero, TSP changes the line polarity and then exits either to TSC or to FREE.

TSP has a special entry point named ATOTSP which allows the user to cause execution of TSP to begin only after the receipt of a request for transmission (via an interprocessor flag) from the receive processor. This allows the user to have a transmit activity automatically sequenced in response to an event registered by the receive processor.

Functions Performed

Figure 25:
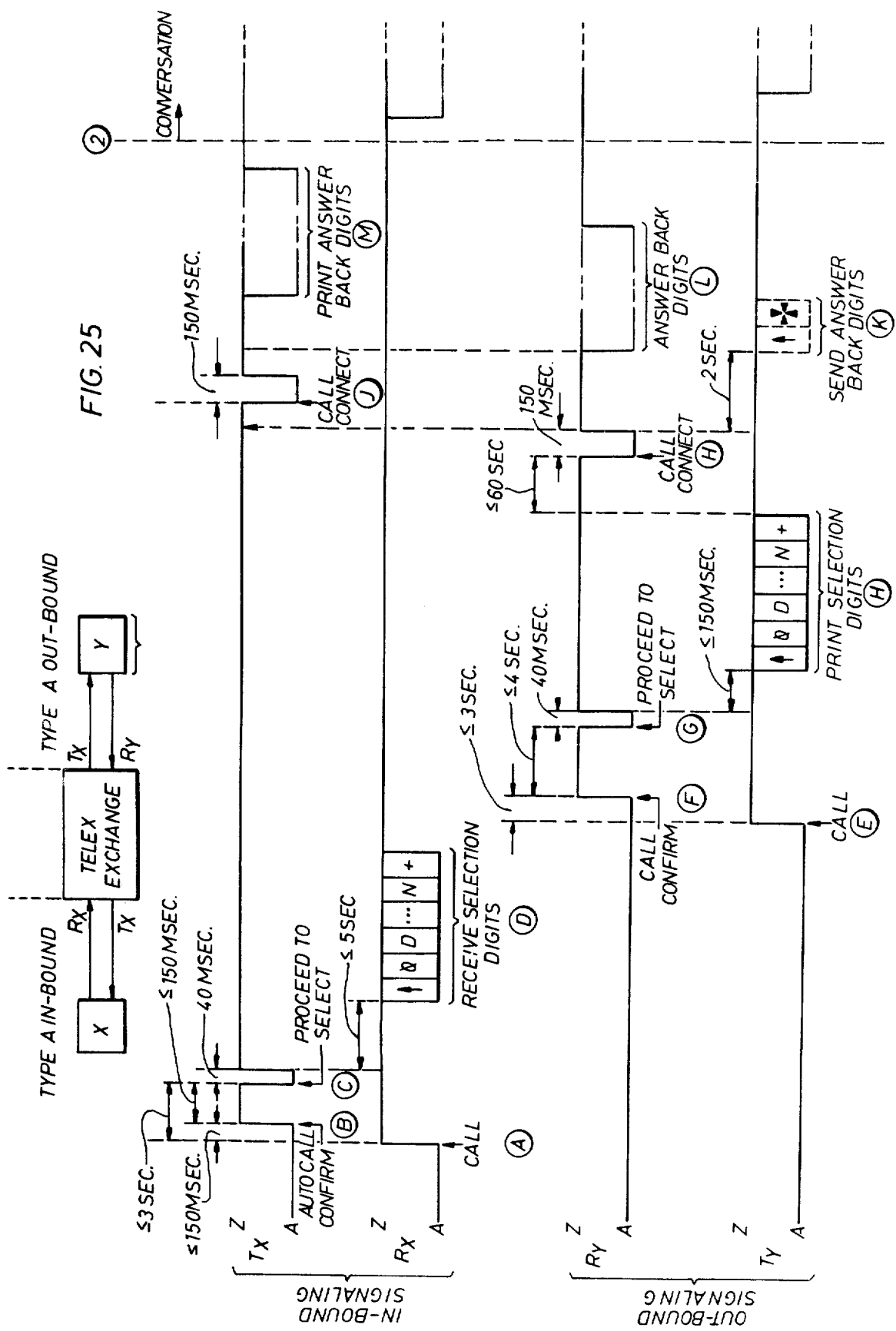
FIG. 25 is a timing diagram illustrating the signaling sequences between a type A inbound termination and a type A outbound termination during a call set-up.

TSP performs the following functions:

1. Upon entry, sets the LINE to the polarity P defined by the user (V00=- -0P,LSB of V00=polarity).
2. Optionally (if V00=-01P) holds the first polarity P for a time T1 given by the user in the VRF 66. At the end of this time, the LINE polarity is changed to the inverse of P.
3. Optionally (if V00=-11P) sets the LINE to polarity P and holds that polarity for a time T1 given in the VRF 66, changes LINE polarity to the inverse of P, holds that polarity for a time T2 given in the VRF 66 and then returns the LINE polarity to P.
4. Optionally (if V00=1 - - -) changes function state to TSC at the completion of the specified transmission of polarities. Otherwise (if V00=0- - -) TSP returns to FREE upon completion.
5. TSP sets a status bit at the completion of its transmissions.
6. If the terminator configuration is single current, TSP sets a single current inhibit flag for the receive processor (an interprocessor flag) at the beginning of the transmission of A polarity. The inhibit is removed at the beginning of the transmission of Z polarity (A and Z polarities are shown in FIG. 25).
7. At every sample TSP monitors the interprocessor flags for a request from the receive processor to the transmit processor to transmit clear confirm. After transmission of clear confirm, the transmit processor goes to the FREE state.

| Cache Memory Assignments | | |
|---|---|---|
| Sub-word | Bits | Function |
| Input: | | |
| C31 | 0 | Single current configuration if=0. |
| V00 | 3-0 | Function options of TSP are enabled by bits set in V00. |
|  | 0 | P= value of 1st polarity to be transmitted. P= 1 is Z polarity. P=0 is A polarity. |
|  | 1 | If=0, transmit only one polarity. If=1, transmit first polarity for time given in V×-V30, then transmit opposite polarity (V00= -01P). |
|  | 2 | If=0, transmit only two polarities. If=1, transmit first polarity for time given in V33-V30, then opposite polarity for time given in V23-V20, then return to first polarity. Note: if this bit=1, V00 bit 1 must also=1 (V00= -11P). |
|  | 3 | If=1, automatic function change to Transmit Supervisory Characters (TSC) when TSP completes. If=0, return to FREE when TSP completes. |
| V01 | 3-0 | Options word for TSC if V00-1---. |
| V20 | 3-0 | V23,V22,V21,V20 is a 16-bit counter (V23=4MSB) which gives the time of the 2nd polarity if V00= -11P. |
| V21 | 3-0 | |
| V22 | 3-0 | |
| V23 | 3-0 | |
| V30 | 3-0 | V33,V32,V31,V30 is a 16-bit counter (V33=4MSB) which gives the time of the 1st polarity if V00= --1P. |
| V31 | 3-0 | |
| V32 | 3-0 | |
| V33 | 3-0 | |
| Output: | | |
| V03 | 3 | Initialized=0 when TSP is entered, set=1 when TSP completes. |

Transmit Supervisory Characters-TSC

Processing Description

Transmit supervisory characters (TSC) couples to the LINE and/or the BUS a character which has been placed in the VRF 66. The user controls separately the length of the start bit, data bit, and stop bit of the character. When TSC detects a request for character transmission, it moves the character to a work area and thus allows the group controller 8 to enter the next character to be transmitted while the current character is being transmitted.

Program control remains in TSC until forced to change by the group controller 8 or until a request to transmit clear confirm is detected (via interprocessor flag) from the receive processor. In the latter case, the transmit processor goes to the FREE state.

A special entry point named ATOTSC allows the user to cause execution of TSC to begin only after the receipt of a request for transmission (via interprocessor flag) from the receive processor. This allows the user to have a transmit activity automatically sequenced to follow an event registered by the receive processor.

Functions Performed

TSC performs the following functions:
1. Monitors a status bit set by the group controller to indicate the presence in the VRF 66 of a character to be transmitted.
2. TSC moves the character to be transmitted to an output buffer and resets the new character status bit. This allows the group controller 8 to insert the next character to be transmitted into the VRF 66 while the current character is being transmitted.
3. TSC transmits the start bit for a time given for the start bit in the CRF 64. This allows the start bit length to be independently controlled. This ability is used to effect distorted character transmission.
4. TSC transmits data bits with a bit length given in the CRF 64.
5. TSC transmits the stop bit for a bit length given in the CRF 64. This allows the stop bit length to be independently controlled.
6. The character supplied by the group controller 8 is without start and stop bits so TSC generates these bits per 3 and 5 above.
7. TSC optionally (V00=---1) couples to the LINE.
8. TSC optionaly (V00=- -1-) couples to the BUS. (coupling to the LINE and/or BUS are independent options).
9. If the terminator configuration is single current (2 wire) at the beginning of the start bit transmission, TSC sets a single current inhibit flag for the receive processor (an interprocessor flag). At the beginning of the stop bit transmission, the inhibit is removed.
10. At every sample, TSC monitors the interprocessor flags for a request from the receive processor to the transmit processor to transmit a clear confirm. After transmission of clear confirm, the transmit processor goes to the FREE routine.

| Sub-word | Cache Memory Assignments Bits | Function |
|---|---|---|
| Input: | | |
| C00 | 3-0 | C01,C00 is an 8-bit field (C01 = |
| C01 | 3-0 | 4 MSB) which defines the length of the data bit (as a number of samples). |
| C10 | 3-0 | C11,C10 is an 8-bit field (C11 = |
| C11 | 3-0 | 4 MSB) which defines the length of the start bit. |
| C12 | 3-0 | Number of information bits per character (exclusive of start and stop). |
| C20 | | C21,C20 is an 8-bit field (C21 = |
| C21 | | 4 MSB) which defines the length of the stop bit. |
| C31 | 0 | Single current configuration if=0. |
| V00 | 3-0 | Function options within TSC are enabled by bits set in V00. |
| | 0 | If=1, couple data to LINE. |
| | 1 | If=1, couple data to BUS. |
| V20 | 3-0 | V21,V20 is an 8-bit field in which |
| V21 | 3-0 | the character to be transmitted is inserted (rt. adjusted without start and stop bits). |
| V23 | 3 | Transmit request flag. Set=1 by the group controller when a character to be transmitted is placed in V21,V20 (See Output). |
| Output: | | |
| V03 | 3 | If=1, TSP has completed and the automatic function change to TSC has occurred. |
| V23 | 3 | Set=0 when TSC has accepted the character to be transmitted and the buffer V21, V20 is available for a new character. (See input). |

Transmit Coupled Characters-TCC

Processing Description

TCC couples data from the BUS to the LINE and/or back to the BUS. TCC also assembles the data from the BUS into a character which is placed in the VRF 66.

TCC scans the BUS for a transistion from Z to A which indicates the beginning of a character. When A polarity is detected, TCC initializes its counters and counts up to what should be the mid-bit of the character start bit. TCC subsequently samples the BUS at the mid-bit samples of the data bits and the stop bit. The value of the BUS at these samples is coupled to the LINE and/or the BUS and is assembled into the character buffer in the VRF 66.

TCC can optionally force Z polarity at the stop bit sample regardless of the value on the BUS. TCC also holds the stop polarity (coupled to LINE or BUS) for a minimum number of samples specified by the user, regardless of the length of the stop bit on the BUS.

TCC begins the scan of the BUS for a new character concurrently with the output of the current character's stop bit. If, however, the length of the stop bit on the BUS is shorter than the user specified minimum stop (TCC transmits the stop for a length always equal to or greater than the minimum stop), the point in time where TCC samples the BUS for data will be shifted by an amount equal to that difference. For a series of N characters if the product of N times the minimum stop is greater than the sum of the lengths of the N stop bits on the BUS by one-half a data bit length, BUS sampling errors will occur. Stop bits on the BUS which are longer than the minimum stop reverse the shift in the sample point.

Functions Performed

TCC performs the following functions:
1. TCC assembles into the VRF 66 the value of the BUS at the mid-bit sample of the data bits of the character. The assembled character is right adjusted and zero filled to the left (required only for level codes less than eight) within an eight (8) bit field of a VRF 66 word. The assembled character remains in the VRF 66 until the assembly of a new character is completed. Therefore the assembled character is available to be read by the group controller for a time equal to at least one character time. TCC sets a status bit when it has assembled a character and moved it to the VRF 66 to be read by the group controller.

2. In conjunction with the character assembly from the BUS, TCC sets a bit in the VRF 66 equal to the value of the BUS at the stop bit sample.
3. TCC optionally (V00=---1) couples data from the BUS to the LINE.
4. TCC optionally (V00=--1-) couples data from the BUS back to the BUS.
5. If coupling to the LINE is enabled, and if the terminator configuration is single current, TCC sets an interprocessor single current inhibit flag to the receive processor at the beginning of the start bit and clears this flag at the beginning of the stop bit (cleared only if the stop bit value being transmitted to the LINE is Z polarity).
6. TCC optionally (V00=-1--) couples Z polarity in the stop bit position regardless of the value of the BUS.
7. TCC transmits the stop bit value (either a forced Z, or the value of the BUS at the stop bit sample) for a time given in the CRF 64 (minimum stop bit value). Thus the character transmitted by TCC always has a stop bit equal to or greater than a user specified minimum.
8. At every sample, TCC monitors the interprocessor flag for a request for the receive processor to the transmit processor to transmit clear confirm. After transmission of the clear confirm, that transmit processor goes to the FREE routine.

| Cache Memory Assignments | | |
|---|---|---|
| Sub-word | Bits | Function |
| Input: | | |
| C00 | 3-0 | C01,C00 is an eight (8) bit field |
| C01 | 3-0 | (C01=4 MSB) which defines the length of the data bit (as a number of samples). |
| C02 | 3-0 | C03,C02 is an eight (8) bit field |
| C03 | 3-0 | (C03=4 MSB) which defines the mid-bit sample. The count begins with zero. |
| C12 | 3-0 | The number of information bits per character (exclusive of start and stop). |
| C20 | 3-0 | C21,C20 is an eight (8) bit field |
| C21 | 3-0 | (C21=4 MSB) which defines the length (as a number of samples) of the stop bit. |
| C21 | 0 | Single current terminator if=0. |
| V00 | 3-0 | Function options for TC are enabled by bits set in V00. |
| | 0 | If=1, couple data from BUS to LINE. |
| | 1 | If=1, couple data from the BUS back to the BUS. |
| | 2 | If=1, couple Z polarity as the stop bit value regardless of the value on the BUS. |
| Output: | | |
| V20 | 3-0 | V21,V20 is an eight bit field |
| V21 | 3-0 | which contains the character assembled from the BUS (right |

| Cache Memory Assignments | | |
|---|---|---|
| Sub-word | Bits | Function |
| | | adjusted, zero filled without start and stop). |
| V22 | 3 | The value of the stop bit taken from the BUS. |
| V23 | 3 | Set=1 when assembled character is ready in V21,V20. TCC does not clear this flag. |

Receive Processor Signaling Routines

Receive FREE

Processing Description

The FREE function is intended to be a transitional function state. When in the FREE state, the variable 66 and constant 64 files can be set up for any receive processor function.

The LC can automatically return to the FREE state after the completion of a preceeding function state, or, as is the case with all function states, it can be forced to FREE by the appropriate entry in the PRF 67.

Except for maintaining three status values FREE does no processing. FREE references two variable cache memory 74 subwords in order to maintain these status values. FREE makes no references to the CRF 64 file. Except for the two variable cache 74 subwords required for status maintenance, all variables cache 74 subwords set by the preceeding function are preserved in FREE.

Functions Performed

The FREE routine performs the following functions:
1. Maintains the value of the LINE as a status bit.
2. Passes value of hardware LOCKOUT flag as a status bit.
3. Checks for the Open Loop condition and gives Open Loop status as a status bit.
4. Clears interprocessor message flags to the transmit processor.

| Cache Memory Assignment | | |
|---|---|---|
| Sub-word | Bits | Function |
| Output: | | |
| V02 | 0 | Value of LINE at last sample. |
| | 2 | Value of hardware LOCKOUT flag at last sample. |
| | 3 | Open Loop status at last sample (1 = Open Loop). |

Call Detect-CLD

Processing Description

CLD scans the LINE for the user designated CALL polarity. When this polarity is detected, its duration is compared to a predefined constant. If the CALL polarity holds for the required duration, a CALL has been detected.

Once the CALL polarity is detected on the LINE, a return to the opposite polarity will not disqualify the signal as a CALL until its duration equals a user defined filter value of from 0 to 16 samples. If the CALL polarity duration is less than required, all counters are reset to zero and the LINE scan for CALL polarity begins as it did initially.

CLD maintains the value of the LINE, LOCKOUT, and Open Loop Status. Value of LINE and Open Loop Status is maintained at every sample. LOCKOUT status is monitored only when LINE polarity does not equal CALL polarity.

Upon detection of CALL, the receive processor will automatically change function status to either FREE or Character Detect (CHD). Also, per user input, CLD will automatically activate a transmission, call confirm, upon CALL detect.

Functions Performed

CLD performs the following functions:
1. Maintains the value of the LINE as a status bit.
2. Passes value of hardware LOCKOUT flag as a status bit.
3. Checks for the Open Loop condition and gives Open Loop Status as a status bit.
4. Scans the LINE for the user defined CALL polarity.
5. Filters LINE transitions from the CALL polarity up to a maximum value of 16 samples.
6. Sets a VRF 66 status bit indicating that CALL has been detected.
7. Automatic transition to either FREE or CHD after CALL detect.
8. Optional request for transmission upon CALL detect.

| Cache Memory Assignments | | |
|---|---|---|
| Sub-word | Bits | Function |
| Input: | | |
| C13 | 3-0 | Line transition filter. Signal is disqualified as a CALL if the transition from CALL polarity holds for the filter value. |
| C30 | 3-0 | C32,C31,C30 is a 12-bit count (C32= |
| C31 | 3-0 | 4 MSB) which defines the CALL signal |
| C32 | 3-0 | duration as number of samples. |
| V00 | 0 | CALL polarity (1=mark, 0=space) |
| | 2 | If=1, transmission upon CALL detect. |
| | 3 | If=1, automatic function change to Character Detect after CALL detect. If=0, automatic function change to FREE after CALL detect. |
| V01 | 3-0 | Options word for CHD if V00=1 - - -. |
| Output: | | |
| V02 | 0 | Value of LINE at last sample. |
| | 2 | Value of hardware LOCKOUT flat at last sample. |
| | 3 | Open Loop status at last sample. |
| V03 | 0 | Set=1 when CALL detect, =0 otherwise. |
| | 3 | Set=1 when CALL detect, =0 otherwise. This bit indicates CALL detect and that the LC has changed function states as per V00 bit 3. |

Signal/Pulse Detect-SPD

Processing Description

SPD scans the LINE for a user defined polarity. The LINE must attain this polarity within a time given by the user. If the LINE does not attain the polarity in time, SPD sets status bits indicating a time out condition and automatically changes function state to FREE. The time count for the first polarity begins when SPD is entered.

If the LINE attains the polarity within time, SPD optionally scans the LINE for a transition to the opposite polarity to occur within a second elasped time given by the user. The count for the 2nd polarity begins when the line transitions to the 1st polarity. In the case where the LINE equals the 1st polarity when SPD is entered, the scan for the 2nd polarity begins immediately. If the LINE fails to attain the 2nd polarity in time, SPD sets status bits indicating that the 1st polarity was detected but that the 2nd polarity was not and automatically changes function state to FREE.

If all desired polarities are detected in time, SPD sets status bits indicating this and automatically changes function state to either FREE or CHD. All LINE transitions are filtered by a user input. The LINE must hold the polarity for a time equal to the transition filter before SPD considers that the polarity has been detected.

When a polarity is detected, SPD adjusts the time counter associated with that polarity so that the counter equals the number of samples remaining before time out. This adjustment is required in the case of a non-zero transition filter value, because the counter continues to be decremented until the polarity has held for the value of the filter. The counter value can be used to compute the exact sample when the LINE attained the desired polarity. The time counter equals minus one (2's complement) in the case of a time out.

Functions Performed

SPD performs the following functions:
1. Maintains the value of the LINE as a status bit.
2. Passes the value of the hardware LOCKOUT flag as a status bit.
3. Scans the LINE for a user defined polarity to be attained within a user defined elapsed time. The time count begins when SPD is entered.
4. Sets status bits indicating 1st polarity detection or time out.
5. Optionally scans the LINE for a transition from the 1st polarity to occur within a second user defined elapsed time. The time count for the 2nd polarity begins when the LINE attains the 1st polarity.
6. Sets status bits indicating 2nd polarity detection or time out.
7. Filters LINE transitions. A polarity is not considered detected until it holds continuously for the transition filter value.
8. Adjusts the time counters (first and second polarities) so that they reflect the exact sample at which the LINE equaled that polarity.
9. In case of either a 1st or 2nd polarity time out, SPD automatically changes function state to FREE.
10. In case of a successful detection of all requested polarities, SPD automatically transitions to either FREE or CHD.

| Cache Memory Assignments | | |
|---|---|---|
| Sub-word | Bits | Function |
| Input: | | |
| C13 | 3-0 | Transition filter. LINE must hold polarity for this number of samples before SPD considers the polarity to be valid. |
| V00 | 3-0 | Function options within SPD are enabled by bits set in V00. |
| | 0 | Value of first polarity to be detected. |
| | 1 | If=1, SPD looks for the LINE to attain a second polarity (transition from first polarity). |
| | 3 | If=1, automatic change of function state to CHD if all desired polarities are detected. |

-continued

| Cache Memory Assignments | | |
|---|---|---|
| Sub-word | Bits | Function |
| | | If=0, automatic change of function state to FREE when SPD terminate either successfully or as a result of a time out. |
| V01 | 3-0 | Options word for CHD in case V00=1 - - -. |
| V20 | 3-0 | V23,V22,V21,V20 is a 16 bit |
| V21 | 3-0 | counter (V23=4MSB) which defines |
| V22 | 3-0 | the maximum elapsed time allowed |
| V23 | 3-0 | for the LINE to transition from the polarity given by V00 bit 0. If V00=- - 0 -, this counter is not used. |
| V30 | | V33,V32,V32,V30 is a 16 bit count- |
| V31 | | er (V33=4MSB) which defines the |
| V32 | | maximum elapsed time allowed from |
| V33 | | the time SPD is entered until the LINE attains the polarity given in V00 bit 0. |
| Output: | | |
| V02 | 0 | Value of LINE at last sample. |
| | 2 | Value of hardware LOCKOUT flag at last sample. |
| V03 | 2-0 | Count of successfully detected polarities. 0=1st polarity time out 1=1st polarity detected 2=1st and 2nd polartity detected. |
| | 3 | Initialized=0 when SPD is entered. Set=1 when SPD terminates either by successful polarity detection or by polarity time out. |
| V20 | | V23,V22,V21,V20 is a 16 counter (V23=4MSB). |
| V21 | | If 2nd polarity time out, its |
| V22 | | value with be= −1 (2's complement). If 2nd polarity detected, its value equals the counts remaining before time out. This count value is preserved only if the LC transitions to FREE after SPD. |
| V30 | | V33,V32,V31,V30 is a 16 bit counter (V33=4MSB). |
| V31 | | If 1st polarity time out, its value |
| V32 | | will be= −1 (2's complement). If |
| V33 | | 1st polarity detected, its value equals the counts remaining before time out. This count value is preserved only if the LC transitions to FREE after SPD. |

Character Detect-CHD

Processing Description

CHD scans the LINE for a transition from Z to A polarity which indicates the beginning of a character. While the LINE remains in Z polarity, CHD maintains the Open Loop and lockout status bits in the VRF 66.

When the LINE transitions to A polarity indicating the beginning of a character start bit CHD initializes its counters and counts up to what should be the mid-bit of the character start bit. If the LINE polarity is Z at this sample, CHD rejects the original transition to A being a valid start bit and returns to scan the LINE for A again. If the LINE polarity is A, CHD assumes that it has a valid start bit and character assembly begins.

CHD subsequently samples the LINE at what should be the mid-bit samples of the data bits and the stop bit. The value of the LINE at these samples is assembled into the character buffer in the VRF 66 and optionally coupled to the BUS.

At the end of the character, CHD checks for duplicate characters, a clear condition, and a FIGURES SHIFT or LETTERS SHIFT character. This processing is done during those samples which occur from the mid-bit of the stop bit to the end of the stop bit. CHD requires that the stop bit have a length at least equal to that of a normal data bit.

CHD then returns to scan the LINE for the beginning of a new character. Control remains in CHD until changed by the group controller 8.

Functions Performed

CHD performs the following functions:
1. Maintains the value of the LINE as a status bit.
2. Passes the value of the hardware LOCKOUT flag as a status bit. This status bit processing is performed only when CHD is scanning the LINE for A polarity which designates the beginning of a character. This status bit is not updated during the assembly of a character.
3. Performs a check for the Open Loop condition and gives the Open Loop Status as a status bit. The Open Loop processing is performed only when CHD is scanning the LINE for A polarity which designates the beginning of a character. Open Loop processing is not performed during the assembly of a character.
4. CHD preserves the value of V03. Therefore the group controller 10 can determine when an automatic function change from SPD or CLD to CHD has occurred.
5. CHD optionally (if V00=- - -1) couples the value of the LINE at the mid-bit sample to the BUS. This includes the value of the LINE at the mid-bit of the start bit (always=0) and of the stop bit (may=0).
6. CHD assembles into the VRF 66 the value of the LINE at the mid-bit sample of the data bits of the character. The assembled character is right adjusted and zero filled to the left (required only for level codes less than eight) within an eight (8) bit field of a VRF 66 word. The assembled character consists only of the data bits exclusive of start and stop. The previously assembled character remains in the VRF 66 until the assembly of a new character is completed. Therefore, the assembled character is available to be read by the group controller 8 for a time equal to at least one character time.
7. CHD compares the current character with the previous character and increments a duplicate character counter if they are equal. The counter can indicate a maximum of eight (8) consecutive duplicate characters. The first occurrence of a non-duplicate character clears this counter. The compare includes the value of the stop bit as well as the data bits.
8. CHD sets a status bit to indicate the occurrence of five (5) successive duplicate characters. The first occurrence of a non-duplicate character clears this counter.
9. CHD sets a status bit to indicate the occurrence of three (3) successive clear characters (all data bits and stop bit=0). Once set, this status bit is not reset by CHD.
10. CHD sets a status bit equal to one (1) at the occurrence of a FIGURES SHIFT character and equal to zero (0) at the occurrence of a LETTERS SHIFT character.
11. Upon detection of three successive clear characters, CHD will optionally (if V00=1- - -) request the transmit LC via interprocessor flag to transmit clear confirm.

12. CHD can detect early and late transitions within a character. CHD will report the early or late transition as distortion if the transition occurs with a deviation from normal (the deviation is measured in number of samples) greater than that specified by a number (the Distortion Window, DW) in the CRF 64. The distortion report consists of incrementing either an Early Transition Counter or Late Transition Counter in the VRF 66. Although it is possible to have more than one of both early and late transitions within a character, CHD reports distortion only once per character. The first instance of a distortion great enough to increment either the early or late transition counter is the only one reported for that character. A more detailed discussion of distortion reporting is given at the end of the discussion of the receive processor firmware.

13. When scanning the LINE for the beginning of a new character, CHD monitors an interprocessor flag (the transmit processor controls this flag) for a single current inhibit condition. CHD will process a polarity as the beginning of a character (the start bit) only if the single current inhibit flag equals zero. CHD does not look at the flag during character assembly.

| Cache Memory Assignments | | |
|---|---|---|
| Sub-word | Bits | Function |
| Input: | | |
| C00 | 3-0 | C01,C00 is an eight (8) bit field |
| C01 | 3-0 | (C01=4 MSB) which defines the length of the data bit (as a number of samples). |
| C02 | 3-0 | C03,C02 is an eight (8) bit field |
| C-3 | 3-0 | (C03=4MSB) which defines the mid-bit sample. The count begins with zero. |
| C10 | 3-0 | C12,C10 is an eight (8) bit field |
| C12 | 3-0 | (C12=4 MSB) which defines the distortion window (DW) as a number of samples. |
| C13 | 3-0 | The number of information (data) bits per character (exclusive of start and stop). |
| C20 | 3-0 | C21,C20 is an eight (8) bit field |
| C21 | 3-0 | which contains the FIGURES SHIFT character right adjusted, zero filled and exclusive of start and stop. |
| C22 | 3-0 | C23,C22 is an eight (8) bit field |
| C23 | 3-0 | which contains the LETTERS SHIFT character right adjusted, zero filled and exclusive of start and stop. |
| V00 | 3-0 | Function options within CHD are enabled by bits set in V00. |
| | 0 | If=1, couple data to the BUS. |
| | 3 | If=1, request transmission of clear confirm upon detection of clear. |
| V02 | 0 | Value of the LINE at the last sample. |
| | 1 | Status bit whose value reflects which of two characters occurred most recently: if=1, a FIGURES SHIFT; if=0, a LETTERS SHIFT. |
| | 2 | Status bit equal to value of hardware LOCKOUT flag. |
| | 3 | Status bit which if=1 indicates an Open Loop condition. |
| V03 | 2-0 | Set by either SPD or CLD but preserved in CHD. Indicates number of polarities detected. |

| -continued | | |
|---|---|---|
| Cache Memory Assignments | | |
| Sub-word | Bits | Function |
| | 3 | Set at the completion of either SPD or CLD. Indicates that an automatic function state change from either SPD or CLD has occurred. |
| V20 | 3-0 | V21,V20 is an eight (8) bit field |
| V21 | 3-0 | which contains the character assembled from the LINE. It is right adjusted and zero filled and exclusive of start and stop. |
| V22 | 2-0 | Consecutive duplicate character count minus 1. A value of N indicates N+1 duplicate characters. |
| | 3 | The value of the stop bit taken from the LINE for the character in V21,V20. |
| V23 | 1-0 | Received characters count. This field is incremented (to a maximum of three (3)) whenever a character has been assembled and placed in V21,V20 for the group controller 8 to read. |
| | 2 | 5 duplicate characters flag. Set whenever five (5) consecutive duplicate characters are encountered. Cleared at first occurrence of a non-duplicate character. |
| | 3 | Clear detected flag. If=1, indicates that three (3) consecutive clear characters were detected. Once set, this bit is not cleared by CHD. (Set=0 by CHD everytime CHD is initialized however). |
| V30 | 3-0 | Early transitions counter. Incremented once per character if an early transition is the first within the character to exceed the distortion window. |
| V31 | 3-0 | Late transitions counter. Incremented once per character if a late transition is the first within the character to exceed the distortion window. |

Open Loop Algorithm

The Open Loop condition is looked for only by the receive processor and then only in specific routines and in some routines only during specific phases of processing. The Open Loop algorithm requires one four (4) bit sub-word in the VRF 66 for counting (hereafter referred to as the counter) and on VRF 66 status bit (hereafter referred to as the Open Loop Status) which is the output of the Open Loop algorithm. The algorithm looks at the hardware Open Loop flag (hereafter referred to as the Open Loop Flag) for input.

The Open Loop algorithm functions as follows:
1. The counter is incremented whenever the Open Loop Flag=1 until a maximum value of 12 has been reached.
2. If the Open Loop Flag=0 *before* the counter has been incremented to a value of 12, the counter is reset to =0 and the Open Loop Status bit is set =0.
3. 12 consecutive samples with the Open Loop Flag=1 cause the Open Loop Status to be set =1. This defines the Open Loop condition.
4. Once the Open Loop Status=1, successive samples which have the Open Loop Flag=1 cause the counter to be reset =12.
5. If the counter equals 12 or greater and the Open Loop Flag=0, the counter is incremented. The Open Loop Status remains =1.

6. 4 consecutive samples with the Open Loop Flag=0 cause the counter to overflow to 0. This defines the clearing of the Open Loop condition and the Open Loop Status is set =0. The Open Loop algorithm is now essentially reinitialized to step 1.
7. If the counter is greater than 12 and the Open Loop Flag=1, the counter is reset =12. The Open Loop Status remains set =1.
8. Whenever the Open Loop Status=1, the routine being executed ignores the actual value of the LINE and instead follows the execution path corresponding to LINE =0.

Envelope Distortion Reporting

The following discussion defines what is meant by distortion and describes the manner in which the line controller 10 measures and reports it.

As previously discussed, the line controller 10 does not monitor each termination continuously. The line controller 10 monitors or services a termination in periodic time share intervals. Each time share interval is 2.89 us and the line controller executes exactly 18 instructions during that interval. The period or elapsed time between servicing intervals depends primarily on the data rate of the termination. A 300 baud line is serviced with a periodicity of 0.37 ms. A 50 baud line is serviced with a periodicity of 2.2 ms. Whatever the baud rate is, the line is serviced with a periodicity that results in a minimum of 9 servicing intervals (hereafter referred to as line samples or samples) per bit time. A bit time is the inverse of the baud rate, e.g., the bit time for a 50 baud line is 1/50 seconds which is 20 ms. Note that the line sample periodicity of a 50 baud line is 2.2 ms which results in 9 samples every 20 ms or 9 samples every bit time as stated.

In distortion free character transmission, the start bit and each information bit of the character have a length equal to the inverse of the baud rate of the line. Therefore, in a 50 baud line, when the line polarity changes from Z to A at the start of a character, the first information bit should begin 20 ms later. If the first information bit were a "1" then the line would change polarity from A to Z. If the first information bit were a "0", there would not be a change in line polarity. In distortion free transmission, changes in line polarity occur at predictable intervals from the start of the character. For a 50 baud line, a change in line polarity will occur at n×20 ms after the start of the character if bit n (n=0 for the start bit) is different in value from bit n−1.

When distortion is present, the line changes polarity within a character either too early or too late with respect to the 1/baud timing rule of distortion free transmission. The envelope distortion algorithm in the line controller attempts to measure the frequency and severity of this distortion. Since the line controller does not monitor the line continuously, it can only detect line transition anomolies with a resolution related to the servicing periodicity of the line, i.e., within an envelope or bracket around the nominal (distortion free) transition point.

The LC uses three constants in its algorithm for envelope distortion reporting:
1. the samples per bit (SPB)
2. the samples to mid-bit (MID)
3. the distortion window (DW)

These constants are defined as follows:

SPB=the number of samples that occur during a time=1/baud

MID=the number of samples which most nearly approximate the mid point of the bit given at the bit begins with sample number =0.

DW=the distortion window as a number of samples. It has meaning from values in the range of 0 to MID−1.

When the start bit of a character is detected, the line controller 10 counting algorithm identifies the nominal transition points (start and end of data bits) within the character. A line polarity change which occurs after the nominal beginning of a bit but before mid-bit is a *late* transition. A polarity change which occurs after the mid-bit but before the nominal beginning of the next bit is an *early* transition. The DW determines which early and late transitions will be counted. A DW=0 will count all transitions as either early or late except those transitions that are detected at the nominal transition sample. A DW=1 will count all transitions as distortion except those that are detected one sample before, one sample after and at the nominal transition sample. A DW=2 will not count transitions as distortion if they are detected within an envelope beginning 2 samples before and ending two samples after the nominal transition sample.

The output of the algorithm is registered in two 4-bit counters, one for early transitions and one for late transitions. Within an individual character, distortion is counted only *once*. The first occurrence of a transition whose deviation from normal exceeds the DW causes the appropriate counter to be incremented. Subsequent early or late transitions within the character are not counted. Incrementing a counter which is full (=15 decimal) causes the counter to overflow to zero.

The distortion algorithm is always enabled in the Receive Character Detect Mode (CHD). To make the algorithm produce useful results, the DW must be set in the CRF 64. The early and late transitions counters are found in the VRF 66. The group controller 8 can reset these counters at any time. In particular, it can reset them in conjunction with reading the assembled character from the VRF 66.

Signaling Routine Source Code-Examples

The following receive (CLD) and transmit (TSP) signaling routines listings are presented here as examples of the coding which goes into all of the various firmware routines. A person of a ordinary skill in the art having these examples and the previous discussion of the line controller signaling routines could produce the coding needed for each routines.

```
Receive Call Detect (CLD)
1                            .SBTTL RECEIVE - CLD: CALL DETECT
2
3      000010                .RADIX 8
4
5                    ;
6                    ;       EQUATES
```

```
                     -continued
 7     ;
 8     ;       CONSTANT FILE
 9     ;
10   000007        TRNMIN  =  7        ;NO. OF SAMPLES SIGNAL MUST
11                                     ;HOLD FOR TRANSITION
12   000014        CSD1    = 14        ;CALL SIGNAL DURATION. 12-
                                       ;BIT COUNT
13   000015        CSD2    = 15        ;WHICH GIVES TIME SIGNAL
                                       ;MUST
14   000016        CSD3    = 16        ;HOLD TO BE A CALL OR SER-
                                       ;VICE BID
15
16     ;       VARIABLE FILE
17     ;
18   000000        MODE    = 0         ;OPTIONS WORD FOR CLD
19                                     ;---P P = CALL POLARITY
20                                     ;-i--REQUEST TO TRANSMIT
                                       ;UPON CALL DETECT
21                                     ;i---TRANSITION TO CHAR-
                                       ;ACTER DETECT (CHD)
22                                     ;WHEN CALL DETECTED
23   000001        NMODE   =  1        ;MODE WORD FOR FUNCTION
                                       ;AFTER CLD
24   000002        SLINE   =  2        ;---X = SAVED LINE VALUE
25   000002        LCKOUT  =  2        ;-M-- = LOCK OUT STATUS
26   000002        OPENLP  =  2        ;X--- = OPEN LOOP CONDITION:
                                       ;1 = OPEN LOOP
27   000003        DPCHT   =  3        ;COMPLETION FLAG AND # OF
                                       ;POLARITIES DETECTED
28                                     ;YXXX : Y = 1 WHEN CALL
                                       ;DETECTED, = 8 OTHERWISE
29                                     ;XXX = 1 WHEN CALL DETECTED
30   000007        TRNFLT  =  7        ;TRANSITION FILTER. COM-
                                       ;PARE WITH TRNMIN
31   000006        OLCHT   =  6        ;OPEN LOOP COUNTER
32   000014        CHT1    = 14        ;12-BUT RUNNING COUNTER TO
                                       ;TIME
33   000015        CHT2    = 15        ;CALL SIGNAL. COMPARED WITH
                                       ;CSD.
34   000016        CHT3    = 16
35   000002        .RADIX 2

1   ;CALL DETECT
 2   ;THIS ROUTINE SCANS THE LINE FOR POLARITY GIVEN BY LSB
     ;OF MODE WORD IN VARIABLE FILE. WHEN THIS POLARITY IS
 3   ;DETECTED ITS DURATION IS COMPARED TO THE TIME GIVEN BY
 4   ;12 BIT COUNT IN CONSTANT FILE (CSD). IF CALL POLARITY
 5   ;HOLDS CONTINUOUSLY FOR THIS LENGTH OF TIME, A CALL HAS
 6   ;BEEN DETECTED. THE VARIABLE OPCNT IS SET = 1001 (4
     ;BITS) TO INDICATE THIS CONDITION. IF SIGNAL DURATION
 7   ;IS LESS THAN CSD, ALL RUNNING COUNTERS ARE RESET TO 0
 8   ;AND LINE SCAN BEGINS TO LOOK FOR POLARITY GIVEN BY LSB
 9   ;OF MODE. THE VARIABLE DPCNT = 0 UNTIL CALL IS DETEC-
10   ;TED.
11   ;CLD ALSO MAINTAINS SAVED LINE VALUE, LOCKOUT STATUS,
     ;AND PERFORMS OPEN LOOP MONITORING. CLD SETS THE OPEN
12   ;LOOP STATUS BIT. THE CHECK FOR OPEN LOOP IS DONE
13   ;EVERY SAMPLE. LOCKOUT STATUS CHECK IS DONE ONLY WHEN
14   ;THE LINE DOES NOT EQUAL THE CALL POLARITY.
15   ;UPON DETECTION OF CALL, RECV. WILL GO TO CHARACTER
     ;DETECT MODE OR FREE MODE PER THE OPTION SELECTED IN
16   ;THE MODE WORD. ALSO CLD WILL SET MSG FLAG WHICH CAN BE
17   ;READ BY THE TRANSMITTER PER THE OPTION SELECTED IN THE
18   ;MODE WORD.
19   ;CLD OPTIONS ARE CONTROLLED BY BITS SET IN THE MODE
     ;WORD. MODE WORD BIT DEFINITIONS ARE AS FOLLOWS:
20   ; MODE:---P,P = CALL SIGNAL POLARITY
21   ; -X--,X = 1 SET MSG FLAG TO TRANSMITTER
22   ; X---,X = 1 AUTOMATIC TRANSITION TO CHARACTER

23   ;              DETECT AFTER BID DETECTED
24   ;            = 0 TRANSITION TO FREE AFTER BID DETECT
25   ;
26   ;
27   00174 CLD:
28   00174         MOVBA   TRNMIN,TRNFLT    ;INITIALIZE TRANSITION
                                            ;FILTER
     00174 064000
     00176 005567
29   00200         SET     0,DPCNT          ;CLD COMPLETION WORD
                                            ;INITIALIZED
     00200 064000
```

-continued

| | | | | | |
|---|---|---|---|---|---|
| | 00202 005003 | | | | |
| 30 | 00204 | UBUT | W3,0111 | | ;CALL SIGNAL COUNTER |
| | 00204 077560 | | | | |
| | 00206 041000 | | | | |
| 31 | 00210 | BU51 | | | ;SET CONVERSATION BUS<br>; = 1 |
| | 00210 064012 | | | | |
| | 00212 001200 | | | | |
| 32 | 00214 CLDO: | | | | |
| 33 | 00214 | WAIT | | | |
| | 00214 064043 | | | | |
| | 00216 101360 | | | | |
| 34 | 00220 | HOP | | | ;WAIT ONE INSTRUCTION<br>;BEFORE READING HDW<br>;FLAG |
| | 00220 06400 | | | | |
| | 00222 001000 | | | | |
| 35 | 00224 | BFLG | CLDOO,0010,LOPFLG | | ;OPEN LOOP CHECK,<br>;BRANCH IF HDW<br>;OPEN LOOP SET |
| | 00224 072054 | | | | |
| | 00226 103043 | | | | |
| 36 | 00230 | BRB5 | CKDIA,1100,OLCNT | | ;BRANCH IF OPEN<br>;LOOP NOT YET<br>;CLEARED |
| | 00230 072052 | | | | |
| | 00232 101206 | | | | |
| 37 | 00234 | AND | 0111,OPENLP | | ;CLEAR OPEN LOOP<br>;STATUS |
| | 00234 066000 | | | | |
| | 00236 005162 | | | | |
| 38 | 00240 | SET | 0,OLGNT | | ;CLEAR OPEN LOOP<br>;COUNTER |
| | 00240 064000 | | | | |
| | 00242 005006 | | | | |
| 39 | 00244 | BR | CLD1 | | |
| | 00244 064062 | | | | |
| | 00246 101360 | | | | |
| 40 | 00250 CLDOA: | | | | |
| 41 | 00250 | INC | OLCNT | | ;4 CONSECUTIVE NOT<br>;OPEN LOOP SAMPLES |
| | 00250 000000 | | | | |
| | 00252 005006 | | | | |
| 42 | | | | | ;CLEAR THE OPEN LOOP<br>;CONDITION |
| 43 | 00254 | BR | CLD2 | | ;WHEN OPEN LOOP, READ<br>;LINE AS = 0 |
| | 00254 064063 | | | | |
| | 00256 101360 | | | | |
| 44 | 00260 CLD08: | | | | |
| 45 | 00260 | BRB5 | CLDOC,1100,OLCNT | | ;BRANCH IF ALREADY<br>;IN OPEN LOOP |
| | 00260 072057 | | | | |
| | 00262 101306 | | | | |
| 46 | 00264 | INC | OLCNT | | |
| | 00264 000000 | | | | |
| | 00266 005006 | | | | |
| 47 | 00270 | BR | CLD1 | | |
| | 00270 064062 | | | | |
| | 00272 101360 | | | | |
| 48 | 00274 CLDOC: | | | | |
| 49 | 00274 | OR | 1000,OPENLP | | ;SET OPEN LOOP STATUS<br>; = 1 |
| | 00274 074000 | | | | |
| | 00276 005202 | | | | |
| 50 | 00300 | SET | 1100,OLCNT | | ;CLEAR NOT OPEN LOOP<br>;COUNTS FROM OLCNT |
| | 00300 064000 | | | | |
| | 00302 005306 | | | | |
| 51 | 00304 | BR | CLD2 | | ;WHEN OPEN LOOP,READ<br>;LINE AS = 0 |
| | 00304 064063 | | | | |
| | 00306 101360 | | | | |
| 52 | 00310 CLD1: | | | | ;LINE |
| 53 | 00310 | BFLG | CLD4,1000,LINE | | ;BRANCH IF LINE = 1 |
| | 00310 072067 | | | | |
| | 00312 103203 | | | | |
| 54 | 00314 CLD2: | | | | ;LINE = 0 |
| 55 | 00314 | ABD | 1110,SLINE | | ;SAVED VALUE OF LINE<br>; = 0 |
| | 00314 066000 | | | | |

-continued

|    |                    |        |                   |                                        |
|----|--------------------|--------|-------------------|----------------------------------------|
|    | 00316 005342       |        |                   |                                        |
| 56 | 00320              | BRBZ   | CLD8,0001,MODE    | ;BRANCH IF CALL<br>;POLARITY = 0       |
|    | 00320 050077       |        |                   |                                        |
|    | 00322 101028       |        |                   |                                        |
| 57 | 00324              | BHEA   | CLD10,TRNMIN,TRNFLT | ;BRANCH IF FIL-<br>;TER VALUE NOT<br>;REACHED |
|    | 00324 114101       |        |                   |                                        |
|    | 00326 121567       |        |                   |                                        |
| 58 | 00330              | BR     | CLDG              | ;DISQUALIFY AS CALL                    |
|    | 00330 064072       |        |                   |                                        |
|    | 00332 101360       |        |                   |                                        |
| 59 | 00334 CLD4:        |        |                   | ;LINE = 1                              |
| 60 | 00334              | OR     | 0001,SLINE        | ;SAVED LINE VALUE = 1                  |
|    | 00334 074000       |        |                   |                                        |
|    | 00336 005022       |        |                   |                                        |
| 61 | 00340              | BRBS   | CLD8,0001,MODE    | ;BRANCH IF CALL<br>;POLARITY = 1       |
|    | 00340 072077       |        |                   |                                        |
|    | 00342 101020       |        |                   |                                        |
| 62 | 00344              | BHEA   | CLD10,TRNMIN,TRNFLT | ;BRANCH IF 0 ON<br>;LINE LESS THAN<br>;TRNFLT |
|    | 00344 114101       |        |                   |                                        |
|    | 00346 121567       |        |                   |                                        |
| 63 | 00350 CLD6:        |        |                   | ;LINE POLARITY NOT<br>;EQUAL TO CALL   |
| 64 | 00350              | INIT   | W3,0111           | ;RESET CALL POLARITY<br>;DURATION COUNTER |
|    | 00350 077560       |        |                   |                                        |
|    | 00352 041000       |        |                   |                                        |
| 65 | 00354              | OR     | 0100,LCKOUT       | ;LOCK OUT CHECK                        |
|    | 00354 074000       |        |                   |                                        |
|    | 00356 005102       |        |                   |                                        |
| 66 | 00360              | BBFLG  | CLDO,0100,LCKFLG  | ;BRANCH IF HDW<br>;LOCK OUT FLAT = 0   |
|    | 00360 050043       |        |                   |                                        |
|    | 00362 103103       |        |                   |                                        |
| 67 | 00364              | AND    | 1011,LCKOUT       |                                        |
|    | 00364 066000       |        |                   |                                        |
|    | 00366 005262       |        |                   |                                        |
| 68 | 00370              | BR     | CLDO              |                                        |
|    | 00370 064043       |        |                   |                                        |
|    | 00372 101360       |        |                   |                                        |
| 69 | 00374 CLD8:        |        |                   | ;LINE POLARITY = CALL<br>;POLARITY     |
| 70 | 00374              | SET    | O,TRNFLT          | ;CLEAR TRANSITION<br>;FILTER           |
|    | 00374 064000       |        |                   |                                        |
|    | 00376 005007       |        |                   |                                        |
| 71 | 00400              | BR     | CLD12             | ;                                      |
|    | 00400 064102       |        |                   |                                        |
|    | 00402 101360       |        |                   |                                        |
| 72 | 00404 CLD10:       |        |                   | ;LINE POLARITY NOT<br>;EQUAL CALL      |
| 73 | 00404              | INC    | TRNFLT            |                                        |
|    | 00404 000000       |        |                   |                                        |
|    | 00406 005007       |        |                   |                                        |
| 74 | 00410 CLD12:       |        |                   | ;SIGNAL DURATION =<br>;CALL ?          |
| 75 | 00410              | BHEA   | CLD14,CSD1,CNT1   | ;                                      |
|    | 00410 114105       |        |                   |                                        |
|    | 00412 121714       |        |                   |                                        |
| 76 | 00414              | BHEA   | CLD14,CSD2,CNT2   | ;                                      |
|    | 00414 114105       |        |                   |                                        |
|    | 00416 121735       |        |                   |                                        |
| 77 | 00420              | BEA    | CLD20,CSD3,CNT3   | ;                                      |
|    | 00420 114110       |        |                   |                                        |
|    | 00422 101756       |        |                   |                                        |
| 78 | 00424 CLD14:       |        |                   | ;DURATION NOT EQUAL<br>;CALL           |
| 79 | 00424              | INCBNC | CLDO,CNT1         | ;INCREMENT CALL SIG<br>;DURATION COUNTER |
|    | 00424 000043       |        |                   |                                        |
|    | 00426 165014       |        |                   |                                        |
| 80 | 00430              | INCBNC | CLDO,CNT2         | ;                                      |
|    | 00430 000043       |        |                   |                                        |
|    | 00432 165015       |        |                   |                                        |
| 81 | 00434              | INCBNC | CLDO,CNT3         | ;                                      |
|    | 00434 000043       |        |                   |                                        |
|    | 00436 165016       |        |                   |                                        |

-continued

| | | | | |
|---|---|---|---|---|
| 82 | | | | ; |
| 83 | 00440 CLD20: | | | ;CALL DETECTED |
| 84 | 00440 | BRBZ | CLD30,0100,MODE | ;BRANCH IF NO ;TRANSMIT REQUEST |
| | 00440 050113 | | | |
| | 00442 101100 | | | |
| 85 | 00444 | SETF | 0100,MSGFLG | ;MESSAGE FLAT TO ;TRANSMIT |
| | 00444 064014 | | | |
| | 00446 064101 | | | |
| 86 | 00450 | WAIT | | |
| | 00450 064112 | | | |
| | 00452 101260 | | | |
| 87 | 00454 CLD30: | | | |
| 88 | 00454 | WAIT | | |
| | 00454 064113 | | | |
| | 00456 101360 | | | |
| 89 | 00460 | CLAF | 0100,MSGFLG | ;CLEAR MESSAGE FLAG |
| | 00460 056014 | | | |
| | 00462 003101 | | | |
| 90 | 00464 | SET | 1001,DPCNT | ;SET COMPLETION WORD |
| | 00464 064000 | | | |
| | 00466 005223 | | | |
| 91 | 00470 | BRB2 | FREE,1000,MODE | ;BRANCH TO FREE IF ;MODE = 0--- |
| | 00470 050010 | | | |
| | 00472 101200 | | | |
| 92 | 00474 | IDA | NMODE | ;OPTIONS WORD FOR ;NEXT FUNCTION |
| | 00474 076000 | | | |
| | 00476 005401 | | | |
| 93 | 00500 | STRBX | SGRPO,MODE | ; |
| | 00500 064000 | | | |
| | 00502 004000 | | | |
| 94 | 00504 | BR | CHD | ;AUTO FUNCTION CHANGE ;TO CHD WHEN |
| | 00504 064235 | | | |
| | 00506 101360 | | | |
| 95 | | | | ;MODE = 1--- |

Transmit Signal/Pulse (TSP)

```
 1      .SBTTL TRANSMIT - TSP: SIGNAL/PULSE
 2      ;TRANSMIT SIGNAL PULSE (TSP) FORCES THE POLARITY OF
 3      ;THE LINE THROUGH A SERIES OF FROM ONE TO THREE TIMED
 4      ;STATES. THE NUMBER AND VALUE OF THE POLARITY STATES
 5      ;IS GIVEN IN THE MODE CONTROL WORD (MODE). FOR EACH
 6      ;POLARITY STATE SPECIFIED IN THE MODE THERE IS AN
 7      ;ASSOCIATED 16 BIT VARIABLES FILE WORD FOR THE TIME.
 8      ;THE TIME IS AN UNSIGNED 16 BIT INTEGER AND GIVES THE
 9      ;NUMBER OF COUNTS FOR WHICH THE POLARITY STATE WILL BE
10      ;HELD. THE TIME REPRESENTED BY A COUNT DEPENDS ON THE
11      ;NUMBER OF TIMES THE LINE IS ENTERED IN THE SEQUENCE
12      ;TABLE WHICH IS ITSELF A FUNCTION OF THE DATA RATE OF
13      ;THE LINE (1 COUNT = 2.2 MS FOR 50 BAUD, 1 COUNT =
14      ;0.37 MS FOR 300 BAUD).
15      ;
16      000010 .RADIX 8
17      ;
18      ;EQUATES
19      ;
20      ;CONSTANTS FILE
21      ;
22      000015 C2WIRE = 15          ;---X : X = 0 SINGLE CURRENT TERMI-
                                    ;NATOR
23                                  ; : X = 1 DOUBLE CURRENT TERMI-
                                    ;NATOR
24      ;
25      ;VARIABLES FILE
26      ;
27      000000 MODE = 0             ;OPTIONS CONTROL WORD
28                                  ;TOOP : TRANSMIT POLARITY P FOR
                                    ;TIME = T1CNT
29                                  ;T01P : TRANSMIT POLARITY P FOR
                                    ;TIME = T1CNT
30                                  ; : TRANSMIT COMPLEMENT P FOR
                                    ;TIME = T2CNT
31                                  ;T11P : TRANSMIT P FOR T1CNT
32                                  ; : TRANSMIT COMPLEMENT P FOR
                                    ;T2CNT
33                                  ; : TRANSMIT P FOR T3CNT
34                                  ;T-- : T = 0BRANCH TO FREE AT TSP
```

-continued

```
                                    ;COMPLETION
35                                  ; : T = 1 BRANCH TO TSC AT TSP
                                    ;COMPLETION
36       000001 NMODE  =  1         ;MODE WORD FOR TSC WHEN MODE = 1---
37       000002 V2WIRE =  2         ;VARIABLES FILE COPY OF C2WIRE
38       000003 TPSTAT =  3         ;TSP SETS = 1--- AT COMPLETION
39       000004 T2CNT1 =  4         ;T2CNT4 - T2CNT1 = 16 BIT COUNTER
                                    ;FOR 2ND POLARITY
40       000005 T2CNT2 =  5         ;(USED ONLY IF MODE = -1-)
41       000006 T2CNT3 =  6
42       000007 T2CNT4 =  7
43       000010 T3CNT1 = 10         ;T3CNT4 -T3CNT1 = 16 BIT COUNTER
                                    ;FOR 3RD POLARITY
44       000011 T3CNT2 = 11         ;(USED ONLY IF MODE = -11-)
45       000012 T3CNT3 = 12         ;
46       000013 T3CNT4 = 13
47       000014 T1CNT1 = 14         ;T1CBT4 -T1CBT1 = 16 BIT COUNTER
                                    ; FOR 1ST POLARITY
48       000015 T1CNT2 = 15         ;(ALWAYS USED)
49       000016 T1CNT3 = 16
50       000017 T1CNT4 = 17
51       000002 .RADIM 2
 1  000304 ATOTSP:
 2  000304            WAIT                               ;WHEN RECV SETS FLAG
                                                         ;TRANSFER TO TSP
    000304 064061
    000306 101360
 3  000310            BFLG    ATOCLR,0011,MSGFLG         ;COMMAND FROM
                                                         ;RECV TO TRANS-
                                                         ;MIT CLEAR
    000310 072017
    000312 103061
 4  000314            CLRF    1100,MSGFLG                ;CLEAR FLAGS TO RECV
    000314 056014
    000316 003301
 5  00320             BFLG    TSP,0001,MSGFLG            ;START TSP IF FLAG
                                                         ;IS SET
    000320 072066
    000322 103021
 6  000324            BR      ATOTSP                     ;LOOP AND WAIT FOR
                                                         ;FLAG FROM RECV
    000324 064061
    000326 101360
 7  000330 TSF:
 8  000330            MOVBA   C2WIRE,V2WIRE              ;MOVE TERMINATOR CON-
                                                         ;FIG BIT TO VARIABLES
                                                         ;FILE
    000330 064000
    000332 005722
 9  000334            LINER1  MODE                       ;SET LINE = LSB OF
                                                         ;MODE
    000334 074011
    000336 001200
10  00340             BRBS    TSP8,0001,MODE             ;BRANCH IF LINE SET
                                                         ; = 1
    00340 072074
    00342 101020
11  00344             BRBS    TSP8.0001,V2WIRE           ;BRANCH IF DOUBLE
                                                         ;CURRENT CONFIG.
    00344 072074
    00346 101022
12  00350             SETF    1000,MSGFLG                ;SET RECV SINGLE CUR-
                                                         ;RENT INHIBIT FLAG
    00350 064014
    00352 003201
13  00354             BR      TSP10A
    00354 064077
    00356 101360
14  00360 TSP8:
15  00360             CLRF    1000,MSGFLG                ;REMOVE RECV INHIBIT
                                                         ;FOR LINE = 1
    00360 056014
    00362 003201
16                                                       ;OR FOR DOUBLE CUR-
                                                         ;RENT TERMINATOR
17  00364             BR      TSP10A
    00364 064077
    00366 101360
18  00370 TSP10:
19  00370             WAIT
    00370 064076
    00372 101360
```

-continued

| | | | | | |
|---|---|---|---|---|---|
| 20 | 00374 TSP10A: | | | | |
| 21 | 00374 | BFLG | ATOCLR,0011,MSGFLG | ;COMMAND FROM | |
| | | | | ;RECV TO TRANS- | |
| | | | | ;MIT CLEAR | |
| | 00374 072017 | | | | |
| | 00376 103061 | | | | |
| 22 | 00400 | DECBNM | TSP10,T1CNT1 | ;HOLD FIRST POLARITY | |
| | | | | ;FOR COUNT = T1CNT | |
| | 00400 136076 | | | | |
| | 00402 125014 | | | | |
| 23 | 00404 | DECBNM | TSP10,T1CNT2 | ; | |
| | 00404 136076 | | | | |
| | 00406 125015 | | | | |
| 24 | 00410 | DECBNM | TSP10,T1CNT3 | ; | |
| | 00410 136076 | | | | |
| | 00412 125016 | | | | |
| 25 | 00414 | DECBNM | TSP10,T1CNT4 | ; | |
| | 00414 136076 | | | | |
| | 00416 125017 | | | | |
| 26 | 00420 | BRB2 | TSPEND,0010,MODE | ;CHECK FOR 2ND | |
| | | | | ;POLARITY, TSP END | |
| | | | | ;IF NOT | |
| | 00420 050142 | | | | |
| | 00422 101040 | | | | |
| 27 | 00424 | BRB2 | TSP12,0001,MODE | ;CHANGE POLARITY | |
| | | | | ;OF LINE | |
| | 00424 050112 | | | | |
| | 00426 101020 | | | | |
| 28 | 00430 | LINE01 | | ;SET LINE = 0 | |
| | 00430 064011 | | | | |
| | 00432 001200 | | | | |
| 29 | 00434 | BRBS | TSP14,0001,V2WIRE | ;NO INHIBIT IF | |
| | | | | ;DOUBLE CURRENT | |
| | 00434 072113 | | | | |
| | 00436 101022 | | | | |
| 30 | 00440 | SETF | 1000,MSGFLG | ;SET RECV SINGLE CUR- | |
| | | | | ;RENT INHIBIT FLAG | |
| | 00440 064014 | | | | |
| | 00442 003201 | | | | |
| 31 | 00444 | BR | TSP20A | ; | |
| | 00444 064117 | | | | |
| | 00446 101360 | | | | |
| 32 | 00450 TSP 12: | | | | |
| 33 | 00450 | LINE11 | | ;SET LINE = 1 | |
| | 00450 064011 | | | | |
| | 00452 001220 | | | | |
| 34 | 00454 TSP14: | | | | |
| 35 | 00454 | CLAF | 1000,MSGFLG | ;REMOVE INHIBIT IF | |
| | | | | ;DOUBLE CURRENT | |
| | 00454 056014 | | | | |
| | 00456 003001 | | | | |
| 36 | | | | ;OR LINE = 1 | |
| 37 | 00460 | OR | TSP20A | | |
| | 00460 064117 | | | | |
| | 00462 101360 | | | | |
| 38 | 00464 TSP20: | | | | |
| 39 | 00464 | WAIT | | | |
| | 00464 064115 | | | | |
| | 00466 101360 | | | | |
| 40 | 00470 | BFLG | ATOCLR,0011,MSGFLG | ; | |
| | 00470 07217 | | | | |
| | 00472 103061 | | | | |
| 41 | 00474 TSP20A: | | | | |
| 42 | 00474 | DECBNM | TSP20,T2CNT1 | ;HOLD 2ND POLARITY | |
| | | | | ;FOR TIME = T2CNT | |
| | 00474 136115 | | | | |
| | 00476 125004 | | | | |
| 43 | 00500 | DECBNM | TSP20,T2CNT2 | ; | |
| | 00500 136115 | | | | |
| | 00502 125005 | | | | |
| 44 | 00504 | DCEBNM | TSP20,T2CNT3 | ; | |
| | 00504 136115 | | | | |
| | 00506 125006 | | | | |
| 45 | 00510 | DECBNM | TSP20,T2CNT4 | ; | |
| | 00510 136115 | | | | |
| | 00512 125007 | | | | |
| 46 | 00514 | BRB2 | TSPEND,0100,MODE | ;CHECK FOR 3RD | |
| | | | | ;POLARITY, TSP | |
| | | | | ;END IF NOT | |
| | 00514 050142 | | | | |
| | 00516 101100 | | | | |
| 47 | 00520 | LINER1 MODE | | ;SET LINE = LSB OF | |

-continued

| | | | | |
|---|---|---|---|---|
| | 00520 074011 | | | ;MODE |
| | 00522 001200 | | | |
| 48 | 00524 | BRBS | TSP22,0001,MODE | ;NO RECV INHIBIT ;IF LINE = 1 |
| | 00524 072131 | | | |
| | 00526 101020 | | | |
| 49 | 00530 | BRBS | TSP22,0001,V2WIRE | ;NO RECV INHIBIT ;IF DOUBLE CUR- ;RENT |
| | 00530 072131 | | | |
| | 00532 101022 | | | |
| 50 | 00534 | SETF | 1000,MSGFLG | ;SET RECV INHIBIT |
| | 00534 064014 | | | |
| | 00536 003201 | | | |
| 51 | 00540 | BR | TSP30A | |
| | 00540 064135 | | | |
| | 00542 101360 | | | |
| 52 | 00544 TSO22: | | | |
| 53 | 00544 | CLRF | 1000,MSGFLG | ;CLREAR RECV INHIBIT |
| | 00544 056014 | | | |
| | 00546003201 | | | |
| 54 | 00550 | BR | TSP30A | |
| | 00550 064135 | | | |
| | 00552 101360 | | | |
| 55 | 00554 TSP30: | | | |
| 56 | 00554 | WAIT | | |
| | 00554 064133 | | | |
| | 0556 101360 | | | |
| 57 | 00560 | BFLG | ATOCLR,0011,MSGFLG | ; |
| | 00560 072017 | | | |
| | 00562 103061 | | | |
| 58 | 00564 TSP30A: | | | |
| 59 | 00564 | DECBBN | TSP30,T3CNT1 | ;HOLD 3RD POLARITY ;FOR TIME = T3CNT |
| | 00564 136133 | | | |
| | 00566 125010 | | | |
| 60 | 00570 | DECBNM | TSP30,T3CNT2 | ; |
| | 00570 136133 | | | |
| | 00572 125011 | | | |
| 61 | 00574 | DECBNM | TSP30,T3CNT3 | ; |
| | 00574 136133 | | | |
| | 00576 125012 | | | |
| 62 | 00600 | DECBNM | TSP30,T3CNT4 | ; |
| | 00600 136133 | | | |
| | 00602 125013 | | | |
| 63 | 00604 | AND | 0111,T3CNT4 | ;CLEAR TSC CHARACTER ;READY BIT |
| | 00604 066000 | | | |
| | 00606 005173 | | | |
| 64 | 00610 TSPEND; | | | |
| 65 | 00610 | WAIT | | |
| | 00610 064142 | | | |
| | 00612 101360 | | | |
| 66 | 00614 | OR | 1000,TPSTAT | ;SET DONE FLAG |
| | 00614 074000 | | | |
| | 00616 005203 | | | |
| 67 | 00620 | BRBZ | FREE,1000,MODE | ;IF MSB MODE = 0, ;BRANCH TO FREE |
| | 00620 050013 | | | |
| | 00622 101200 | | | |
| 68 | 00624 | IDA | NMODE | ;TRANSFER NMODE TO ;MODE |
| | 00624 076000 | | | |
| | 00626 005401 | | | |
| 69 | 00630 | STRBX | BGRPO,MODE | ; |
| | 00630 064000 | | | |
| | 00632 004000 | | | |
| 70 | 00634 | BR | TSC | ;BRANCH TO TSC |
| | 00634 064155 | | | |
| | 00636 101360 | | | |

Generation Of A Signaling Sequence By The Group Controller-Line Controller Combination The group controller-line controller (GC-LC) arrangement of the present invention has as one of its primary functions the generation of the signaling sequences required during a call set-up or a call disconnect. These signal sequences must occur in order to establish and to clear a communication link between two terminations attached to the telex exchange. The group controller, which for the preferred embodiment is a Digital Equipment Corporation LSI-11, contains a set of supervisory level programs which control the flow of data to and from each of the terminations serviced by the GC-LC arrangement.

In General

Referring now to FIG. 22, the organization of the group controller program memory containing the GC routines which are to be executed is illustrated. While the location of the various routines which comprise the preferred embodiment of the group controller programs is illustrated in FIG. 22, it is obvious to a person or ordinary skill in the art that the actual memory location assignments could be varied from those shown and discussed below.

To begin with, the low memory address locations of the GC program memory are reserved for use as the stack and as the peripheral and special purpose vector interrupt memory locations. Next in order come the major functional sections of the group controller program: the interrupt level supervisor (ILS), the background level supervisor (BLS), the ILS Program Lists, the BLS Program Lists, the system subroutines, the signaling line state descriptors (LSD), the signaling sequence tables (SST), the task assembler code routines, and finally, the peripheral address registers. Individually, each of the functional blocks illustrated perform special purpose functions within the overall computer program. The following is a brief explanation of some of the functions performed by each of the routines which make up the GC program.

The interrupt level supervisor (ILS) is a supervisory routine which executes various ones of the ILS list receive (Rx) and transmit (Tx) script task routines on the occurrence of a programmed interrupt from a real time clock. As will be discussed below with respect to the program lists, both for ILS and BLS, there are various time related lists which must be executed at predetermined intervals of time, i.e. every 10 milliseconds, every 20 milliseconds, every 60 milliseconds, every 120 milliseconds, etc. At each real time interrupt, the ILS supervisory program executes all of the lists that are due to be executed at this particular point in time. For the preferred embodiment, a programmed interrupt occurs every 10 milliseconds. At any given 10 millisecond interrupt, it is possible that 60 milliseconds has elapsed since the last time the 60 millisecond list was executed. Therefore, both the 10 millisecond list and the 60 millisecond list would be executed at this interrupt time.

The background level supervisor (BLS) is the GC program that is running when the ILS supervisor is not processing an interrupt. Contained in the BLS supervisor program are time related lists similar to those contained in the ILS supervisor, i.e. the A, B and C lists. However, the A, B and C lists are not executed at fixed intervals of time, but rather, are executed sequentially according to any sequence desired. Termination lines, whether receive (Rx) and/or transmit (Tx), which are inactive or in a state that is not time critical are usually placed in one of the BLS supervisory lists. For the BLS lists, the time between execution of these lists may vary, but it is assured that they will be executed often enought to perform the desired signaling required by the terminations.

The ILS program list memory locations which follow the BLS routine contain the various time related lists of script task routines to be performed for any terminations whose signaling is currently time critical. In a similar manner, the memory block location for the BLS program lists contain the threaded lists of tasks to be performed on those terminations which are currently not time critical.

The system subroutine memory block contains special purpose subroutines which among other things permits the GC to communicate with the common control (CC) via special purpose handler routines (the ESP handler). Following the system subroutine is a block of memory locations that are organized into 160 control blocks of 33 computer words per block. These control blocks comprise the signaling line state descriptors (LSD). These LSDs are used in the execution of the script task routines to produce the signaling sequences required by the various types of terminations. When a signaling sequence must be generated in a termination, call set-up or disconnect, an LSD must be allocated to that termination. Each LSD contains memory locations for storing data required by the scripts to perform both transmit and receive signaling sequence script tasks which comprise the signaling scripts.

Still referring to FIG. 22, following the LSDs comes the signaling sequence tables (SST) which are the memory locations that contain the script tasks to be performed for all of the possible signaling sequences that can be handled by the telex exchange. For a given type of signaling required in a termination, a signaling script is constructed, under program control, by stringing together selected SST script segment routines. The script segment routines produce certain signaling sequences which can occur during the signaling sequences for several different types of terminations. By writing routines for these segments and stringing together the appropriate segments, a desired signaling sequence script can be constructed.

Following the SST tables are the script task assembler code routines. These task routines are the assembler coded instructions which perform the various tasks that comprise the desired STT script. It is the execution of these instructions which control the flow of data between the GC and the LC that, in turn, enables the LC to produce the desired sequence of signals in the terminations.

At the top of the addressable memory locations are the locations reserved for the peripheral address registers and the general purpose registers of the LSI-11. Included within these locations are the registers which pass data between the GC and the LC (LCADDR and LCDATA).

The Lists of Tasks

Turning now to FIG. 23, the ILS 120 millisecond list which currently has the scripts for line 1, 20 and 118 threaded into it is shown. The list shown in FIG. 23 is typical of a list in either the ILS or the BLS supervisory program. As shown in FIG. 23, only three lines are presently threaded onto this list. Additionally, only line 20's Rx script has been threaded onto this list. Each of the lists, either in ILS or BLS, is comprised of line state descripters (LSD) strung together in a manner that permits the sequential execution of the Rx and/or Tx scripts for the terminations threaded onto the list. The list functions as follows. When a line becomes active, such as when it initiates a call, the next available LSD is assigned to that line. Depending upon the time requirements for the signals to be produced in the signaling sequences for any termination, any time critical signaling, whether it be for the Rx script or the Tx script, that termination will have the appropriate LSD script threaded onto the appropriate list. Each LSD has two memory locations assigned for a Rx script and two memory locations assigned for a Tx script. These for locations are used to control the flow of program execution through the list. When a list is executed, all of the Rx tasks of threaded Rx scripts will be executed first, followed by the Tx task. Each pair of memory locations function as pointers which point to the address of the next LSD to be executed in the list.

As shown in FIG. 23, the starting address for the LSD for line number 1, memory address location 1,000, contains the starting address of the LSD assigned to line 20 whose script is next to be executed. Similarly, the LSD for line number 20, beginning at memory address 2,000, points to the starting memory address location for the LSD assigned to line 118. At the end of the string of threaded Rx scripts is a dummy LSD that ends execution of the list and causes the program to retrace back to the start. At the completion of the Rx list, the Tx list is executed. Because of the addressing scheme for the threaded LSD's, it is possible that the Rx and Tx scripts for any given termination can be threaded onto different timing list in different supervisory programs although only one LSD has been assigned to that termination. In addition to the threading memory locations, each LSD contains memory locations that are used to store pointer registers and data required to execute the threaded signaling scripts. When an LSD is assigned to a given termination, the BLS will initially set up the LSD with the data and the initial pointer values required to begin execution of the signaling scripts. During execution of the script, this data and the pointer values will be updated during execution of the individual task routines.

How the Script Tasks are Located and Executed

Figure 24:
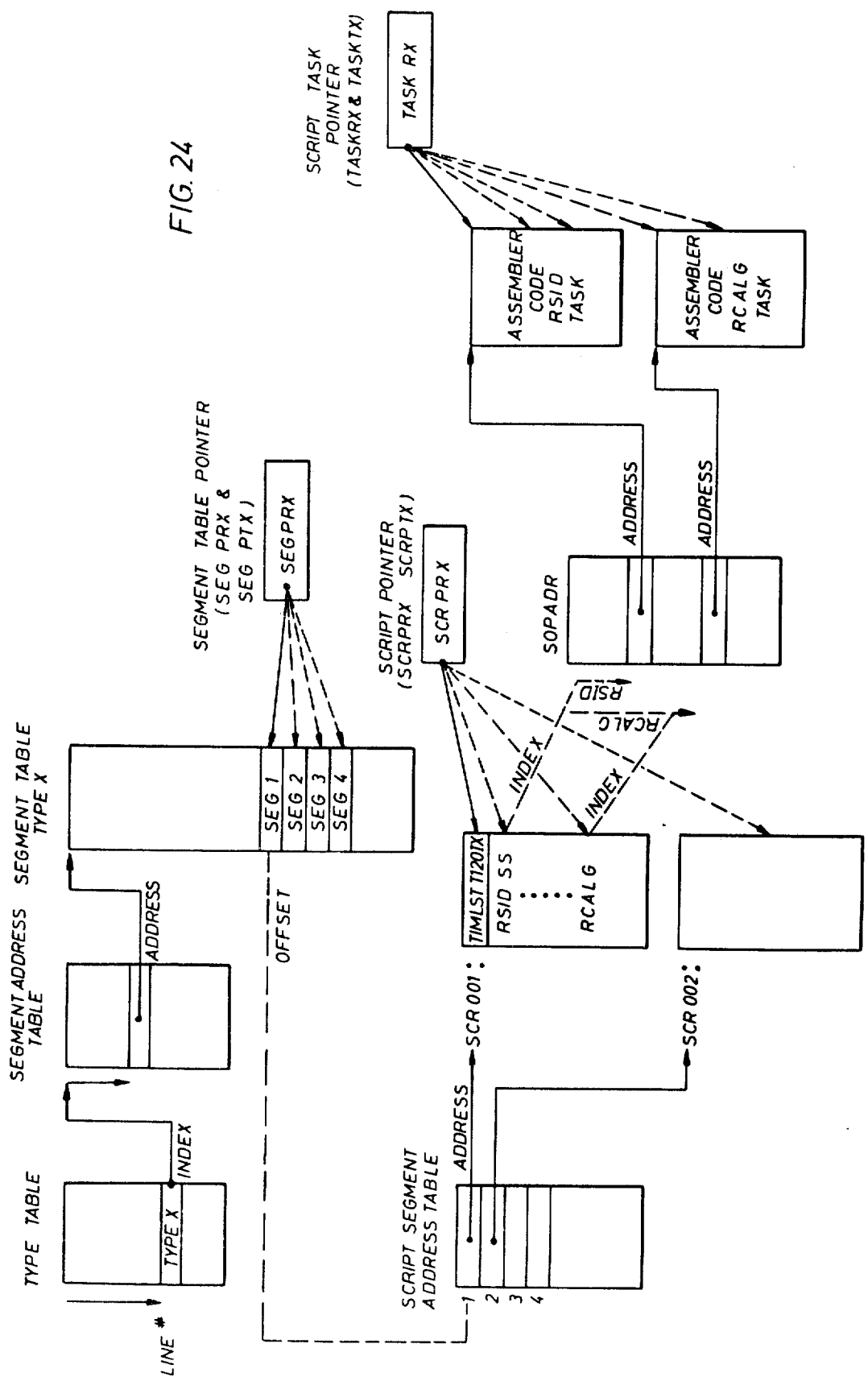
FIG. 24 is a block diagram representation of the addressing technique for execution of the script task routines which produce the desired signaling sequences.

Referring now to FIG. 24, a block diagram of how a script is executed for a termination is shown. Initially, the line controller (LC) has been set up to look for a call for each of the terminations under its control. The BLS supervisor program is executing a scanning routine called hook-scan (HKSCAN) which systematically scans all of the terminations for a call detect flag indication from within the LC indicating that the termination has initiated a call. (When the LC detects a call from one of its lines, a call detect flag is set in one of its memory locations. The GC reads the contents of this location to sense the start of a call.) When the BLS scans that particular line, the flag will cause the BLS to set up the signaling script for that termination. The script is initiated by obtaining a control block for that termination from the available LDSs. This control block is then threaded onto one of the ILS or the BLS supervisory RX lists.

As previously mentioned, each time that a list is executed, only one task for both the Rx and the Tx scripts will be executed. It is the function of the signaling LSD to keep track of where the script is executing so that the next time the list is executed, the LSD will return program execution to the correct point within the script where it left off the last time the list was executed. In order to keep track of where the script is executing, each of the LSDs contain pointer memory locations that contain pointer values that are used to direct program execution to different memory locations. For the preferred embodiment, each LSD contains six pointers, three pointers for the Tx script and three pointers for the Rx script. These pointers are the segment table pointer (SEGPRX and SEGPTX), the script pointer (SCRPRX and SCRPTX), and the script task address (TASKRX and TASKTX). The pointers TASKRX and TASTX are associated with the two memory locations in the LDSs which are used to thread the Rx and Tx scripts, respectively, onto the lists. However, TASKRX and TASKTY are not involved in threading but are the addresses of RX and TX signalling routines to be executed when ILS/BLS gives control to the LSD. Each time the list is executed, the contents of these two pointers are used to transfer program execution to some routine. As execution of the routines progress, the contents of the pointers contained in the LDS could be used and/or updated, as well as the TASKRX and TASKTX. In other words, TASKX and TASKTX are the primary pointer which transfers program execution to the scripts each time the list is executed. TASKRX and TASKTX point to assembler code which actually performs the signalling tasks.

The following is a brief explanation of how a signalling script for a termination is constructed and executed by the GC. Given the line number, the address of the code that is required to handle the signaling sequences for this termination will be determined by reference to tables as shown in FIG. 24. Upon receipt of a call, the line number produces an index value that indexes into the "type table" for the purpose of determining the type of signaling required by this particular termination. The contents of the memory address location in the "type table" for this termination contains an index value which indexes into the "segment address table." The indexed memory locations in the segment address table contain the starting address of a block of memory locations identified as the "segment table" for a particular signaling type. There is a segment table for each type of signaling that is possible in the system.

The contents of the segment table contain offset address values which point to address locations in the "script segment address table." The memory locations in the script segment address table, in turn, contain the starting addresses of the various script segments. The signaling which can occur for all of the types of signaling in the system have been broken down into their basic components referred to as segments. By stringing together these signaling segments, any given signaling can be produced. As shown in FIG. 24, for a hypothetical type X signaling sequence, segment SEG 1, 2, 3 and 4 are required to handle an incoming call signaling sequence (IC call segments). The segment table pointers, SEGPRX AND SEGPTX, contained in the LDS assigned to the termination would be initialized to the address location within the segment table for the first segment (SEG 1) that is to be executed for this signaling script.

Having obtained the offset address to the script segment address table from the segment table, the starting address of the various script task routines that comprise the various script segments can now be obtained. As shown in FIG. 24, the starting address of the Rx script segment SCR001 is pointed to by the contents of the memory address location in the script segment address table specified by the contents of the segment table location pointed to by SEGPRX. The starting memory address location for the various script tasks to be performed in the SCR001 script segment is contained in the script pointer registers SCRPRX and SCRPTX.

Each of the script tasks contained in the block of memory locations for Rx segment SCR001, as well as all script segments, contain assembler macro instructions that generate indices into the script operand address table SOPADR. The script operand address table SOPADR contains the starting addresses of the assembler code for the macro script tasks contained in the segment script. As previously mentioned, the address of the next memory location to be executed for a script task is contained in the script task address pointers TASKRX and TASKTX (see FIG. 23). Depending on where the script task execution left off, these pointers could point to within the task assembler code routines or to other routines, such as the routines which set up the next segment according to the contents of the SCRPTX and SCRPRX pointers.

Upon obtaining the LDS at the start of a call, the script task address pointers will be initialized to point to the first segment scripts to be executed in this signaling sequence. Only when entering a new segment will there be a need to sequence through the various indirect addressing steps as shown in FIG. 24 to arrive at the assembler code for the script task routines. Once into a segment, the script task address pointers will cause program execution to transfer directly to the individual task assembler code routines. With the completion of each script task, the script task address pointers will be updated to insure that the next time this script list is executed, program execution will be transferred to the appropriate assembler code script task routine. Execution of each of the Rx and Tx tasks in the list causes the GC to jump to the address pointed to by the respective TASKRX and TASKTX pointers.

A Call Set-Up Signaling Sequence—An Example

Turning now to FIG. 25, the signaling sequence, both for the Rx and Tx termination lines, for a type A inbound and a type A outbound termination is shown. The inbound termination is labeled X and the outbound termination is labeled Y. At the telex exchange, the transmit and receive signals from termination X are labeled Rx and Tx respectively. For the outbound termination Y, they are labeled Ry and Ty respectively. The signaling sequence depicted in FIG. 25 is for a call set-up. The inbound termination X is the calling termination, and the outbound termination Y is the called termination.

The following is a brief explanation of the sequence of signals that occur in a type A to type A call set-up. First, a "call" occurs (a Z level on the Rx line) at point A on the Rx line to signify that the termination X is initiating a call. The telex exchange, within a period of 150 milliseconds answers back with a "call confirm" (a Z on the Tx line) at point B. Within 150 milliseconds of "call confirm," the telex exchange will transmit a 40 millisecond proceed to select (PTS) pulse to the calling termination to indicate that it may now send the selection digits for the party that it is calling. The PTS pulse is shown in FIG. 4 at point C. Receipt of the selection digits should begin on the RX line within five seconds of the PTS pulse. Note: The times given for signalling are variable for different lines and exchanges and are given here for illustration purposes. If termination X is operated properly, it will transmit the selection digits as shown at point D. After receiving the selection digits, the telex exchange determines the routing and if the called termination or subscriber may receive a call. If so, the exchange transmits to the called determination a command for the Ty line to issue a "call" signal shown at point E.

Still referring to FIG. 25, within 3 seconds of issuance of the call at point E, the called termination Y must respond with a "call confirm" on Ry, point F. Following that and within 4 seconds of call confirm, the called termination Y must issue a 40 millisecond PTS pulse. This pulse is shown occurring on the Ry line at point G. The telex exchange must now transmit to the call termination within 150 milliseconds of the PTS pulse on Ry (point G) the selection digits received from the calling termination. After transmission of the selection digits on Ty (point H) and within 60 seconds, the called termination must issue on Rx the "call connect" pulse consists of 150 millisecond pulse (point I). When the call connect pulse has been received on the outbound line indicating that the called parts is ready to receive conversation data, the telex exchange must transmit that fact to the calling party. The exchange does this by causing a call connect pulse of a 150 milliseconds to occur on the TX signal line (point J). A call connect to the calling termination indicates to the calling termination that it may now begin to send conversation data.

The inbound termination call connect pulse is shown occurring at point J some time after the occurrence of "call connect" on the outbound side at point I. However, before conversation begins and within 2 seconds of the issuance of the call connect at point I, the telex exchange may command the called termination to transmit its answer back digits for transmission to the calling line to indicate to the calling party that the call has been connected to the called party. If this is done, the telex exchange issues on Ty at point K the answerback control digits to cause the answerback digits to be produced on the Ry signal lines at point L. These digits are routed by the exchange to the calling termination for transmission on the Tx lines as shown at point M. After the answerback digits have been transmitted at point M, the call set-up signaling sequences for these terminations will have been completed and conversation has begun.

Having described in general the signaling sequences for a call set-up between a type A inbound and a type A outbound termination, the following is a detailed explanation of how the preferred embodiment of the present invention produces the signals shown in FIG. 4 through the execution of the GC-LC script routines as discussed above. TABLE 4 is a listing of the scripts for both the receive and transmit signaling on both the inbound (X) and the outbound (Y) side for the signal sequences illustrated in FIG. 25. The scripts listed are comprised of programs written for the DEC LSI-11 assembler language. To serve as an example, included with the following discussion is a listing of the assembler coding of one of the programs that is executed in the scripts listed in TABLE 4 which contains instructions that transfer data between the GC and the LC.

TABLE 4

| Type A Script-Inbound | | | |
|---|---|---|---|
| Rx | | Tx | |
| SCR0001:: | | SCT001:: | |
| TIMLST | T120IX | TDONE | |
| RSID | 5S | TSP3 | TMD1,100M,40M |
| RCALG | | TSETF | |

TABLE 4-continued

| | | | |
|---|---|---|---|
| RTHRT | T60IX | TTHRT | TAIX |
| RXCLF | ERR4 | TCCWB | MSK1 |
| RXTIM | 5S | TCSGB | 1 |
| RSELF | ERR1,ERR2,BAUDOT, PL ,B | | |
| RCPLR | | | |
| RTHRR | TAIX | | |
| RXCLF | ERR3 | | |

Type A Script-Outbound

| | Ry | | Ty | |
|---|---|---|---|---|
| | SCR002:: | | SCT006:: | |
| | RSID | 5S | TIMLST | T120IX |
| | RSPD1 | ERR5, RMD1, 35, 20M | TTHRR | T60IX |
| | | | TSP1 | TMD2 |
| | RSPD2 | ERP6,ERR7,RMD9,4S,6M,50M | TTHRT | TAIX |
| | RSETF | | TCCWF | MSK2 |
| | RTHRR | T120IX | TTHRT | T120IX |
| | RCOSC | TRANSP,1$ | TXSEL | BAUDOT,PLS |
| | RCPLR | | TTHRT | TAIX |
| | 1$: | RXTIM 60S | TCCWF | MSK4 |
| | RXCHR | ERR9,ERR10,ERR11,2, CR,BL ,B | TCCAC | |
| | RCSGB | 1 | TCOSS | TRANSP,3$ |
| | SCR003:: | | TCOSC | FWRU,3$ |
| | | | TXWAT | 2S |
| | RSETF | | TTHRT | T120IX |
| | RCOSS | CPLCOD,3$ | TXCHS | 2, FS,D ,B |
| | | | 3$: TCPLT | |
| | RTXCH | | TCCWA | MSK2 |
| 3$: | RCCNG | | TSLS | SDISC |
| | RCPLR | | TBYE | |
| | RXTIM | 10S | | |
| | RGETC | ERR15,ERR16,2 | | |
| | RTHRR | TAIX | | |
| | RXCLF | ERR17 | | |

Figure 26:
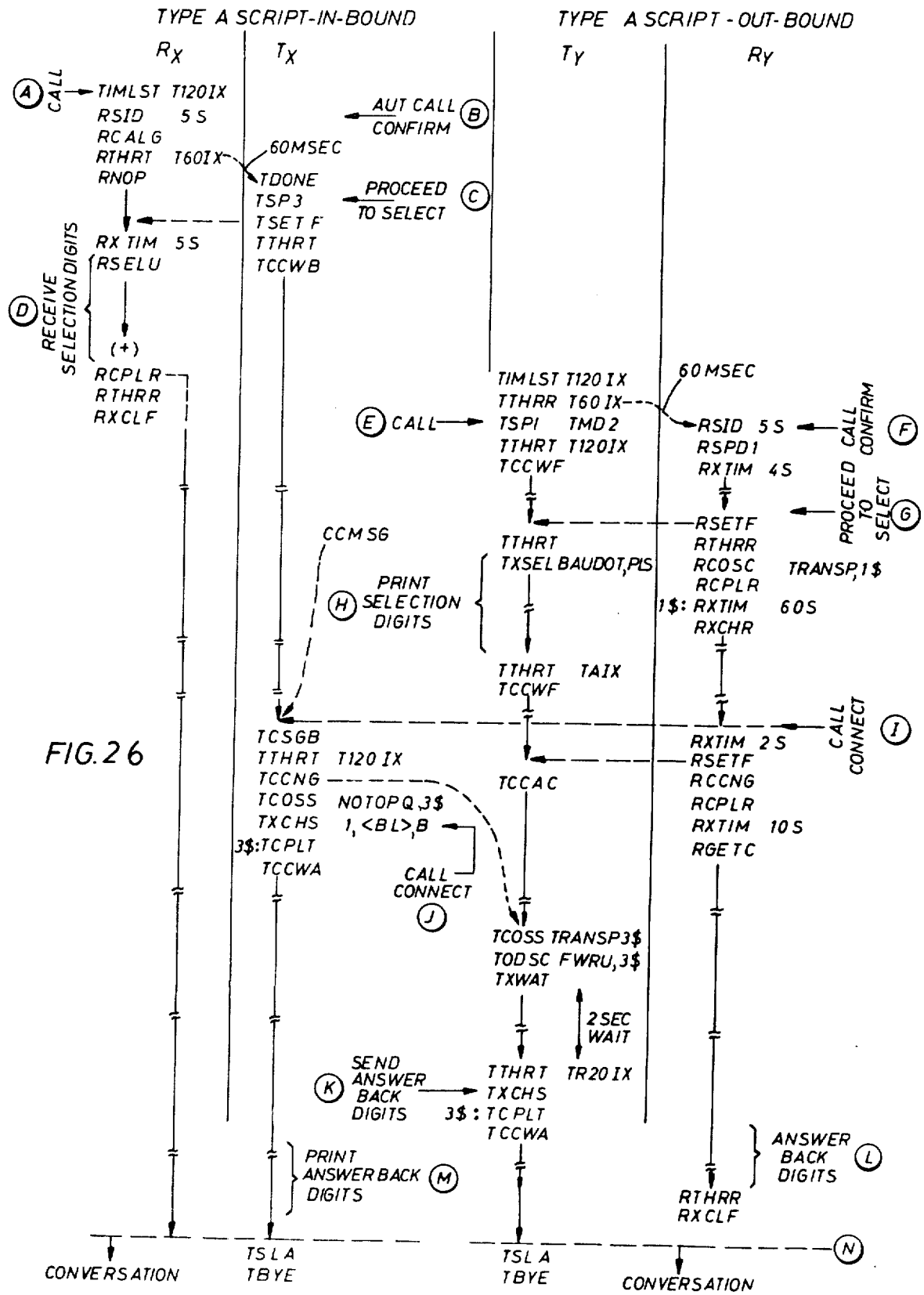
FIG. 26 is a sequential representation of the signalling scripts executed within the group controller to produce the signaling sequences as illustrated in FIG. 25.

The receive and transmit scripts which will be executed to produce the call set-up signaling sequence for a Type A inbound and a Type A outbound termination illustrated in Table 4 is also shown in FIG. 26 in the order in which the various script tasks are executed. FIG. 26 is also referenced to the identified points on the signaling sequence illustrated in FIG. 25. It should be pointed out that the script routines for the outbound Ry and Ty termination lines may or may not be contained within the same GC as the inbound termination. This would depend upon whether the called termination was a termination under the control of the same GC as the calling termination. In any event, since all the GCs are programmed the same, no further reference to this condition need be made.

Referring now to both FIGS. 25 and 26, upon detection of a call at point A by the BLS HKSCAN routine, an appropriate LDS control block will be allocated and set up for this termination. The Rx script for this termination is then threaded onto the 120 milliseconds ILS list (as indicated by the script macro TIMLST T120IX). As part of the feature of the LC, once a call is received, an inner processor flag between the LC Rx processor and its Tx processor is activated to cause the LC to automatically transmit back to the calling termination on the Tx line an "auto call confirm" (point B). By doing this auto call confirm, the LC is prevented from having to wait until the GC senses that a call has occurred and then executing a software routine to command the LC to send out a call confirm.

Once the Rx script has been threaded onto the appropriate list, the GC then executes the task RSID 5S which sets a internal 5 second time out period used to measure the time between receipt of each selection digits at point D. This 5 second time interval is to ensure that no more than 5 seconds elapses between receipt of any two consecutive selection characters. Otherwise, a time out error will occur. Rx now executes the task RCALG which sends a "call detect" message up to the common control (CC) via the command bus. In addition, the termination line number and other information necessary to process the call is also transferred to CC. The Rx script then executes the task RTHRT which threads the transmit task portion of the LSD for this termination onto the 60 millisecond ILS list to begin exectuting the transmit script Tx every 60 milliseconds. The Rx script then enters the task routine RXCLF which is a wait task routine. RXCLF causes the Rx script to loop at this task each time the 120 millisecond list is executed until commanded by the Tx script to continue executing subsequent tasks in the Rx script or until clearing is detected in which case a call fault is sent to common control.

Following the threading of the Tx script onto the ILS 60 millisecond list, the next 60 millisecond ILS list execution will perform the Tx script task TDONE. TDONE checks to see that the call confirm has been sent to the calling termination by the LC. If the auto call confirm has not been transmitted, TDONE will wait until the line controller completes. The Tx script then continues onto the task TSP3 which commands the line controller to transmit to the calling termination the PTS pulse at point C. When this pulse has been sent, the Tx script executes the task TSETF. The function of TSETF is to release the Rx script from the task RXCLF so that Rx script will be ready to receive the selection digits at point D.

For now, the signals which needed to be generated on the calling termination Tx line is over, and for a short period of time, the Tx signaling is no longer time critical. Therefore, the Tx script executes the script task TTHRT which threads the Tx script onto one of the BLS background list. Next, the Tx script enters the task TCCWB which places the Tx script into a waiting mode. The TCCWB task is looking for an indication that the call connect pulse has been received at the called termination. That is, has the called termination been activated and is it ready to accept conversation data. As can be seen in FIG. 26, this event is not due to occur until well into the signaling sequence for a termination having a type A signaling.

For the preferred embodiment of the present invention, there are three ways in which the outbound "call connect" can be sent to the inbound side. First, call connect can be sent via the CC as a message from the GC-LC controller of the outbound side. This message is sent up through to CC via the command bus. CC would then send down to the GC of the inbound side the message that call connect has occurred which would cause the task routine TCCWB to terminate. Second, call connect can be transmitted over the conversation bus. However, for this route, two situations can exist. The first situation is where the inbound and outbound terminations are of the same signaling type, or second, they are not. Where the outbound and inbound terminations are of the same signaling type, the call can be coupled through the conversation bus early in the signaling sequence since the signals on the outbound line are compatible with what the inbound line expects. Where the outbound and inbound terminations are of different signaling types, the call cannot be coupled through as early since the signals are uncompatible. The outbound GC, on receiving call connect, will send a code on the conversation bus to the inbound GC. The inbound GC has been told (through tables) by common control to listen to the conversation bus (this is done by the script task TCCWB). When it sees the code on the bus, it activates the script which sends the appropriate call connect signal to the calling party.

Still referring to FIG. 26, following the execution of the task TSETF in the Tx script, the Rx script executes the task RXTIM 5S which sets a GC internal time interval for receipt of the first selection characters from the LC. If the first selection digit is not received within the 5 second time interval, then a time out error occurs. RSELF will then transfer the received selection digits from the LC to the CC via the common bus 4. During the execution of these Rx tasks, the Tx script has proceeded to the task TCCWB.

When the LC for termination X received the call at point A, its associated GC placed the inbound LC in a character detect mode for this termination by the routine HKSCAN. Thus, all during the Rx script which has been discussed above, the LC has been trying to receive characters from the inbound termination. When the Rx task RSELF is executed, the GC begins asking the LC for the selection characters. The selection characters are accumulated by the GC until receipt of a + character indicating the end of the selection digits. When the + character is received, the GC forwards the selection digits along with the number of the inbound termination up to the CC via the command bus. The Rx script then executes the task RCPLR which couples the Rx termination line signals onto the conversation bus. At this point, essentially all of the signalling necessary to set up a call has occurred on the inbound Rx side and the next thing to come over the Rx lines will be the conversation data. The Rx script proceeds to thread the Rx script onto the one of the BLS background lists by the task RTHRR and begins to look for clearing on the termination lines by commencing the execution of the last task in the Rx script, RXCLF.

Meanwhile, the common control has received the selection digits transmitted up by the task RSELF from the inbound termination and now determines if the selected termination can receive a call and what the routing necessary to establish the call should be. When this is done, the CC transmits to the GC supervising the called termination the selection digits and a command to initiate the signaling sequences to establish a call between the telex exchange and the called termination. Initiation of a call between the exchange and the called termination will occur when the outbound GC issues a "call" on the outbound Ty line at point E.

Immediately upon receipt of the message from CC, the outbound GC constructs the LSD for the Ty and the Ry scripts. Since the first event to occur is to generate a call signal to the outbound termination, the Ty script is threaded onto the 120 millisecond ILS list by the first Ty task TIMLST. Next, the Ty script threads the Ry script onto the 60 millisecond ILS list by executing its next script task routine TTHRR. The Ty script then executes the task TSP 1 which causes the transmit lines to the termination to generate a call transition at point E. Sixty milliseconds after the Ry script has been threaded onto the ILS 60 millisecond list by the Ty script, the Ry script executes the task routing RSID 5S which sets the inter digit time out period of 5 seconds. This time out period is used to measure the time between receipt of any two answerback digits received from the called termination at point M. The Ry script then executes RSPD1 which sets up the Ry script to look for a call confirm on the Ry lines to occur within 3 seconds of being threaded onto the 60 millisecond list (the time at which the call went out on the Ty line).

Meanwhile, after generating the call signal on the outbound transmit lines, the Ty script executes a TTHRT task routine which removes the Ty script from the 120 millisecond ILS list and threads it onto one of the BLS background lists since no signaling changes are scheduled to occur for the Ty line until the PTS pulse is received on the Ry line at point G. After threading onto the background, the Ty script enters the task TCCWF which waits for a clear command to be sent from CC or for the Ry script to kick it out of this routing when the Ry task RSETF is executed.

During the time that the Ry script is executing the 4 second internal time out period, it is looking for the PTS pulse to occur on the Ry line. This is done in the task RSPD2. At point G, as shown in FIGS. 25 and 26, the PTS pulse occurs and causes the Ry script to execute the next task RSETF. The task RSETF causes the Ty script to leave the waiting task TCCWF and enter the next task TTHRT. The task TTHRT removes the Ty script from the background list and threads the Ty script onto the 120 millisecond ILS list in preparation for transmitting the selection digits to the outbound termination. These selection digits were forwarded to the outbound GC by the CC just prior to beginning the outbound signaling sequence. Having threaded the Ty script onto the ILS 120 msec list, the next Ty task TXSEL is executed to transmit the selection digits illustrated at point H.

After executing the Ry script task RSETF to initiate the transfer of the selection digits to the outbound termination, the Ry script proceeds to thread itself onto one of the background lists via the RTHRR task. Next, the Ry script dtermines if the call is to be a transparent connection via the conversation bus by executing the task RCOSC, and if it is transparent, to perform the task RCPLR to couple the outbound Ry termination line data onto the conversation bus. If the connection is not transparent, then the Ry termination line are not coupled since the task RCPLR is skipped. Rather, the Ry script executes the task RXTIM 60S which the GC looks for a call connect on the Ry line to occur. Whether or not the call is transparent, the 60 second time interval is performed. During the 60 second time interval, the task RXCHR is looking to determine if the Ry line has received a signal from the outbound termination or a message from CC. If the signal received on Ry is the call connect pulse (point I), and the connection is a transparent one, the call connect pulse is transmitted via the conversation bus from the outbound to the inbound side. At this point, the called termination is connected to the exchange and is ready for conversation data.

When the inbound termination LC receives the call connect from the outbound side, the Tx script terminates the task TCCWB which was waiting for this signal and proceeds to the task TCSGB. The task TCSGB is a conditional branch routine which permits the script to branch to different segments depending on why TCCWB terminated (i.e., it received call connect on the buo, or a call connect message from Common Control, or a service message from Common Control) At this point, the Tx task signaling has become time critical and requires that the script be threaded onto the 120 millisecond ILS list by the task TTHRT. Having threaded itself onto the ILS list, the Tx script performs its next task TCCNG which sends a call connect acknowledge signal up to the CC acknowledging that the inbound side is aware that the call connect has occured on the outbound side, whether or not that fact was conveyed by way of the conversation bus or as a message from the CC. Next, the Tx script performs the task TCOSS which looks into the table to tell the GC if the inbound and outbound terminations are of the same signaling type or are then different. If they are not the same signaling type, then the inbound Tx must itself send a call connect pulse to the inbound termination (point J). If on the other hand, had the inbound and outbound terminations been of the same signaling type (transparent), when the call connect data from the outbound termination was transmitted to the inbound LC via the conversation bus, the call connect pulse would have automatically been sent out to the inbound termination and there would be no need for the pulse to be generated again. Therefore, if the connection is not transparent a pulse is generated by the next task in the Tx script, TXCHS. Otherwise, the pulse is coupled through from the outbound side. If executed, the task TXCHS sends an ASCII "blank" character to the calling termination. A blank character is a 150 millisecond pulse which is equivalent to the required call connect pulse.

With the occurrence of call connect to the inbound termination, the calling and the called terminations are both ready to begin conversation. The Tx script now executes the task TCPLT which couples the Tx lines to the conversation bus so that the answerback digits from the called termination can be transmitted to the calling terminal. The Tx script then enters the task TCCWA which is a task that waits for the conversation message from the CC indicating that conversations may begin, or for clearing on the lines. If clear is receiving the call is terminated when the conversation message is received, the Tx script performs a TSLS which causes HKSCAN to begin looking for a disconnect signaling sequence. Finally, the Tx script performs the task TBYE to release the LSD for inbound termination since all of the signaling for the call set-up for this call has been performed, and the inbound Rx line has been coupled to the conversation bus for the conversation portion of the call.

Meanwhile, on the outbound side, when the Ty script has transmitted the selection digits to the outbound termination at point H, the Ty script is threaded onto one of the background lists by the task TTHRT. Next, the Ty script enters the task TCCWF. Task TCCWF is a routine to cause the Ty script to wait for a clearing from the CC or for the Ry script to kick it off when the call connect is received at point I. With the execution of the Ry task RSETF, the Ty script enters the task TCCAC that looks for a call connect acknowledge message from the CC indicating that Common Control has received call connect from outgoing call side. The call connect message that the Ty script is now looking for is a result of the message sent up to CC by the task RCCNG that was executed in the Rx script following the occurrence of the outbound call connect pulse at point.

As previously discussed, sending the occurrence of the outbound call connect information to the inbound side can occur via CC or by way of the conversation bus. As will be discussed below, after the outbound call connect was received at point I, the GC sends up to CC a message that call connect has been received regardless of whether that information was also sent via the conversation bus. If signaling is done on the conversation bus, common control does not send down call connect to the incoming call side. It just waits for call connect to be received from the incoming call GC.

The Ty task TCCAC only waits for common control to send an acknowledgement. If it does not receive the acknowledgement within 2 seconds, it resends the call connect message up to CC. Common control sends the acknowledgement when it receives the call connect from the outgoing side. This acknowledgement has nothing to do with what the incoming call GC has done. It is just an acknowledgement that call connect was received from the outgoing GC. The Ty script now proceeds to the task TCOSS to examine the connection table to determine if the call is transparent. If it is transparent, a two second interval from the receipt of the call connect message from CC is executed by the Ty script task TXWAT before the Ty script is permitted to continue.

At the end of the two second interval, the Ty script threads itself onto the 120 millisecond ILS list by the task TTHRT and transmits the control characters to the outbound termination which will produce the answerback digits. If the inbound-to-outbound connection was transparent, then the answerback routine would not have been performed. (Note that TCOSS means branch to 3$ of TRANSP is set while TCOSC means branch if TRANSP is clear). Rather, the Ty task would have proceeded directly from the task TCOSS to the task TCPLT to couple the Ty lines to the conversation bus in preparation for the conversation portion of the call. After coupling the Ty line to the conversation bus, the Ty script executes TCCWA which waits for the CC to send down the conversation message that the call set-up signaling sequence for the outbound side has been completed and that the outbound GC can now release the LSD.

After transmitting up the call connect message to the CC by the Ry script task RCCNG following the occurrence of call connect at point I, the Ry script performs an RCPLR which sets the LC on the receive side to couple the Ry line onto the conversation bus. This is done in preparation for receiving and transmitting the answerback digit from the outbound termination onto the conversation bus and over to the inbound termination. Next, the Ry script performs the task RXTIM 10S which sets up a 10 second time out interval in the outbound GC within which the first character of the answerback digits must be received. The Ry script performs RGETC to read the first two characters from the answerback digits. Next, the Ry script is threaded onto one of the background scanning lists by RTHRR. The outbound GC is then set up to start looking for clearing by the last task to be executed in the Ry script, RXCLF.

At this point, all of the tasks in the Rx and Ry scripts have been executed and both the Tx and the Ty scripts are exectuing the task TCCWA MSK2. This task is looking for the conversation message from CC indicating that the conversation portion of the call can begin and that the LSD for both the inbound and outbound termination can now be released. Upon receipt of the conversation message from CC (point N), both GCs execute in sequence the tasks TSLS and TBYE to respectively set up the GCs to look for the disconnect and to release the LSDs. Having done this, the conversation portion of the call may proceed without the GC having any further to do with the call since the LC's will have been set up to handle the conversation data.

Still referring to FIG. 26, the Ty script task routine TXSEL BAUDOT, PLS transmits the selection digits received from CC to the outbound termination via the LC. The following table is a listing of the assemble code for the task TXSEL which is presented here as a representative example of how the task routines are written. While a discussion of each instruction in this task routine will not be given here, it will be obvious to a person of ordinary skill in the art when given the foregoing description of how a signaling sequence can be generated through the use of scripts that a set of task routines can be written to produce any signaling sequence desired.

```
TXSEL
    .SBTTL TSEL - SEND SELECTION DIGITS
    PURPOSE
                TO SEND SELECTION DIGITS
    PROCEDURE
                SELECTION MAY BE SENT DOWN IN SEPARATE CHUNKS
                BY COMMON CONTROL. THE ESP APPENDS ADDITIONAL
                SPILL IN LSDDAT AND UPDATES THE COUNT. END-OF-
                SECTION IS INDICATED BY 'INAEOS' CHAR. FORMAT
                OF LSD DATA BUFFER LSDDAT:
                            BYTE 1 COT
                            BYTE 2 DATA
                            BYTE 3 DATA
                            . . . . . .
                            BYTE N INAEOS
                TXSEL INITIALLY CLEARS TEMPORARY COUNTER
                'LSDCNT'. IT SENDS CHARS IF 'LSDCNT' IS LESS
                THAN LSDFNC+1 (COUNT). WHEN INAEOS IS ENCOUNTERED
                THE END-OF-SELECTION CHAR IS PICKED UP FROM THE
                SCRIPT AND TRANSMITTED.
    CALLING SEQUENCE
                TXSEL   P1,P2(,P3)
                            P1 - LINE CODE TYPE
                            P2 - TERMINATOR CHAR
                            P3 - CHAR SET SWITCH
    GENERATED SCRIPT
                .BYTE   TXSEL1
                .BYTE   P1
                .BYTE   P2
    SPECIAL RUN TIME ARGUMENTS
                NONE
    NORMAL EXITS
                WHEN TRANSMISSION COMPLETE, NEXT SCRIPT TASK
    ERROR EXITS
                NONE
TXSEL::
        MOV     R0,R2
        ADD     #LSDDAT+1,R2        ;POINT TO 1ST BYTE OF DATA
        MOV     R2,LSDDPT(R0)       ;STORE ADDRESS
TXSEL9:
        CLRB    LSDCNT(R0)          ;TEMP COUNTER
        MOV     SCRPTX(R0),2
        MOVB    1(R2),R1
        ASL     R1
        MOV     TRARTN(R1), LSDWK2(R0) ;STORE TRANST TABLE
        JMP     @TXSTAB(R1)
TXSEL0:
TXSEL1: CALDR   LSDLCR(R0),#VFTX2   ;SETS UP LC ADDRESS PORT TO
                                    ;TRANSFER CH TO LC VARIABLE
                                    ;FILE
        BIT     #TCREQ,LCDATA       ;FIND OUT IF LC IS READY TO
                                    ;TX ANOTHER CHAR.
        BNE     TXSEL5              ;NO - CYCLE
        CLR     R3                  ;YES
        BISB    @LSDDPT(R0),R3      ;GET NEXT DIGIT
```

-continued

|  | CMPB | #INAEOS,R3 | ;END-OF-SELECTION? |
|---|---|---|---|
|  | BEQ | TXSEL7 | ;YES |
|  | JSR | PC,@LSDWK2(R0) | ;TRANSLATE (FROM ASCII TO ;LINE CODE) |
|  | BIC | #SPUP,R3 |  |
|  | BIS | #TCREQ,R3 |  |
|  | MOV | R3,LCDATA | ;MOVE THE CHAR TO THE LC ;DATA PORT (LCDATA) |
|  | INC | LSDDPT(R0) | ;BUMP BUFFER POINTER |
|  | INCB | LSDCNT(R0) | ;BUMP DIGIT COUNTER |
| TXSEL3: |  |  |  |
|  | CMPB | LSDCNT(R0), LSDFNC+1(R0) ;ANYTHING LEFT TO TX? | |
|  | BLO | TXSEL4 | ;YES |
|  | MOV | #TXSEL8, TASKTX(R0) ;NO-WAIT FOR MORE DIGITS | |
|  | BR | TXSEL5 |  |
| TXSEL8: |  |  |  |
|  | CMPB | LSDCNT(R0),LSDFNCZ+1(R0) ;NEW BUFFER | |
|  | BHIS | TXSEL4 | ;NO |
|  | BR | TXSEL, | ;YES - RESTART |
| TXSEL4: |  |  |  |
|  | MOV | #TXSEL1,TASKTX(R0) ;TX CHARS ENTRY POINT | |
| TXSEL5: |  |  |  |
|  | JMP | TXCYCL | ;CYCLE |
| TXSEL7: |  |  |  |
|  | MOV | SCRPTX(R0),R2 | ;END-OF-SELECTION ENCOUNTERED |
|  | CMPB | (R2)+,(R2)+ |  |
|  | MOVB | (R2),R3 | ;GET EOS CHAR FROM SCRIPT |
|  | BIS | #TCREQ,R3 |  |
|  | MOV | R3,LCDATA | ;SEND EOS |
|  | INC | LSDDPT(R0) | ;POINT TO NEXT CHAR |
|  | ADD | #3,SCRPTX(R0) | ;BUMP SCRIPT POINTER |
|  | JMP | TXCHR4 | ;DELAY FOR LAST CHAR |

The Terminator Control Interface

Figure 13:
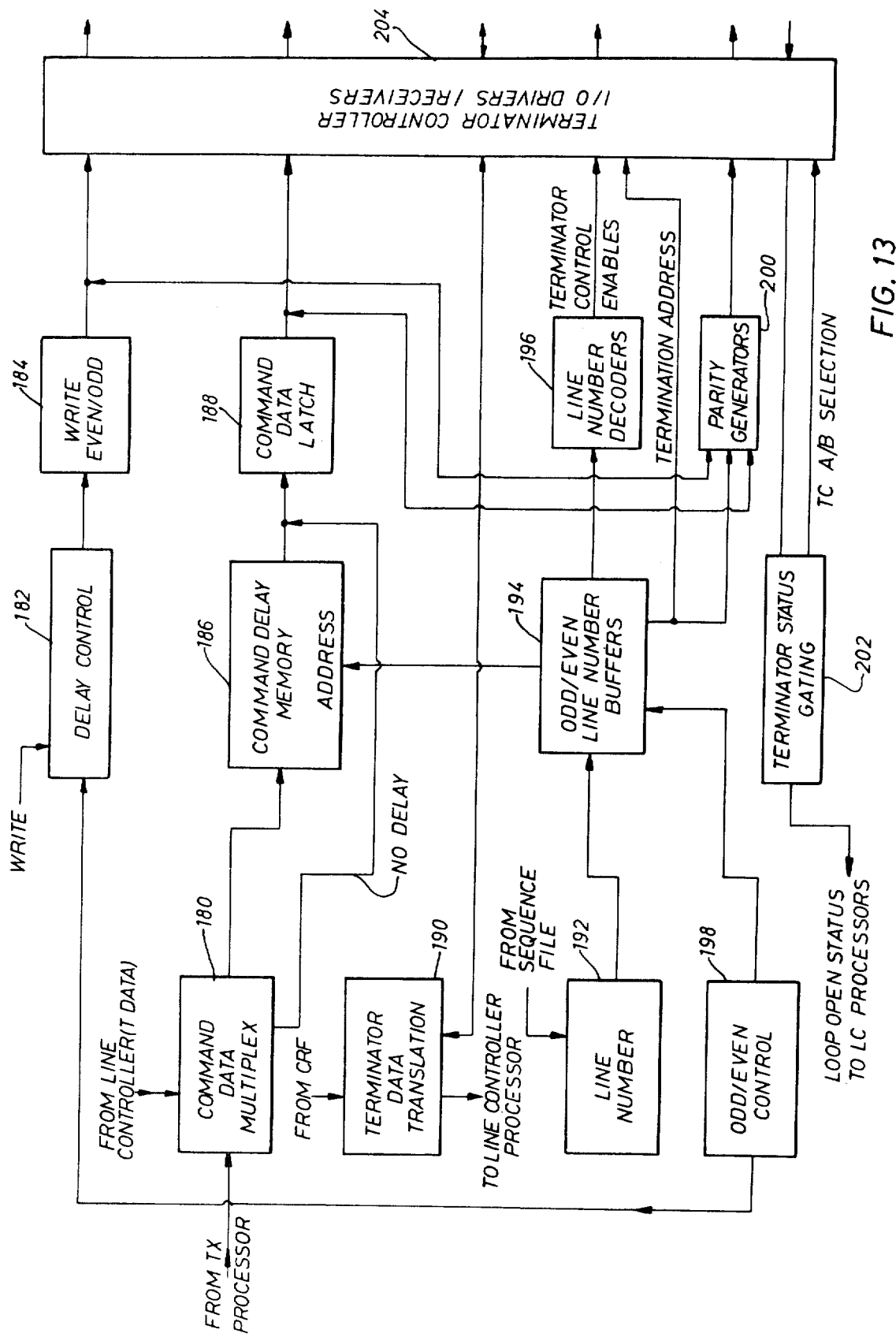
FIG. 13 is a block diagram representation of the terminator control interface shown in FIG. 4.

Turning now to FIG. 13, a block diagram representation of the terminator control interface 78 (see FIG. 4) is shown. Interface 78 functions to interface between the signals of the line controller 10 processors and the signals received from the terminator control units. As previously discussed, the signals which are generated in the terminator units pass through the terminator control units without modification. In other words, the terminator control units are transparent to the signals generated in the terminator units.

As shown in FIG. 13, the data to be transmitted from the line controller processors to the terminations are inputted to the command data multiplexer 180 which functions to apply the trasmissions data (TDATA) to either the command delay memory 186 or to bypass that functional block and apply the transmit data directly to the input of command data latch 188. For the data that is applied directly to the command data latch 188, no delay in the transmission of this data to the terminations occurs. The output of command data latch 188 is applied to the input of each terminator control unit as the command data which will be interpreted by the termination units to produce the desired signaling level in the appropriate termination lines.

Figure 14:
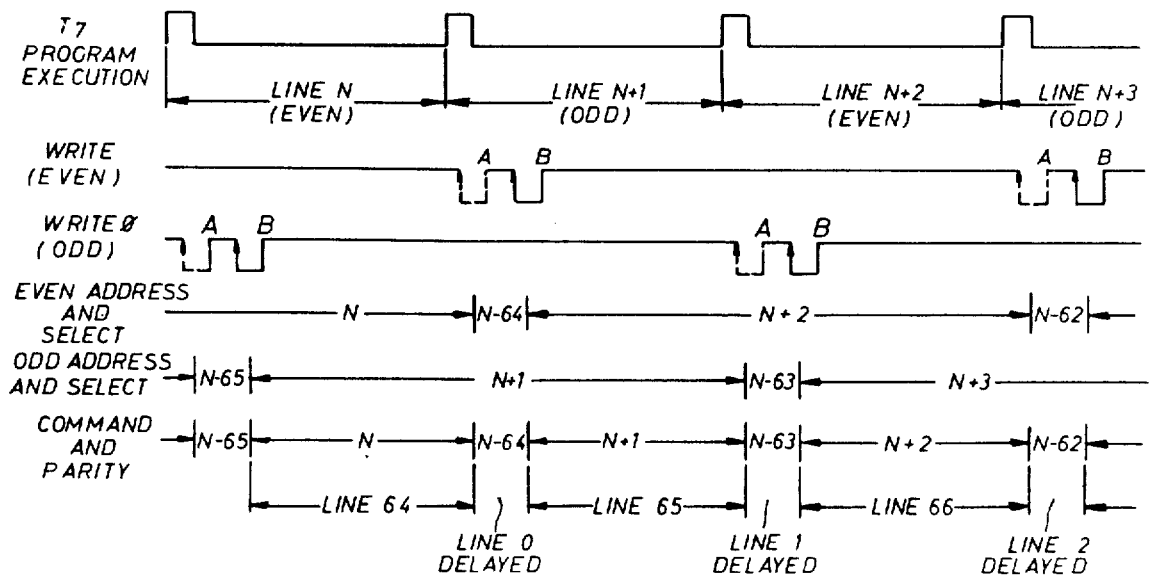
FIG. 14 is a timing diagram of the terminator control interface in which the data delay feature for the data transmitted to the termination is shown.

Referrig now to FIG. 14, a timing diagram of the write even (WRITE) and the write odd (WRITO) signals that are used to strobe into the terminator control units, such as terminator control units 16 and 18 (see FIG. 1), the command data is shown. This command data is, in turn, transmitted to the termination units. The termination units, such as termination units 20 and 22, will transcribe the command data that is sent down to produce the desired signaling level in the termination lines. As can be seen in the timing diagram of FIG. 14, each of the write signal pulses occur in pairs where the first pulse is shown in dotted lines. The first pulse to occur in each pair is labelled A and the second pulse to occur is labelled B. The pulse is shown dotted since this pulse does not always occur. However, the pulse B always occurs. The data is strobed into the termination units on the loading edge of each of these pulses. As shown in FIG. 13, the output of the command delay memory 186, as well as one of the outputs of the command data multiplexer 180, is applied to the input of command data latch 188. The data from the command delay memory 186 and the "no delay" data from command data multiplexer 180 are always loaded into latch 188 and forwarded down to the terminator control units.

The function of the command delay memory 186 is to delay the data to be sent to a given termination 64 time share intervals before the data is presented to the input of the command data latch 188 for transmission to a particular termination. As can be seen in FIG. 14, the time in which this delayed data is present on the command data lines to the terminator control units is small in comparison to the time in which the data that is bypassing command delay memory 186 is presented. However, it is possible to load on the occurrence of the WRIT signals the data for any given termination either immediately or delayed 64 time share intervals. This is the reason that the pulse label A for both the WRITE and WRITO is shown in a dashed configuration. In other words, the command data that is delayed through command delay memory 186 is always strobed out to the termination, while the data that is occurring immediately is not always written to that termination. At some data rates, not including 50 or 300 baud, there will be more than a 1% distortion in the data if there is not some further resolution in the time at which data is sent out to the terminations. It is the function of the command delay memory 186 and the bypass path to provide a selection to increase the rate at which command data can be sent to a termination by as many as 64 time share intervals. Because the data from the command delay memory 186 is always sent, it doesn't matter if the same data was transmitted 64 time share intervals earlier. It is a feature of the line controller that a signaling level command is sent to each termination each time that termination is time share processed. By doing this, the data that was sent the previous time share interval will be retransmitted if it hasn't changed and reinforce the data in the termination registers thereby minimizing the effects of noise on the transmission of data to the termination.

Again referring to FIG. 13, status signals from the termination units via the terminator control units are inputted to the terminator data translation unit 190. According to parameters specified from the CRF 64 file of the receive processor, the terminator data translation unit 190 interprets the status signals received from the terminations to produce the logic indication of either a mark or a space to the line controller 10 processor. In particular, the terminations will transmit up as part of the status of the termination the signals: Send Open Loop, Receive +, Receive −, Lockout, 2-Wire, and Parity. The data translation unit 190 interprets the signals to generate the signal LINE IN (see FIG. 8).

To address the termination which is to receive the command data from the command data latch 188, the output of the sequence file 60 is inputted to the line number unit 192 which converts the sequence file 60 data corresponding to the termination currently being time share processed into an address that is applied to the odd/even line number buffers 194. Also, the output of the line number unit 192 is inputted to the odd/even control unit 198. For the preferred embodiment, the termination units are divided into two sets, the odd tray and the even tray. Accordingly, the line number generation circuits must produce a set of signals for both the odd tray and the even tray. The write signals WRITO and WRITE previously discussed are the respective odd and even write signals for the odd and even trays. The output of the odd/even line number buffers 194 which comprise a 4-bit termination address code is applied directly to the terminator controller I/O drivers/receivers to be transmitted to the terminator control units. This 4-bit address is also applied to the parity generators 200 along with the WRITE signals and the output of the command data latch 188. The parity generators 200 produce the even parity bit which comprises one of the command data lines that are sent to the terminations. The 4-bit termination address outputted from buffers 194 will be decoded within the terminator control units to produce 16 termination enable signals that are used to select the termination units that are to receive the command data.

Still referring to FIG. 13, the output of the line number decoders 196 are the terminator control enables which enable the terminator control units to receive the command data for the termination under its control. Included in the terminator control interface 78 is the terminator status gating 202 which determines if an Open Loop Status has occurred in any termination that is a 4 wire termination. In other words, if the data being received from the termination is such that an Open Loop status exists, terminator status gating 202 will produce a signal to the line controller processors indicating that the 4 wire Open Loop status exists. The absence of both receive + or receive − indicates that an open loop condition exists.

The Conversation Bus Interface

Turning now to FIG. 20, a block diagram representation of the conversation bus interface 80 (see FIG. 4) is shown. The function of the conversation bus interface is to synchronize the high speed data rate of the line controller to the low speed data rate of the conversation bus 5 over which the conversation data between a calling and a call termination is transmitted. As shown in FIG. 20, the master controller conversation bus 5 output data is inputted to the conversation bus interface on four data lines. Each of these data lines service 128 terminations. The data contained on the conversation bus 5 is inputted to a 4-bit register whose output is applied as the input data to rate buffer 262. Rate buffer 262 consists of a 256×4 bit RAM that buffers the data between the conversation bus, both incoming and outgoing, and the data of the line controller processors. The data output lines from the rate buffer 262 are applied to a 4-bit register 272, to the input of a 4-to-1 multiplex 270 and register 260.

The 4-bit register 272 function as an output register to the conversation bus 5 which transmits data from the line controller up to the master controller on a four line bus similar to the four received conversation data lines on the input to register 252. In other words, data from the line controller processors that is to be transmitted up to the higher levels of processor control are loaded into the appropriate bit position of the rate buffer 262 and eventually transmitted on the conversation bus through register 272. The 4-to-1 multiplex unit 272 responds to the 4-bit data word out of rate buffer 262 to produce the serial single line conversation bus data is transmitted to the line controller processors. This is the bit coupled serial data that is eventually transmitted to the called termination that is under control of this line controller. In a similar fashion, the serial bit-coupled data that is to be transmitted up to the higher levels of processor control via the conversation bus 5 is loaded into the rate buffer 262.

As shown in FIG. 20, two data signals, one from the line controller transmit processor and one from the line controller receive processor is inputted to OR gate 250 which produces a data signal to the input of register 260 whose output is also connected to the input data lines of rate buffer 262. These two signals originate at the output of gate 164 of the line controller processors (see FIG. 8). Since a single bit is to be inputted into one of four possible bit positions in each word location of rate buffer 262, the complete word for that location, including all four bits, must be read out to permit one of the bits to be modified before it is restored.

Still referring to FIG. 20, the addressing of the rate buffer 262 is provided from one of two sources. The address may come from the line count as obtained from the output of the sequence file 60 and applied as the address of rate buffer 262 via a 2-to-1 multiplex unit 252, or the address may come from a conversation bus address counter 256. The output of address counter 256 is inputted as the other input to the 2-to-1 multiplex 258. The conversation bus address counter 256 derives its timing from the conversation bus 5 timing signals. The conversation bus address counter 256 is used to addrss the rate buffer 262 when data is to be received from or transmitted over the conversation bus 5.

Figure 21:
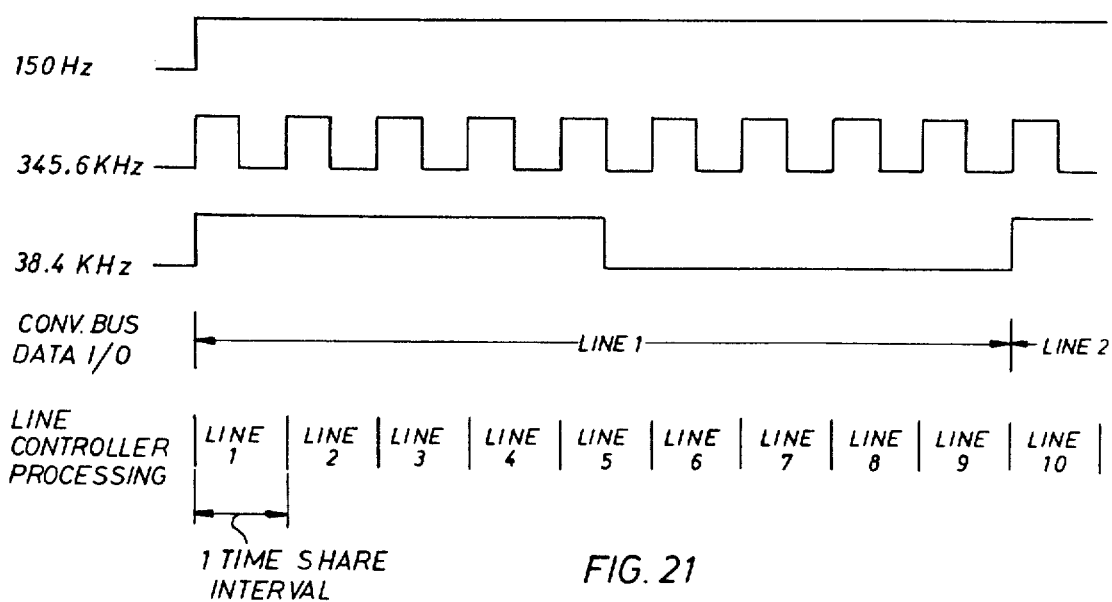
FIG. 21 is a timing diagram which illustrates the difference in the data rates between the conversation bus and the line controller.

On the other hand, when the data from rate buffer 262 is to be used by the line controller processors, the line count address will be used. In this manner, the different data rates between the conversation bus 5 and the line controller processors can be accommodated. FIG. 21 illustrates the difference between the data rate of the line controller and the data rate of the conversation bus 5. Additionally, the address produced on the output of the 2-to-1 multiplex 258 is also applied as the address to RAM 264. RAM 264 functions to store a flag indication for each termination to indicate to the line controller processors that a bit of conversation data has arrived from the conversation bus for a termination. The output of the RAM 264 is applied to a 4-to-1 multiplex 268 which produces a serial, single bit flag to the line controller processors when a bit of data has arrived. When the line controller processor obtains the bit of conversation data from the rate buffer 262, the appropriate flag in RAM 264 for that termination is cleared in the clear or set unit 266. The output of the clear or set unit 266 is the data into RAM 264.

The Terminator Control Units

Figure 15:
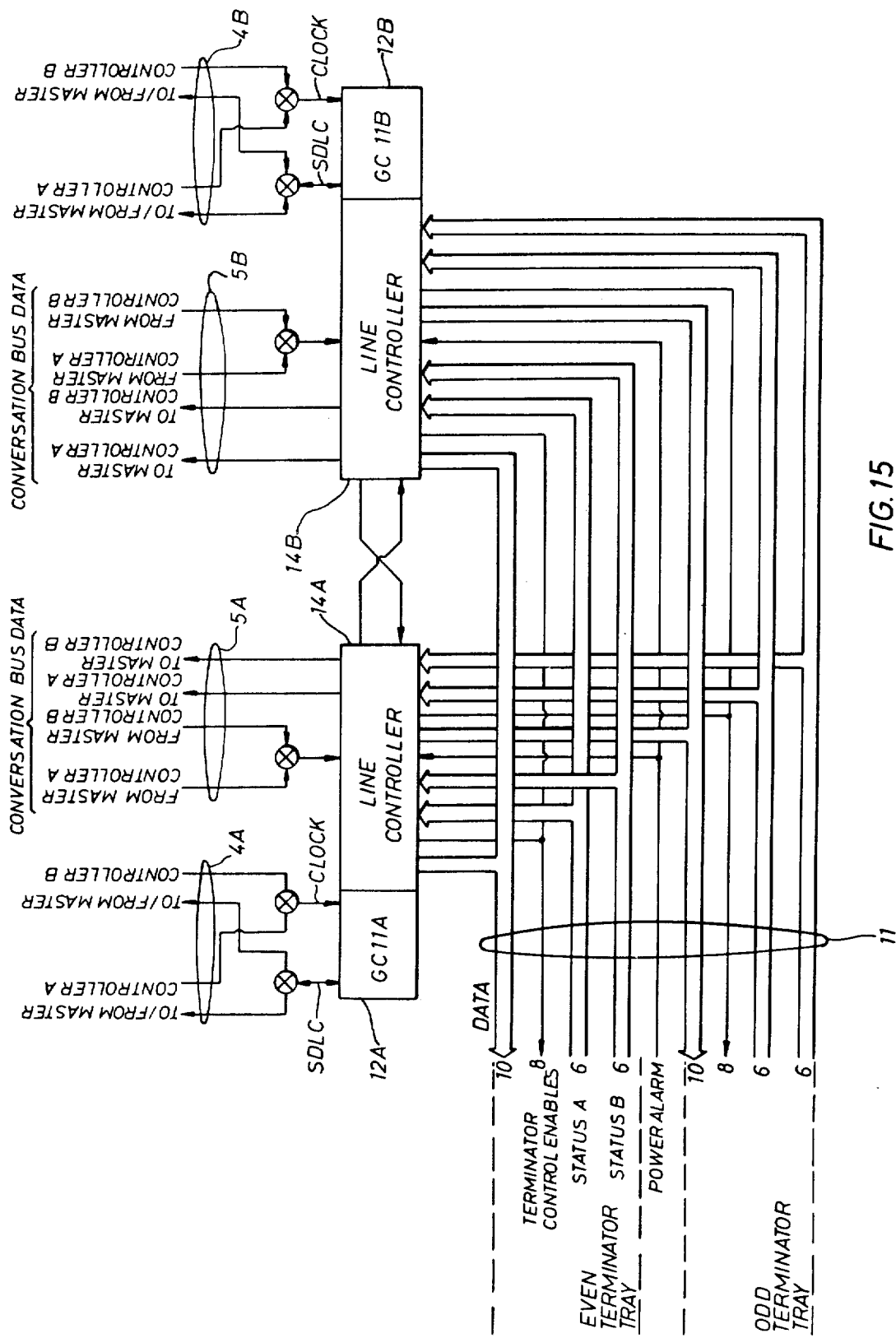
FIG. 15 is a block diagram representation of a redundant group controller-line controller combination showing the data buses from the line controller to the terminator control blocks.

Referring now to FIG. 15 which shows the data busing for the group controller 12-line controller 14 combination comprised of the redundant pairs 12A,14A and 12B,14B. In particular it shows the command 4 and conversation bus 5 which connect the group controller-line controllers to the higher levels of processor control, and the data buses which connect the line controllers to the terminator control units. As shown in FIG. 15, data bus 11 (see also FIG. 1) comprises the signal lines between the terminator control hnits and line controllers. Data bus 11 is divided into two separate and identical buses, one for the even tray and one for the odd tray. The data buses for the even and the odd trays are connected in parallel to both of the line controller processors. Only the on-line line controller will be generating and responding to signals on the data buses to the terminations. Data bus 11 connects the line controllers to the terminator control units, such as terminator control units 16 and 18 (see FIGS. 1 and 2).

As shown in FIG. 15, both the even tray and the odd tray data buses include ten signal lines comprising the 4-bit termination address that will be decoded by the terminator control units to produce the termination enable signals; a 4-bit command code that will be interpreted by the termination units to generate the desired signaling level in the selected termination; a write strobe to load the data into the terminator control units and a parity bit. The 4-bit command code indicates to the termination that either a +current, a −current, Idle, or Lockout is to occur at the termination. The write strobe would be either WRITE or WRITO depending on whether it is the even or odd data bus. Also included in both the even and the odd tray data buses are eight lines which are the terminator control enables. These enables are inputted to the eight terminator control units contained in each tray to select the terminator control unit that will transmit the command and terminator address data to the terminator units. Data that is being sent up to the line controller from the terminations are carried on two 6-bit signal lines called STATUS A and STATUS B. The STATUS A and STATUS B buses carry the six signals generated on the termination units. These signals are Send Open Loop, Receive + Current, Receive − Current, Parity, Lockout, and 2-Wire. Each terminator control unit has a redundant companion and the data buses are connected to both units. Both status buses contain identical information. Both STATUS A and STATUS B buses are sent to both line controllers units.

Figure 16:
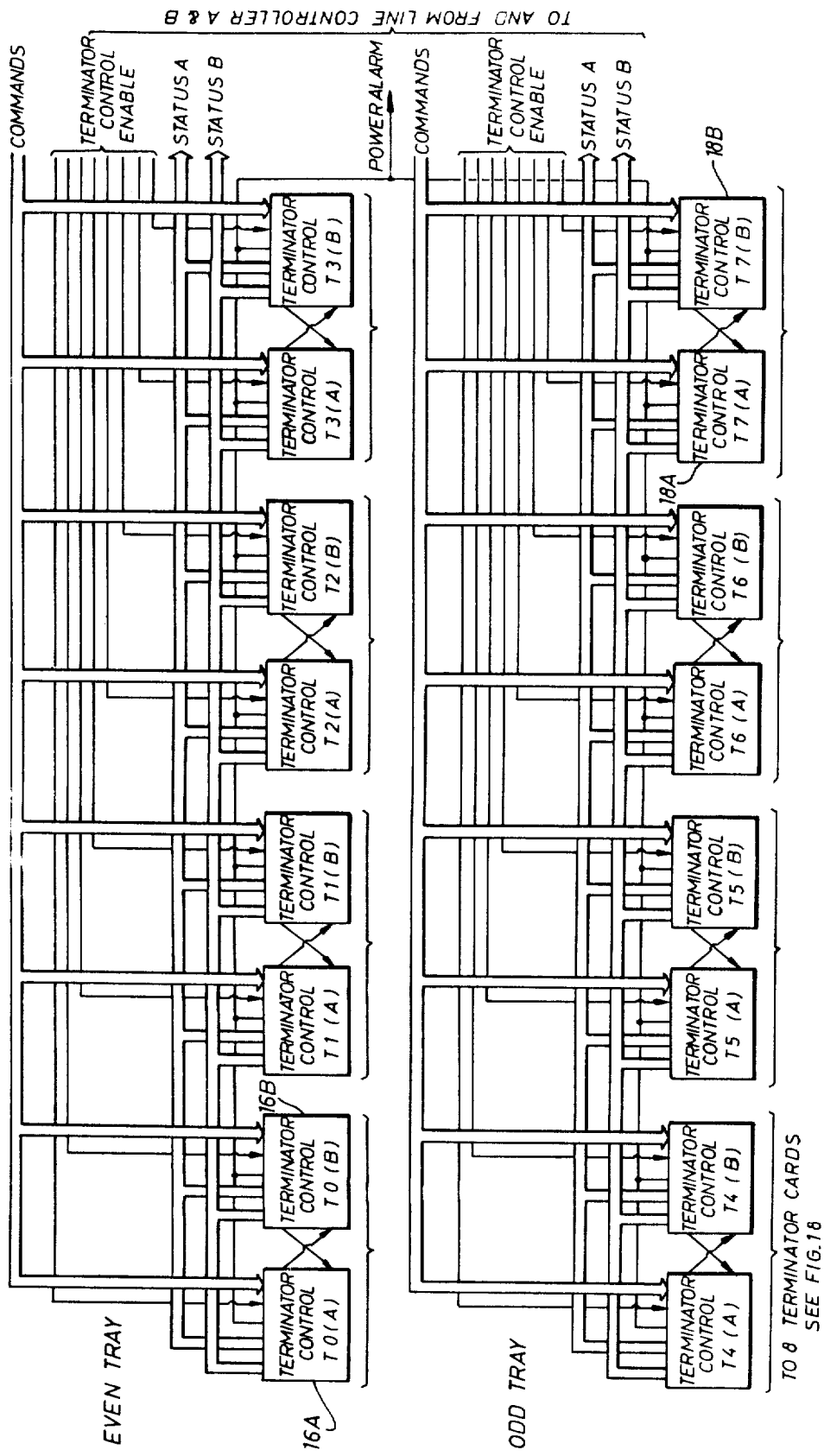
FIG. 16 is a block diagram representation of the terminator control units connected to the redundant group controller-line controller combination as shown in FIG. 15.

Turning now to FIG. 16, the block diagram of the interconnection between the terminator control units for the even and odd trays are shown. Each terminator control unit is comprised of two units, one being a backup, such as 16A and 16B. The data bus 11 is shown distributed to the various terminator control units in the even and odd trays such that all terminator control units receive the same signals except for the terminator control enables. These enable signals select one of the 16 terminator control units to enable that unit to receive and transmit data between the line controller and the lower terminator units.

Figure 17:
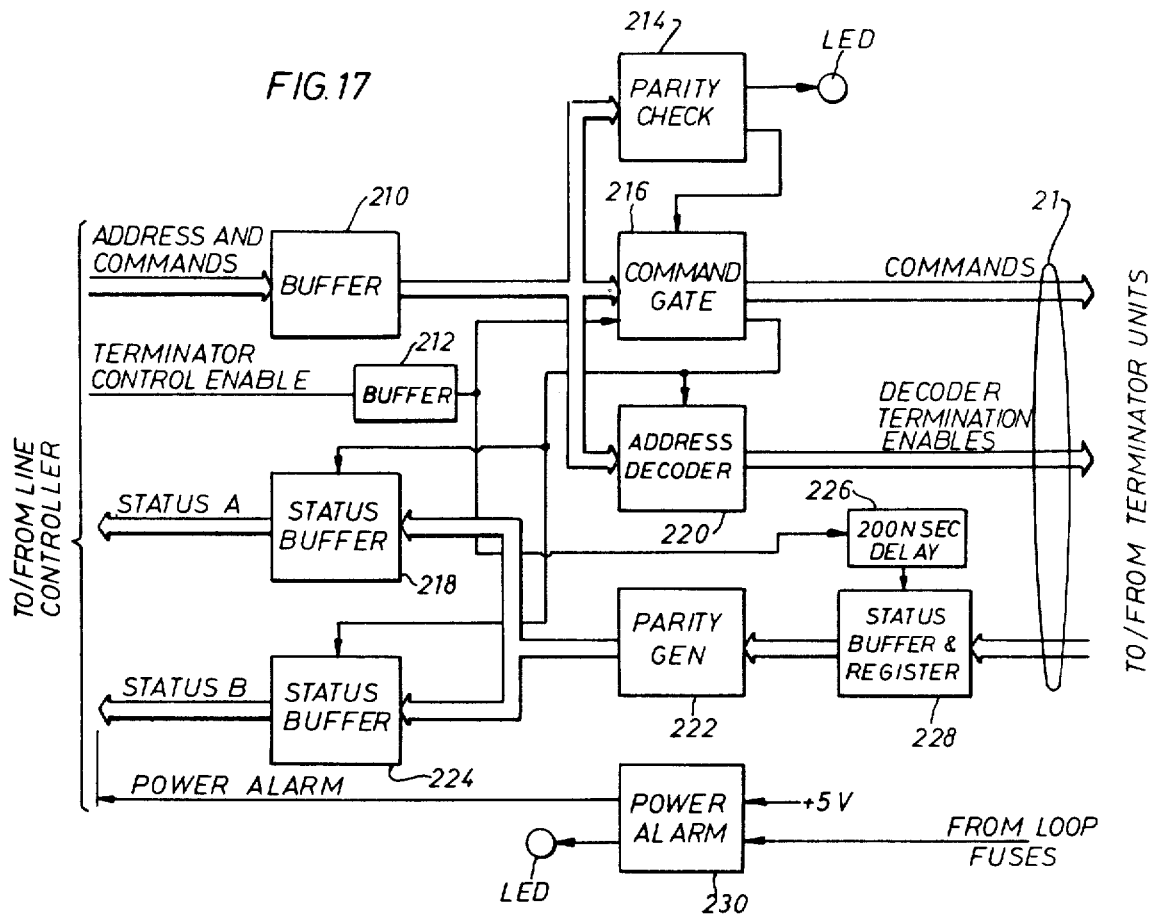
FIG. 17 is a block diagram representation of a terminator control unit.

Referring now to FIG. 17, a block diagram of a typical terminator control unit is shown. The address and command data lines of data bus 11 are inputted to buffer 210 which buffers and distributes these signals to the parity check 214, the command gate 216 and to the address decoder 220. The parity check 214 produces a parity bit from the data received and compares that bit to the parity data transmitted to determine if a parity error exists. The output of parity check 214 will light an LED if a parity error has occurred. If a parity error has not occurred, parity check 214 enables command gate 216 to load the new data if the terminator control enable for this terminator control unit is true. The data loaded into command gate 216 is transmitted to the terminator units if the data received on data bus 11 contain no parity errors. As a result, the command data passes through the terminator control unit as though it were transparent. Address decoder 220 produces the 16 termination enable signals to the terminator units to select the termination that is to receive the command data.

Also inputted to the terminator control units is the status data from the terminator units themselves. These status data inputted to the terminator control units is transmitted over a data bus that is connected to each of the terminator units under control of the redundant pair of terminator control units. When a terminator unit is selected by one of the 16 enable signals outputted by the address decoder 220, the current status of that termination is placed on the status data bus that is inputted to the status buffer and register 228. A 200 nanosecond in delay 226 is applied to the terminator control enable signal outputted by buffer 212 to allow time for the terminator unit to transmit up to the terminator control unit the status of that termination. At the completion of the 200 nanosecond delay, the status data is strobed into the status buffer and register 228. The output of register 228 is applied to the parity generator 222. The output of parity generator 222 along with the status data of register 228 is applied to the status buffer units 218 and 224. The outputs of status buffer 218 is the STATUS A data while the output of status buffer 224 is the STATUS B data.

The Terminator Units

Figure 18:
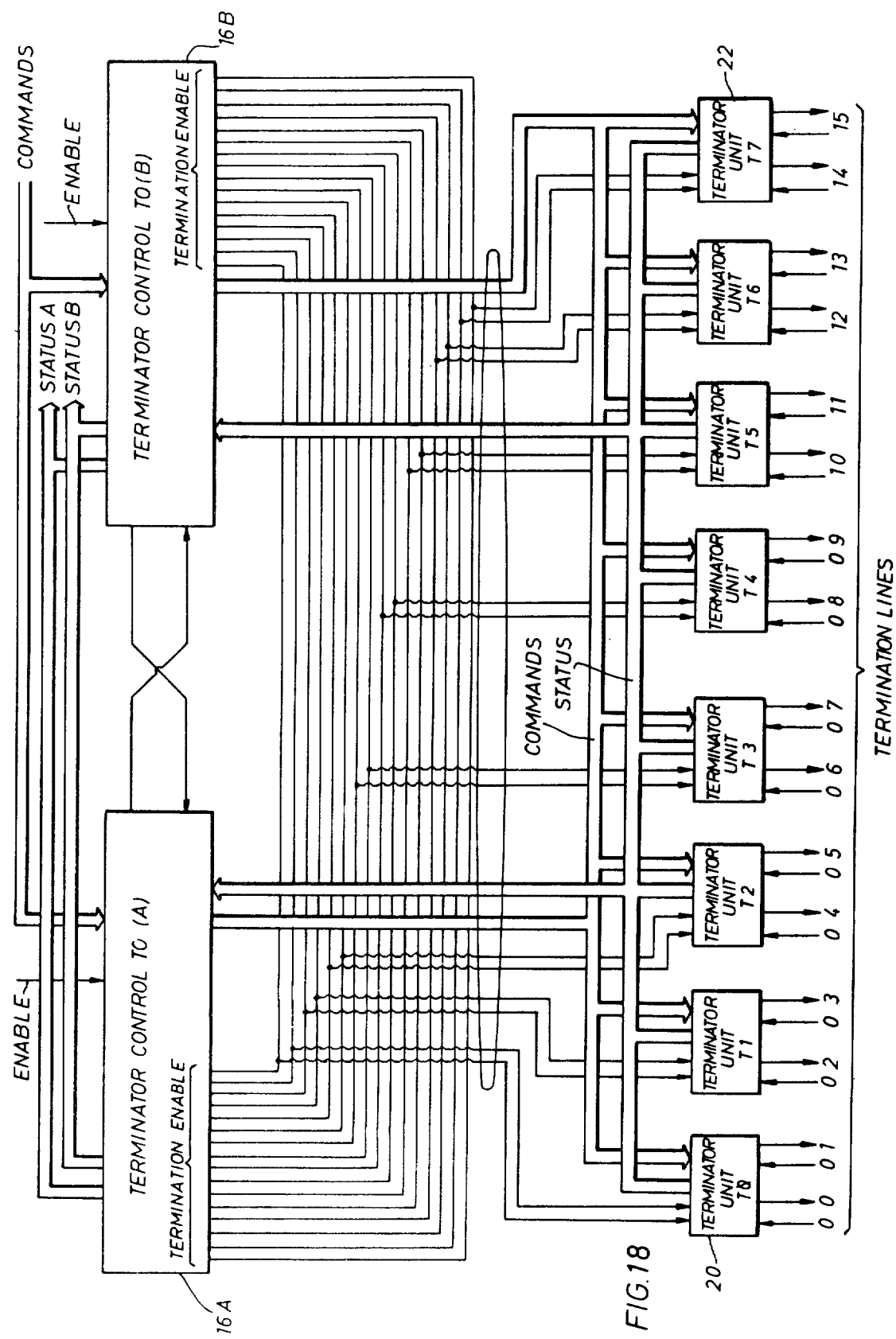
FIG. 18 is a block diagram representation of a redundant pair of terminator control units showing the data busing between the terminator control units and the terminator units.

Turning now to FIG. 18, a block diagram of the data bus connections between a pair of redundant terminator control unit 16A and 16B and its termination units, such as termination units 20 and 22, is shown. Each terminator control unit controls eight terminator units, such as terminator units 20 and 22. Each terminator unit, in turn, controls two terminations. As previously mentioned, the terminator control units output 16 termination enable signals, with two enable signals applied to each terminator unit.

Figure 19:
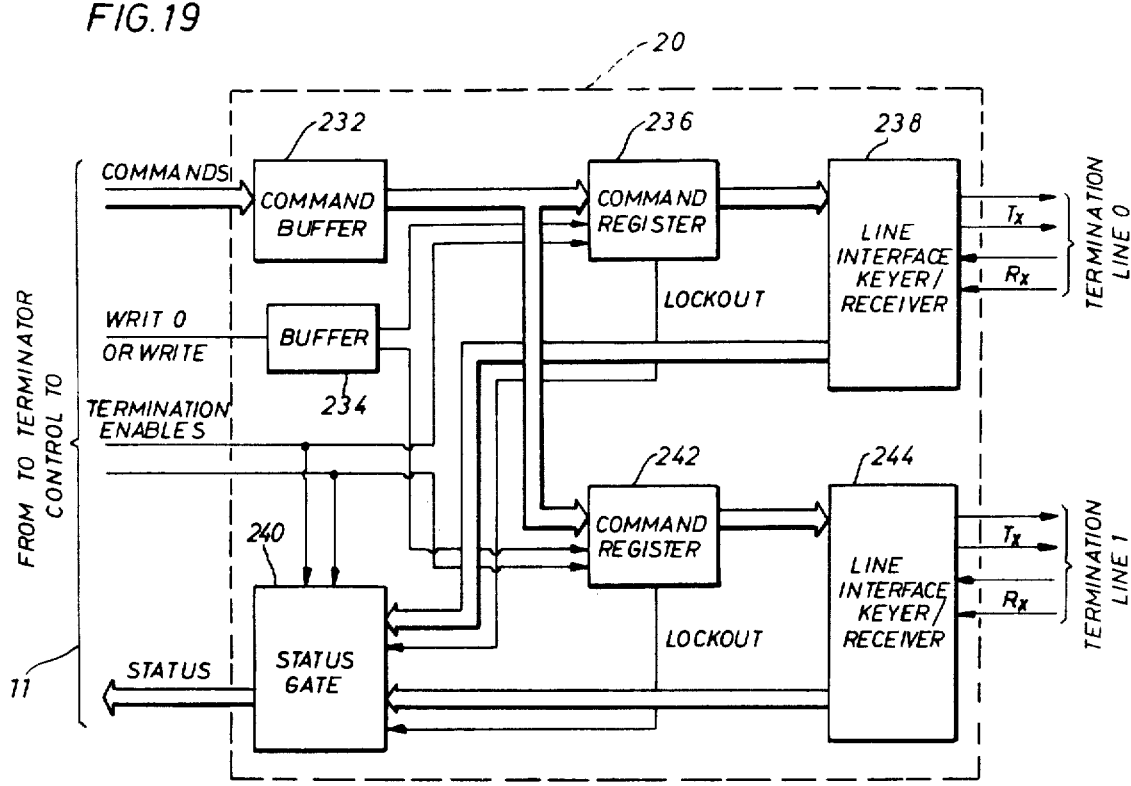
FIG. 19 is a block diagram representation of a terminator unit.

Referring now to FIG. 19, a block diagram of a typical terminator unit, such as terminator unit 20, is shown. The command data from the terminator control unit 16 is inputted to a command buffer 232 whose output is applied to command register 236 and 242. The write signal WRITE or WRITO, whichever is appropriate, is applied to buffer 234 and distributed to both command register 236 and 242. The two termination enable signals that are applied to termination unit 20 are distributed, one to command register 236 and one to command register 242. Depending on which of the termination enable signals is selected, the command data will be strobed into the appropriate command register. Concurrently, the termination enable signals cause the status gate 240 to apply the status condition of either the line interface keyer/receiver 238 or 244 onto the status bus that is transmitted up to the terminator control units 16A and 16B. The line interface keyer/receiver unit 238 responds to the command register 236 to transmit on the transmit lines to the termination the appropriate signaling levels specified by the command data. Likewise, line interface keyer/receiver 244 responds to the data from command register 242 to produce the signaling levels in the other termination transmit lines that are contained on terminator unit 20. The signaling levels on the receive termination lines for both terminations are converted to status signals by their respective keyer/receiver circuits, and applied to the input of status gate 240.

In summary, a new concept in the design of a telex exchange has been disclosed. To accommodate the calls from an even larger number of terminations than was ever before possible and to do so at higher data rates, the present invention has incorporated the power of computers in a way that distributes the processing requirements to different levels of control. By distributing the processing requirements, a more efficient processing will occur at the more critical levels. The signaling requirements at the termination level can be handled more efficiently through the use of the firmware signaling routines of the line control processors in cooperation with the script routines of the group control processors since a great deal of the software overhead has been removed from the computer program and moved to the line control hardware. Beginning with the basic concepts that all telex signaling sequences are comprised of basic signaling elements, such as levels, transitions, pulses and characters, the present invention has developed a technique of producing the signaling sequences in a large number of terminations at higher data rates than ever before possible, yet provide for reliability in the handling of the calls and provide ease of change in the signaling requirements of any termination connected to the exchange. By dividing the generation of the signaling sequences between a set of basic signaling routines performed by the time share processor and special purpose script task routines in the higher level processor, an efficient technique to handle the signaling requirements for a large number of terminations becomes a reality.

Because of the distributed processing concept, the system-wide functions of call routing, billing, peripheral device handling, etc. can be concentrated at the highest level in the common control processor while freeing up the lower levels for the call servicing. Having been freed from this software decision making, the next lower level of processor control can be dedicated to the handling of the conversation data that must flow through the system. To accomplish this function, each master control processor contains enough memory capacity in a frame memory to store one bit of conversation data generated by every termination connected to the exchange. Associated with the frame memory is a vector memory containing locations associated with each termination that will provide frame memory addresses to the conversation data frame memory to select the conversation data to be forwarded to the terminations. To control the flow of conversation data, the common control processor will store in the vector memory location associated with each termination, the address of the frame memory location associated with the calling termination. When addressed in sequence, the vector memory will output this frame memory address and an active bit to signify the termination that a call is in progress. This active bit will canoe the line control processors to transmit this conversation data to the called termination.

In describing the invention, reference has been made to a preferred embodiment. However, those skilled in the art and familiar with the disclosure of the invention may recognize additions, deletions, substitutions or other modifications which would fall within the preview of the invention as defined in the claims.

What is claimed is:

1. A microcoded processor for use in a multi-channel high-speed data processing system in which each channel is processed in a time share mode by said processor according to selectable ones of a plurality of microcoded data handling routines, each channel having input and output signals, the processor comprising:

(a) a sequence file, for storing addresses of the channels to be processed in which the stored addresses are outputted in response to a sequential sequence of storage location addresses, the outputted addresses controlling the order and rate at which each of the channels is time share processed according into which storage locations the address of each channel is stored in said sequence file, the processor processing each channel during time share intervals, and where the addresses in said sequence file may be changed during execution of the routines to provide for the dynamic control of the sampling of any given channel;

(b) a program memory for storing the microcode instructions for the plurality of data handling routines, which routines process the various input and output signals of the channels;

(c) a means of executing the microcode instructions stored in said program memory in which a predetermined number of microcode instructions are executed by said executing means for each channel during each time share interval;

(d) a routine re-entry file having an addressable memory location associated with each channel, each re-entry file memory location storing the program memory address of the next program instruction to be executed during the next time share interval for its associated channel, the next instruction address stored for each channel controlling which of the plurality of data handling routines is next to be executed for the channel, the stored re-entry addresses independent of the routine being executed for the associated channel during its last time share interval; and (e) a channel data file having at least one block of memory locations associated with each channel, for storing and outputting to said executing means the data required by said executing means to process the next channel in a sequence, each associated block including memory locations for storing
(1) constant data reqired by the data handling routines to process each channel, and
(2) variable data required by the data handling routines to process each channel, where the function of each bit of each memory location for the variable data for each associated channel is variable and is redefined in accordance with which of the plurality of data handling routines is next to be executed for the associated channel; and
(f) said executing means including a constant and a variable high-speed cache memory for respectively storing the constant and variable data required by the routine currently being executed, said constant and variable cache memories each comprising first and second cache memories each having active and inactive states such that,
(1) when said first or second memory is in the active state, it contains the data for the current channel to be time share processed and is available for use by the microcode instructions, said active first or second variable cache memory adapted to permit the stored data to be modified during execution of the microcode instructions, and
(2) when said first or second memories are in the inactive state it is available for storing the data for the next channel to be time share processed in the next time share interval, said first and second memories always in opposite states with their states switching at the completion of each time share interval.

2. The processor according to claim 1 wherein said means for executing the microcode instructions further includes:
(a) an arithmetic logic unit responsive to the microcode instructions, for performing arithmetic and logic manipulations on selected digital data inputted to said logic unit;
(b) a file address and control means responsive to said sequence file, for addressing said channel data file and said cache memory to transfer the data to and from said cache memories, and to control the processor to execute the predetermined number of instructions for each channel during each time share interval; and
(c) a data selection means responsive to the microcode instructions, for selecting the digital data applied to the input of said arithmetic logic unit, and for controlling the flow of data between said arithmetic logic unit, said cache memories and said data file.

3. The processor according to claim 2 wherein the data for the channel processed in the previous time share interval contained in said inactive first or second memory of said variable cache memory are transferred during the inactive state back to the associated data file memory locations for the variable data for the channel previously processed.

4. The process according to claim 3 wherein said data selection means further includes a special function memory for storing special function instructions which are executed during the next time share interval and which operate on the data in said inactive first or second variable cache memory prior to the return of the data to said channel data file.

5. The process according to claim 1, 2 or 3 wherein said microcoded processor further comprises an input-output interface responsive to addresses from said sequence file, for selecting the channel currently being time share processed to input to or receive data signals from said processor.

6. A microcoded processor for the time share processing of a plurality of data channels in which each channel is processed according to selected ones of a plurality of microcoded routines during time share intervals, the processor having a program memory for storing the program instructions for the microcoded routines and a means for executing those instructions, the processor further comprising:
(a) a sequence file for storing addresses associated with the channels to be processed, the storage locations of said sequence files addressed in sequence whereby the stored addresses thus outputted control the order and rate at which each channel is time share processed according into which storage locations the address of each channel is stored in said sequence file, the address stored in each storage location specified independently of any address stored in any other file storage location thereby enabling the next channel to be time share processed to be selected independently of which channel was previously processed;
(b) a routine entry file having an addressable memory location associated with each channel, each entry file memory location storing the program memory address of the next program memory instruction to be executed for its associated channel during the next time share interval for that channel, the stored program memory address for each channel capable of storing the address to a program instruction in any microcoded routine irrespective of which routine was being executed during the last time share interval for that channel;
(c) a constant file having a block of memory locations associated with each channel, for storing fixed data required by the routines to process the channels;
(d) a variable file having a block of memory locations associated with each channel, for storing variable data required by the routines to process the channels, the data stored in said variable file capable of being altered by said processor, and where the function of each bit of each memory location in each associated block of locations are defined in accordance with which microcode routine is currently being executed for the associated channel;
(e) a high-speed constant data cache memory, for storing from said constant file constant fixed data associated with both the current and the next channel to be time share processed;
(f) a high-speed variable data cache memory for storing from said variable file the blocks of data associated with both the current and the next channel to be time share processed, the data contained in said variable cache from the last processed channel during the last time share interval returned to said variable file during the current time share interval, said constant and said variable cache memories are each comprised of first and second memories each having active and inactive states such that,
(1) when said first or second memory is in the active state, it contains the data for the current channel to be time share processed and is available for use by the microcode instructions, said active first or second variable cache memory adapted to permit the stored data to be modified during execution of the microcode instructions, and (2) when said first or second memories are in the inactive state it is available for storing the data for the next channel to be time share processed in the next time share interval, said first and second memories always in opposite states with their states switching at the completion of each time share interval.

7. The processor according to claim 6 wherein said microcoded processor further comprises an input-output interface responsive to addresses from said sequence file, for selecting the channel currently being time share processed to input to or receive data signals from said processor.

* * * * *

UNITED STATES PATENT AND TRADEMARK OFFICE
CERTIFICATE OF CORRECTION

PATENT NO. : 4,425,616  
DATED : January 10, 1984  
INVENTOR(S) : Jack L. Woodell Page 1 of 4

It is certified that error appears in the above-identified patent and that said Letters Patent is hereby corrected as shown below:

Column 2, line 7 delete "band" and insert --baud--.

Column 4, line 15 delete "connection" and insert --consideration--.

Column 5, line 65 delete "asteric" and insert --asterisk --.

Column 9, line 21 delete "transistions" and insert --transitions--.

Column 11, line 25 delete "send" and insert --sent--.

Column 25, line 24 delete "CONTRO/STATUS" and insert --CONTROL/STATUS--.

Column 29, lines 22, 41 and 43 delete "catch" and insert --cache--.

Column 30, line 32 delete "give" and insert --given--.

Column 31, line 31 delete "mcrocoded" and insert --microcoded--.

line 51, delete "currrent" and insert --current--.

Column 32, line 61, delete number "20" and insert --29--.

Column 33, lines 58 and 65, delete "catch" and insert --cache--.

line 62, before "bit" insert --if--.

UNITED STATES PATENT AND TRADEMARK OFFICE
CERTIFICATE OF CORRECTION

PATENT NO. : 4,425,616
DATED : January 10, 1984
INVENTOR(S) : Jack L. Woodell

It is certified that error appears in the above-identified patent and that said Letters Patent are hereby corrected as shown below:

Column 34, line 3, delete "catch" and insert --cache--.

Column 35, line 25, delete "flangs" and insert --flags--.

line 45, delete "the" and insert --be--.

Column 36, line 23, delete "catch" and insert --cache--.

line 68, after number 66 and before word being insert word --before--.

Column 37, lines 22, 29 and 46, delete "catch" and insert --cache--.

line 25, delete "VFR" and insert --VRF--.

Column 38, line 51, delete "ADR,A" and insert therefor --ADDR,A --.

Column 39, line 9, delete "ADR,B,A" and insert therefor --ADDR,B,A--.

line 10, delete "ADDR,B,A" and insert therefor --ADDR,A --.

Column 40, line 7, after "in" insert --A--.

Column 41, line 22 delete "SETCLCE" and insert --SETCLCB--.

UNITED STATES PATENT AND TRADEMARK OFFICE
CERTIFICATE OF CORRECTION

PATENT NO. : 4,425,616
DATED : January 10, 1984
INVENTOR(S) : Jack L. Woodell

Page 3 of 4

It is certified that error appears in the above-identified patent and that said Letters Patent is hereby corrected as shown below:

Column 43, line 31, after processor delete "the cause" and insert --cause the--.

Column 44, line 43, after the word in, delete "VX-30," and insert --V33-V30,--.

line 53, delete "V00-1---." and insert --V00=1---.--.

Column 45, line 45, delete "optionaly" and insert --optionally--.

Column 51, line 30, delete "16" and insert --16-bit--.

line 33, delete "with" and insert --will--.

line 34, first column under V22, insert --V23--.

line 57, after A and before being, insert -- as --.

Column 53, line 38, under Input delete "C-3" and insert --CO3--.

Column 54, line 48, delete "on" and insert --one--.

Column 55, line 23, delete "us" and insert --ms--.

UNITED STATES PATENT AND TRADEMARK OFFICE
CERTIFICATE OF CORRECTION

PATENT NO. : 4,425,616

DATED : January 10, 1984

INVENTOR(S) : Jack L. Woodell

Page 4 of 4

It is certified that error appears in the above-identified patent and that said Letters Patent is hereby corrected as shown below:

Column 58, line 32 third column, delete "BUT" and insert --BIT--.

Column 92, line 50, Claim 1, delete "of" and insert --for --.

Signed and Sealed this

Twenty-first Day of May 1985

[SEAL]

Attest:

DONALD J. QUIGG

Attesting Officer

Acting Commissioner of Patents and Trademarks